United States Patent [19]

Blank

[11] Patent Number: 5,469,536
[45] Date of Patent: Nov. 21, 1995

[54] IMAGE EDITING SYSTEM INCLUDING MASKING CAPABILITY

[75] Inventor: Arthur M. Blank, San Diego, Calif.

[73] Assignee: ImageWare Software, Inc., San Diego, Calif.

[21] Appl. No.: 65,750

[22] Filed: May 21, 1993

Related U.S. Application Data

[63] Continuation-in-part of Ser. No. 844,299, Feb. 25, 1992, Pat. No. 5,345,313, and a continuation-in-part of Ser. No. 919,584, Jul. 23, 1992.

[51] Int. Cl.⁶ .................................................. G06F 15/66
[52] U.S. Cl. ............................................................. 395/131
[58] Field of Search ................................... 395/131, 129; 358/28, 27; 345/22, 150, 153, 154

[56] References Cited

U.S. PATENT DOCUMENTS

| | | | |
|---|---|---|---|
| 3,398,664 | 8/1968 | Bonatsos | 95/14 |
| 3,864,708 | 2/1975 | Allen | 354/290 |

(List continued on next page.)

FOREIGN PATENT DOCUMENTS

| | | | |
|---|---|---|---|
| 084064 | 7/1983 | European Pat. Off. | B42D 15/02 |
| 0235398 | 9/1987 | European Pat. Off. | H04N 1/387 |

(List continued on next page.)

OTHER PUBLICATIONS

People Postcards! brochure, 1990.
Adobe Photoshop 2.5 advertisement, *Info World*, Apr. 19, 1993.
Altamira readies image software, by Mark Moore, *PC Week*, 1993, pp. 33, 34.
Bargain-Priced Image Editing, High-Cost Features, by Karen Watterson, *Windows Sources*, May 1993, pp. 206, 208.
'Composer' turns bit maps into objects, Start-up could revolutionize field, by Jeanette Borzo, *Info World*, Mar. 8, 1993, pp. 1, 99.
Graphics vendors debut PC software, Image editing, modeling top list, by Jeanette Borzo, *Info World*, Nov. 30, 1992, p. 15.
ImageWare ships first bit-map editor, Several others will soon follow, by Jeanette Borzo, *Info World*, May 3, 1993, p. 15.

(List continued on next page.)

*Primary Examiner*—Phu K. Nguyen
*Attorney, Agent, or Firm*—Knobbe, Martens, Olson and Bear

[57] ABSTRACT

A system and method for editing digital images in three dimensions includes a computer for storing a digital image of an object and a background, as well as at least one additional background image. Based upon the difference between the hues of the edge of the object and the surrounding background and a predetermined hue difference, the computer locates the edge of the object and removes portions of the image (i.e., the background) that are outside the edge. Then, the object can be combined with a preselected one of the other background images so as to form a composite image. Components of the preselected background image are assigned relative positions in the X-Y plane, and are also assigned a value defining their location in one of a plurality of layers which form the Z dimension of the image. The object to be combined with the background is also assigned a value defining its location in at least one of those layers. In another embodiment of the invention, colors of either a digital or video image can be selectively assigned to a mask. The colors can be of the entire image or from a selected area of the image. Color manipulation can then be performed on just the colors of the image defined by the mask. The mask may be used with the entire image, with a selected area of the image, or with objects. Alternatively, the colors of the image defined by an inverted mask are affected by color manipulation.

102 Claims, 41 Drawing Sheets

Microfiche Appendix Included
(22 Microfiche, 1205 Pages)

U.S. PATENT DOCUMENTS

| | | | |
|---|---|---|---|
| 4,037,249 | 7/1977 | Pugsley | 358/76 |
| 4,052,739 | 10/1977 | Wada et al. | 358/299 |
| 4,130,834 | 12/1978 | Mender et al. | 358/127 |
| 4,190,856 | 2/1980 | Ricks | 358/88 |
| 4,240,104 | 12/1980 | Taylor et al. | 358/22 |
| 4,258,385 | 3/1981 | Greenberg et al. | 358/22 |
| 4,357,624 | 11/1982 | Greenberg | 358/22 |
| 4,409,618 | 10/1983 | Inaba et al. | 358/183 |
| 4,439,783 | 3/1984 | Nishikawa | 358/22 |
| 4,463,380 | 7/1984 | Hooks, Jr. | 358/160 |
| 4,506,289 | 3/1985 | Shirakami | 358/22 |
| 4,539,585 | 9/1985 | Spackova et al. | 358/93 |
| 4,561,061 | 12/1985 | Sakamoto et al. | 364/550 |
| 4,589,013 | 5/1986 | Vlahos et al. | 358/22 |
| 4,599,611 | 7/1986 | Bowker et al. | 340/721 |
| 4,602,280 | 7/1986 | Maloomian | 358/93 |
| 4,621,280 | 11/1986 | Shinohara et al. | 358/22 |
| 4,636,862 | 1/1987 | Hatori et al. | 358/166 |
| 4,677,460 | 6/1987 | Fass et al. | 358/22 |
| 4,687,526 | 8/1987 | Wilfert | 156/64 |
| 4,688,105 | 8/1987 | Bloch et al. | 358/335 |
| 4,694,329 | 9/1987 | Belmares-Sarabia et al. | 358/22 |
| 4,698,682 | 10/1987 | Astle | 358/182 |
| 4,710,800 | 12/1987 | Fearing et al. | 358/22 |
| 4,731,743 | 3/1988 | Blancato | 364/521 |
| 4,750,050 | 6/1988 | Belmares-Sarabia et al. | 358/311 |
| 4,782,384 | 11/1988 | Tucker et al. | 358/22 |
| 4,786,944 | 11/1988 | Sakamoto et al. | 355/20 |
| 4,796,180 | 1/1989 | Riley | 364/400 |
| 4,805,037 | 2/1989 | Noble et al. | 358/335 |
| 4,811,084 | 3/1989 | Belmares-Sarabia et al. | 358/22 |
| 4,823,285 | 4/1989 | Blancato | 364/521 |
| 4,827,253 | 5/1989 | Maltz | 340/734 |
| 4,827,344 | 5/1989 | Astle et al. | 358/183 |
| 4,841,378 | 6/1989 | Cogert | 358/335 |
| 4,864,410 | 9/1989 | Andrews et al. | 358/443 |
| 4,872,056 | 10/1989 | Hicks et al. | 358/183 |
| 4,873,568 | 10/1989 | Jackson et al. | 358/22 |
| 4,891,660 | 1/1990 | Biondo, Jr. | 354/412 |
| 4,910,661 | 3/1990 | Barth et al. | 364/167.01 |
| 4,954,883 | 9/1990 | Belmares-Sarabia et al. | 358/22 |
| 4,959,670 | 9/1990 | Thayer, Jr. | 354/76 |
| 4,963,925 | 10/1990 | Miyazaki | 355/77 |
| 4,965,673 | 10/1990 | Bozzo et al. | 358/335 |
| 4,974,172 | 11/1990 | Nakai | 364/521 |
| 5,022,085 | 6/1991 | Cok | 382/1 |
| 5,031,043 | 7/1991 | Rocco et al. | 358/181 |
| 5,053,956 | 10/1991 | Donald et al. | 364/401 |
| 5,117,283 | 5/1992 | Kroos et al. | 358/22 |
| 5,126,847 | 6/1992 | Kori et al. | 358/183 |
| 5,343,386 | 8/1994 | Barber | 364/400 |

FOREIGN PATENT DOCUMENTS

| | | | |
|---|---|---|---|
| 0326515 | 8/1989 | European Pat. Off. | H04N 1/387 |
| 3422285 | 4/1988 | Germany | D06P 5/00 |
| 0206098 | 8/1989 | Japan . | |
| 2078411 | 1/1982 | United Kingdom | G06F 7/00 |
| 2253490 | 2/1990 | United Kingdom . | |

OTHER PUBLICATIONS

Painter extension lets artist treat bit maps as objects, Allows users to move elements, by Jeanette Borzo, *Info World*, Apr. 5, 1993, p. 3.

Picture Publisher is latest with bit–map layer capability, by Jeanette Borzo, *Info World*, Apr. 12, 1993, p. 3.

Specular improves bit–map manipulation, by Jeanette Borzo, *Info World*, May 10, 1993, p. 8.

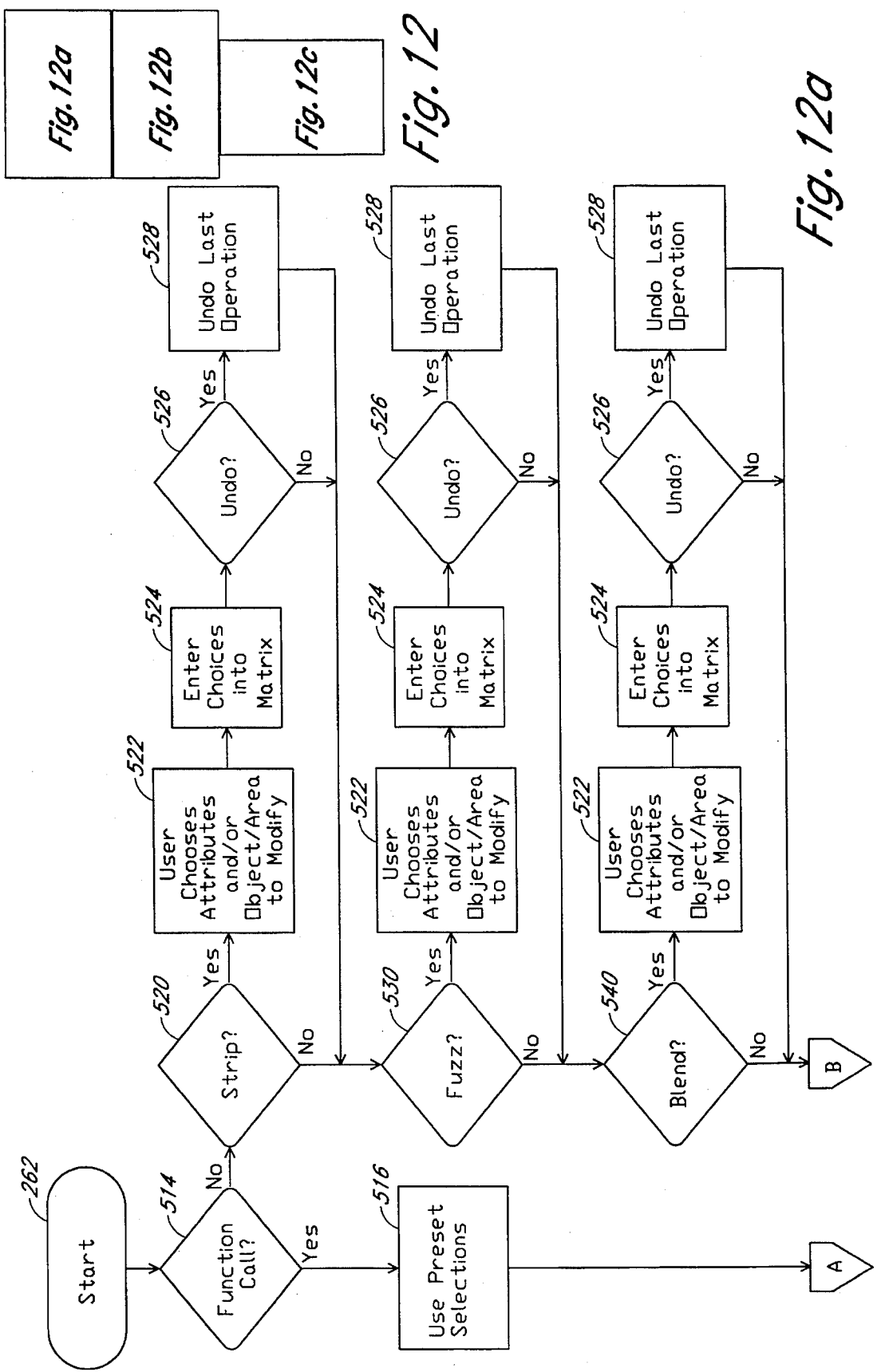

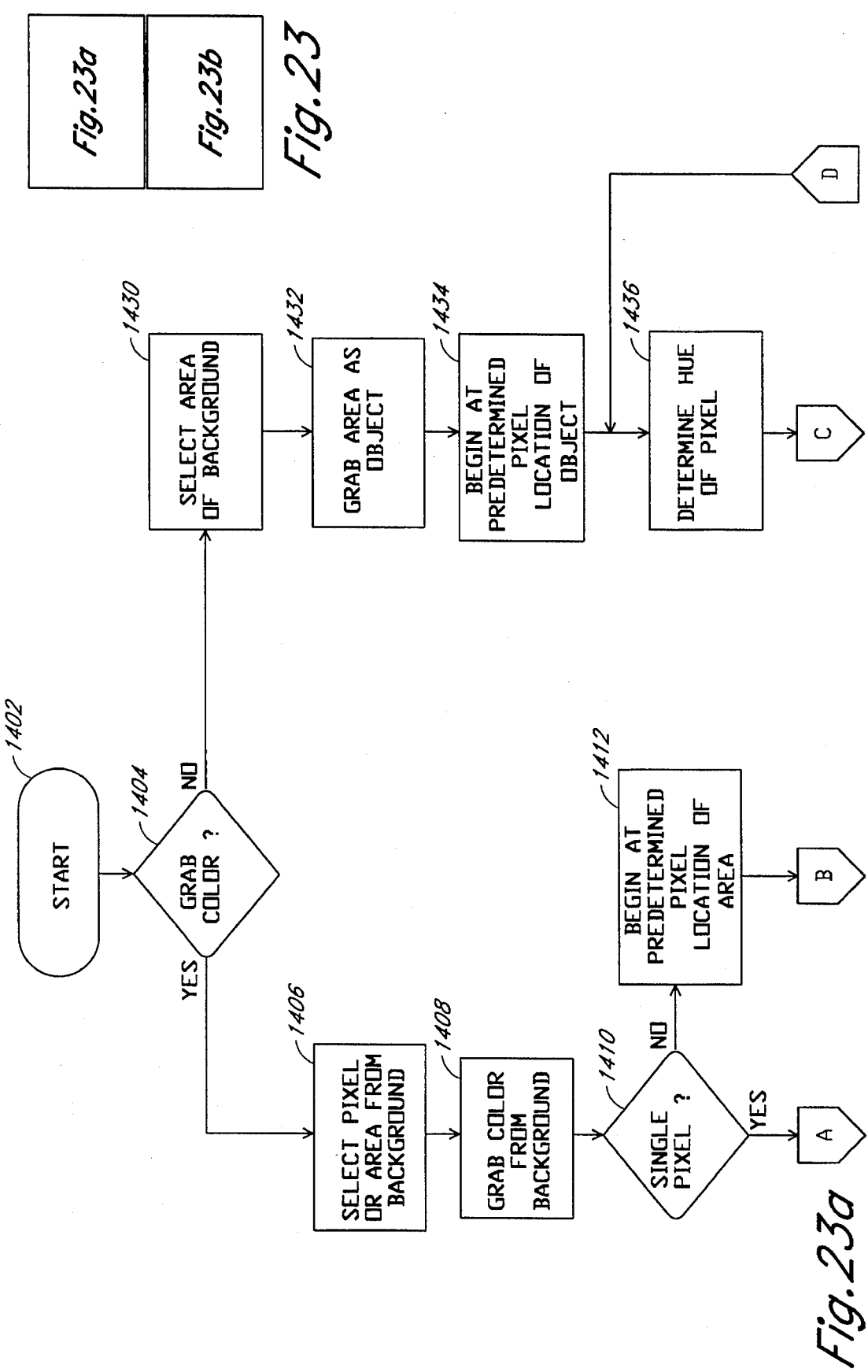

(22 Microfiche, 1205 Pages)

IMAGE EDITING SYSTEM INCLUDING MASKING CAPABILITY

RELATED APPLICATION

The present application is a continuation-in-part of co-pending applications U.S. Ser. No. 07/844,299, filed on Feb. 25, 1992, now U.S. Pat. No. 5,345,313, and U.S. Ser. No. 07/919,584 filed on Jul. 23, 1992.

MICROFICHE APPENDIX

A microfiche appendix containing computer source code is attached. The microfiche appendix comprises 22 sheets of microfiche having 1205 frames, including one title frame.

The microfiche appendix contains material which is subject to copyright protection. The copyright owner has no objection to the reproduction of such material, as it appears in the files of the Patent and Trademark Office, but otherwise reserves all copyright rights whatsoever.

BACKGROUND OF THE INVENTION

1. Field of the Invention

The present invention relates to image processing and, more particularly, to systems for editing digital images.

2. Background of the Technology

A large number of applications require combining one video image with another video image, i.e., a television broadcast of a weather person in front of weather maps during a weather report, so as to produce a composite video image. One well-known technique for producing composite video images is commonly referred to as "chroma-key". The chroma-key technique is so named because it uses the chroma or color information portion of a television signal as a "key" to control the formation of a composite image. A chroma-key device is essentially a video multiplexer which selects a video input signal by feeding the chroma signal from one of the two video inputs to decision logic.

In the case of the above-mentioned weather report application, a television camera is directed at a weather reporter standing in front of a vertical sheet, called a matte, which has a predetermined blue hue or color shade. Hue is the dimension of color that is referred to a scale of perceptions ranging from red through yellow, green, and blue, and circularly back to red. The image of the weather reporter and matte foreground source is provided to the chroma-key device, which is programmed to select all of the video signals received from the camera, except those video signals that represent portions of the image having the predetermined blue hue. Thus, the chroma-key device effectively separates the image of the reporter from the image of the matte.

At the same time that the previously described operation takes place, a video image of a weather map or satellite view of the earth, either of which may be superimposed with city names, high/low temperatures, and the like, is provided to the chroma-key device as a background source. The decision logic of the chroma key device selects the background source as video output wherever a blue hue is detected in the foreground source and presents the resulting background and foreground as a composite picture on a studio monitor that can be viewed by the reporter. The reporter can then point to positions on the matte that correspond to geographic locations on the background source and the viewer of the television program sees a composite image of a reporter and a weather map. Such a composite image is the desired output of a chroma-key device.

However, as was noted in U.S. Pat. No. 4,811,084 to Belmares-Sarabia, et al., a major disadvantage of a chroma-key system is that false keys can be produced. For example, weather reporters wearing blue or striped suits, and even blue eyes, may cause a chroma-key system to produce an incorrectly spliced composite. Also, a chroma-key device is used too large a distance between the reporter and the matte causing reflections resulting from false keying, hence restraining the movements of the reporter.

To overcome the problems inherent in chroma-keying, the Belmares-Sarabia, et al., patent discusses a device for video color detection that does not depend on a single color for keying. For example, such a device is also said to discriminate among similar hues by limiting the bandwidth of the hues and/or hue and saturation combinations that can be recognized by the device.

The device disclosed in Belmares-Sarabia, et al., uses an analog process to multiplex television signals. Analog processes, however, are not as versatile in combining images as are digital processes, which can be programmed to apply sophisticated image processing algorithms to a digitized image so as to alter or edit an image. Thus, it would be an advancement in the technology to provide a digital image editing system which can strip a digital image of an object from a background and combine the digital object with a different digital background or backgrounds (composite) without suffering from the above-mentioned problems and limitations.

Other ways of producing a composite image include image editing software programs running on a Macintosh® computer available from Apple Computer, Inc., or a PC type compatible computer available from IBM and other companies. These programs are exemplified .by Picture Publisher® produced by Micrografx, Inc. for the PC and Adobe Photoshop™ produced by Adobe Systems Incorporated for the Macintosh. Picture Publisher is a registered trademark of Micrografx, Inc. Adobe Photoshop is a trademark of Adobe Systems Incorporated. Macintosh is a registered trademark of Apple Computer, Inc.

These programs enable the user to place one object image in front of a background scene and to cut and remove the object image. However, these programs are limited to working with one object only. These programs cannot build a set of layers of objects and backgrounds and allow the user to move an object to different depths or layers into the composite image. In other words, a person could not be placed behind a fence but in front of a house of the background scene simultaneously. Thus, it would be an advancement in technology to provide a system which could place an object in front or behind any other object or the background at any desired depth into the composite image. It would also be desirable to make part of an object which was moved into a particular layer to be transparent based on a desired attribute of the object. For example, one attribute of the object is hue, which is the perceived color shade. The leaves of a tree, which have a particular hue range of green, could be set to be transparent rather than opaque. Thus, the sky would then be seen between the branches of the tree, wherein previously, the leaves had blocked the sky.

When producing a composite image involving the face of a person, one may desire to remove the original person's face and replace it with the face of another person. Frequently the two faces will not be the same size, e.g., one face is a closeup and the other is not, and the person trying to make the composite image will have to reduce or enlarge the replacement face to fit. This may involve numerous trials to achieve a pleasing appearance. Thus, it would be desirable to provide a system which can automatically size the replacement face to provide a natural appearance without a trial and error process.

Another aspect to consider when replacing one face for another is the coloration of the skin. The person making the composite image may be placing a fair complexioned face to replace a dark complexioned face. The rest of the body, such as hands, arms and legs, may be visible in the original image. The composite would therefore not appear natural after the replacement was done. Thus, it would be desirable to provide a system which can automatically match the skin tone of the replacement face to that of the original face without any manual intervention to provide a natural appearance for the resultant composite image.

A further aspect to consider when replacing one face for another in creating a composite image is the positioning of the replacement face. This positioning may involve an iterative process to try different placements to achieve a pleasing and natural appearance. Thus, it would be desirable to provide a system which can automatically position the replacement face at the appropriate location to produce a pleasing appearance for the resultant composite image.

It is often the case that an object is imaged under one lighting condition and is then overlaid on a background that was imaged under another lighting condition. Consequently, the composite image may look artificial. Thus, it would be a further advantage if the editing system could establish the same lighting conditions, or "gamma", for the entire composite image. For example, it may be desirable to have an object that was imaged under fluorescent light inserted into a background that was imaged under full daylight and have the composite image maintain the same lighting condition. The lighting condition of the composite image could even be a third condition such as moonlight.

While editing a color image, a person may wish to perform a particular color manipulation or operation on only a certain color or group of colors rather than all the colors of the image. This certain color or group of colors defines a mask. Alternatively, one may wish to perform a particular color manipulation or operation on all colors of an image except a certain color or group of colors. This is accomplished by taking all the colors of the image except those defined by the first group of colors through an inversion process. Present technology allows use of colors, but only for an area of the image, and then using only one color at a time. An area is a portion of or the entire image used as a background or base image, and is considered to be a single layer. Thus, it would be an advance in the technology to provide multi-color mask technology for use in image manipulation. These masks would apply to either the entire image, to a selected area of the image, or to objects of the image. A further advance would allow color image manipulation using masks on a series or sequence of related images.

Accordingly, a need exists to provide a digital image editing system which can separate the digital image of an object from a background against which the object was imaged. It is a further purpose of the present invention to provide a digital image editing system which can automatically size, position, and layer the digital image of a replacement object or multiple objects into a predetermined background at a desired depth, and then match the lighting conditions of the replacement object with one or more original objects and the background, and to provide a digital image editing system that is easy to implement and cost-effective to use. A need also exists to provide color masking capability to include simultaneous multiple colors and the choice of their usage with objects, areas, or the entire image.

SUMMARY OF THE INVENTION

The present invention satisfies the above-mentioned needs and includes a system and method for selectively combining digital images. The system includes a computer, which is connected to a device, such as a video camera, that can generate a signal representing an image. An object, for example, a human, is positioned in front of the video camera, and the video camera generates a signal representing the object and the background that is behind the object.

Accordingly, the signal from the camera includes an object component representative of the image of the object and a background component representative of the image of the background. The object has an edge, and the computer detects the edge of the object and separates portions of the image that are outside the edge of the object (i.e., the background component) from portions of the image that are inside the edge (i.e., the object component).

In one embodiment, the background has a single continuous hue, and based upon the difference in hue between the object and background, the computer determines the location of the edge of the object. Based on this determination, the computer removes the background component from the signal.

More particularly, the video camera produces through digitization a digital signal that is comprised of a plurality of pixels that are arranged in rows. Each pixel has a hue gamma and each hue gamma has a corresponding numeric value which represents how light or dark the hue is. The computer determines the location of the edge of the object by first ascertaining the numeric value of the hue gamma of a first pixel that is located at the end of the top row of the video window (i.e., is located at the periphery of the video image). The computer also determines the numeric value of the hue gamma of an adjacent second pixel in the row, and then compares the difference between the gammas to a predetermined difference.

When the difference between the hue gamma of the first pixel and the hue gamma of the second pixel is less than the predetermined difference, the computer compares the hue gamma of the second pixel with the hue gamma of a third pixel that is located in the same row as the first and second pixels and is adjacent to the second pixel, and so on. When the difference between any two pixels exceeds the predetermined value, this indicates the presence of a portion of the edge of the object. The computer then stores the location of the edge portion in memory, and then repeats the process described above for the row immediately below the top row of pixels. If desired, the computer can simultaneously perform a process like the one described above, but working from another direction, such as upwardly from the bottom row of pixels.

The computer continues the process, i.e., working inwardly from the boundary of the video window in the pixel-by-pixel comparisons, until the entire edge of the object has been mapped. After mapping the edge of the object, the computer is ready to "strip" (i.e., remove) the background component from the object component by setting all background pixels to a preselected transparent value.

After stripping away the background image from the object image, the computer can, if desired, integrate the object image into a preselected background image that is different than the background against which the object was imaged. More particularly, the computer can have one or more preselected background images stored in the memory of the computer. The computer can selectively digitally combine the object component of the signal with multiple signals which are representative of multiple layers of these stored backgrounds, together with optional text entered by an operator or user of the system and present the composite image on a video display. Thus, the image of the object can be combined, if desired, with a preselected background that is different from the background against which the object was imaged, user text added, if desired, and the composite image displayed.

Stated differently, the computer can essentially function as an image combiner by stripping, from a digital video signal, the image of an object from the image of the background in front of which the object was positioned. The computer then combines the image of the object with a preselected image. Specifically, stored in the memory of the computer is a two-dimensional digital image representation of a three-dimensional field of view, with components of the digital image assigned layer values to define their position in the three-dimensional field of view. The computer then blends the object into the selected background at the desired layer and X-Y position, so that the object appears to be integrated into the three-dimensional field of view.

Preferably, to further blend the object into the preselected image, the computer averages the hue of edge of the object and the hue of the portion of the preselected background that is contiguous to the edge. The computer then adjusts the hue of the edge of the object to equal the averaged hue.

Additionally, the computer of the present invention can adjust the gamma of one or both of the object and the preselected stored background, to make the integrated image appear as if the object was imaged under the same lighting conditions as the preselected stored background. For example, the computer can ascertain the gamma of the preselected background, and then adjust the numeric value of the hue of the pixels that make up the image of the object as appropriate to make the object appear as though it were imaged under the same lighting conditions under which the preselected background was imaged.

The system of the present invention can also include a video printer electrically connected to the computer for generating a picture of the object. Also, the system may include a currency acceptor which is operably engaged with the computer for accepting currency and activating the system in response to the insertion of currency into the acceptor. Thus, the system may, in one application, be used in conjunction with electrical imaging booths that are installed in public places for use by the public.

The system of the present invention automatically sizes the object image to naturally integrate into the composite image. The computer compares the original background object size to that of the replacement object and adjusts the size, if necessary, of the replacement object.

The system of the present invention automatically positions the object image to naturally integrate into the composite image. The computer utilizes the address of a predetermined location on the original background object and transfers that address to a predetermined location of the replacement object.

Traditional methods for image editing use area selection to identify the pixels of the image that are to be changed. The present invention allows an alternate means of color to be used for selecting the pixels of the image to be changed. The present invention includes a system and method for choosing the existing colors of an image that either will or will not be subject to further color manipulation. The user can choose a single color or a plurality of colors to be simultaneously included in a mask. This process of applying a mask involves two types of masks. The first type of mask, called the original mask, includes the colors selected by the user. The second type of mask, called the inverted mask, includes all colors of the image except those of the original mask. A mask defines the colors which will be affected by further color manipulations. The manipulation applies to all colors in the mask simultaneously. This mask can be in one of three conditions: no colors, some colors of the image, or all colors of the image. An inverted mask defines all of the colors in the image except those of the original mask (before inversion) which will be affected by further color manipulations. The mask may be used with the entire image, with a selected area of the image, or with objects. The mask therefore identifies specific pixels within the image, selected area or object that are subject to further manipulation, which includes a subset of the area, brush, and object options, e.g., blur. Upon completion of the blur operation, only the pixels of the area or object that match the color defined by the mask will be blurred. Thus the advanced masking capability, through color selection rather than area selection, enables the user to quickly and efficiently modify or enhance the appearance of an image to desired goal. As an enhancement of the masks, each mask type may be applied to a series of related images for color manipulation.

In one aspect of the invention, in a computer system having a memory, there is a method of editing an image having a plurality of pixels, each pixel having a color, comprising the steps of selecting a plurality of colors from among those present in the image to form a set of selected colors, and manipulating only those pixels having a color defined in the set of selected colors so as to change a visual feature of the image.

In another aspect of the present invention, in a computer system having a memory, there is a method of editing an image having a plurality of pixels, each pixel having a color, comprising the steps of identifying a color of each pixel of the image, storing data representing each identified color in an original first list on the memory of the computer system, identifying a selected color of the image, deleting the data representing the selected color from the first list, and manipulating pixels of the image having colors of a preselected relationship to the colors identified in the first list so as to change a visual feature of the image.

In yet another aspect of the present invention, in a computer system having a memory, there is a method of creating a color mask for an image, comprising the steps of providing an image having a plurality of pixels, each pixel having a color, selecting a plurality of colors from among those present in the image to form a set of selected colors, and storing data representing the colors from the set of selected colors in a list on the memory of the computer system, to thereby define the mask.

In another aspect of the present invention, in a computer system having a memory, there is a method of creating an inverted color mask for an image, comprising the steps of providing an image having a plurality of pixels, each pixel having a color, identifying the color of each pixel of the image to form a set of identified colors, selecting a color of the image, and deleting the selected color from the colors in the set of identified colors, thereby defining an inverted mask.

In yet another aspect of the present invention, there is a system for editing an image having a plurality of pixels, each pixel having a color, comprising a computer having a memory, means for providing the image, means for identifying a color of each pixel of the image, means for storing data representing each identified color in a first list on the memory of the computer, means for identifying a selected color of the image, means for deleting the data representing the selected color from the first list, and means for manipulating pixels of the image having colors corresponding to the colors identified in the first list so as to change a visual feature of the image.

In another aspect of the present invention, in a computer system, there is a method of recoloring an object having a plurality of pixels, comprising the steps of providing a background image having a plurality of pixels, selecting an area from the background image, determining a hue of a selected pixel in the selected area, repeating the determining step until the hue of all pixels in the selected area has been determined, determining an average hue of all the pixels in the selected area, selecting an object to be recolored, and changing the hue of the selected object to the calculated average hue.

In yet another aspect of the present invention, in a computer system, there is a method of recoloring an object having a plurality of pixels, comprising the steps of providing a background image having a plurality of pixels, selecting an area from the background image, identifying the selected area as a first object, determining a hue of a selected pixel of the first object, repeating the determining step until the hue of all pixels of the first object has been determined, determining an average hue of all the pixels of the first object, identifying a second object to be recolored, and changing the hue of the second object to the average hue of the first object.

These and other objects and features of the present invention will become more fully apparent from the following description and appended claims taken in conjunction with the accompanying drawings, in which like numerals refer to like parts.

BRIEF DESCRIPTION OF THE DRAWINGS

FIGS. 12a, 12b and 12c are a flow diagram of the top-level gamma function defined as block 262 in FIG. 3;

FIGS. 23a and 23b are a flow diagram of the Object Re-Color/Pattern option, defined at the brush options step 1042 in FIG. 19b;

DETAILED DESCRIPTION OF THE PREFERRED EMBODIMENT

Figure 1:
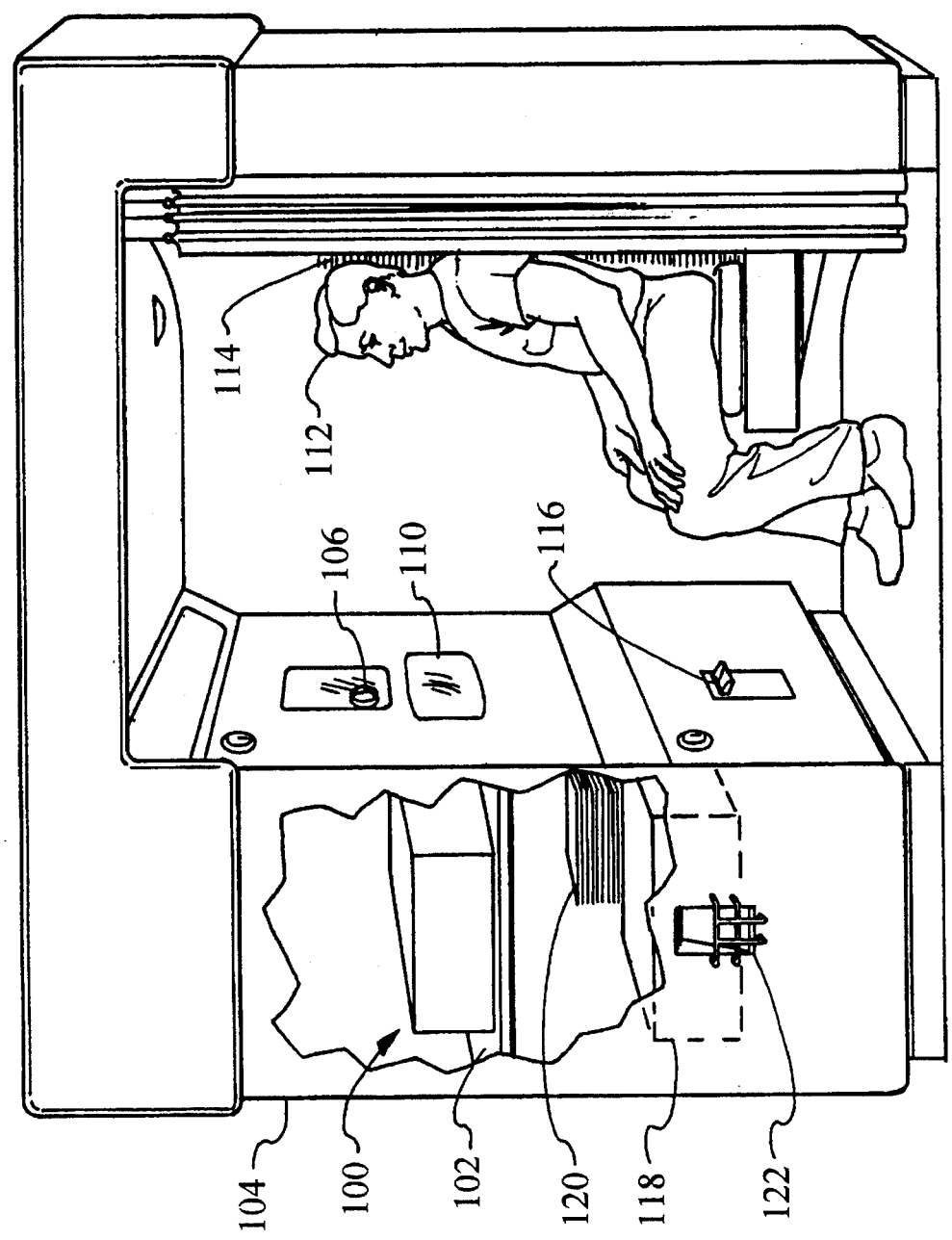
FIG. 1 is a perspective view of a presently preferred embodiment of the imaging system of the present invention, with portions cut away and shown in phantom, and with a human subject sitting in front of a background of a single hue.

Referring initially to FIG. 1, a presently preferred embodiment of a digital image editing system of the present invention is generally indicated at 100. It is to be understood that the imaging system 100 can be used in virtually any application where it is desirable to separate an object from a background in a digital image, and then combine the object with a different background to form a composite image.

One such application is shown in FIG. 1, which shows that the system 100 can be mounted by brackets 102 within an automated electrical imaging system 104. Certain features of the apparatus 104 are described in co-pending United States patent applications identified as Ser. No. 669,664, and Ser. No. 844,299 and assigned to the same assignee as the present application, which applications are hereby incorporated herein by reference. The apparatus 104 includes a video camera 106, such as a model VKC-360 camera available from Hitachi Corp., and which is electrically connected to the system 100.

Still referring to FIG. 1, a video monitor or display 110, such as a Kodak model 1310 RGB/CGA touch screen display, is mounted in the apparatus 104. The monitor 110 is electrically connected to the system 100 for displaying a video image, such as the image of a person 112. As shown, the person 112 using the system (the user) in FIG. 1 is sitting in front of a monochrome background 114, which can be any desired color.

As shown in FIG. 1, the apparatus 104 also includes a payment-receiving device 116, such as a model OB-A4 device made by Rowe. The presently preferred embodiment uses the device 116 to accept currency as payment. However, other embodiments may accept other forms of payment, such as credit cards and tokens. Further, the apparatus 104 includes a printer 118 which is filled with blank sheets of card stock 120. Following deposit of an appropriate amount of currency in the device 116, or following other initiation, the image of the person 112 can be printed on one of the sheets 120 and dispensed into a printer bin 122. In one presently preferred embodiment, the printer 118 is a model SV6510 color printer available from Kodak.

Figure 2:
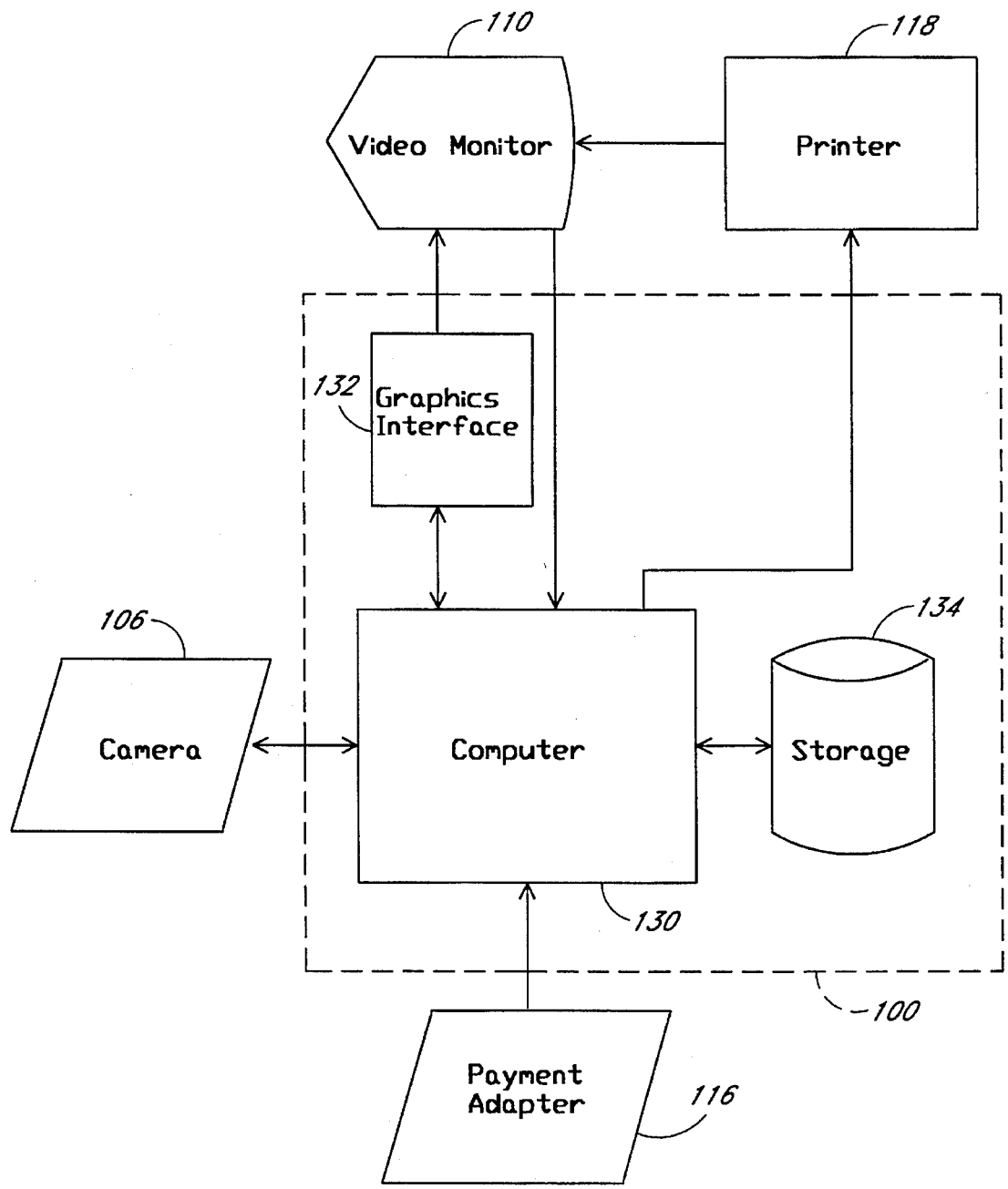
FIG. 2 is a block diagram illustrating the components of the imaging system of FIG. 1.

Referring now to FIG. 2, the system 100 is shown to include various electronic components. As indicated in FIG. 2, the system 100 includes a digital computer 130, preferably an IBM PC compatible having a 80386 microprocessor operating at 33 MHz and having eight Megabytes (Mb) of memory. As shown, the computer 130 is electrically connected to the video camera 106 and payment adapter 116 for receiving input signals therefrom. Also, the computer 130 is electrically connected to a suitable graphics or video interface card 132, preferably a Targa®+16–32, available from Truevision having one Mb of video memory. Targa is a registered trademark of Truevision, Inc. The video memory on the graphics interface card 132 may store, at various times, a digital representation of part of the person 112 (FIG. 1), a background scene, and instructions screen information for the user. The graphics interface card 132 in turn is electrically connected to the touch screen video monitor 110. The user of the system 100 can respond to prompts given by the system by either touching or touching and then moving, (dragging) a location on the video monitor screen. A RS232 (serial format) digital connection from the video monitor 110 to the computer 130 then provides for the transfers of the user input to the system 100.

The computer 130 connects to the printer 118 via a Centronics compatible interface. The printer 118 is further connected to the video monitor 110 via an analog interface. FIG. 2 also shows that if desired, an electronic storage device 134, such as a hard disk drive, can be connected to the computer 130. In the presently preferred embodiment, the hard disk 134 has a capacity of 120 Mb.

Figure 3:
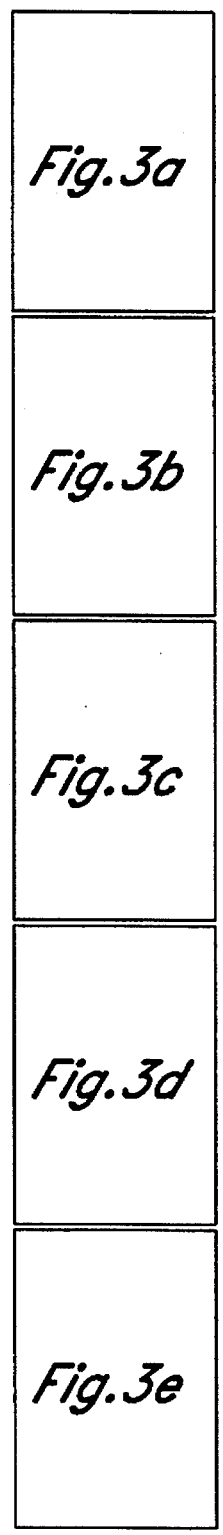
FIGS. 3a, 3b, 3c, 3d, and 3e are a top-level flow diagram of the imaging system, used in conjunction with the monochrome background of FIG. 1.
Figure 3A:
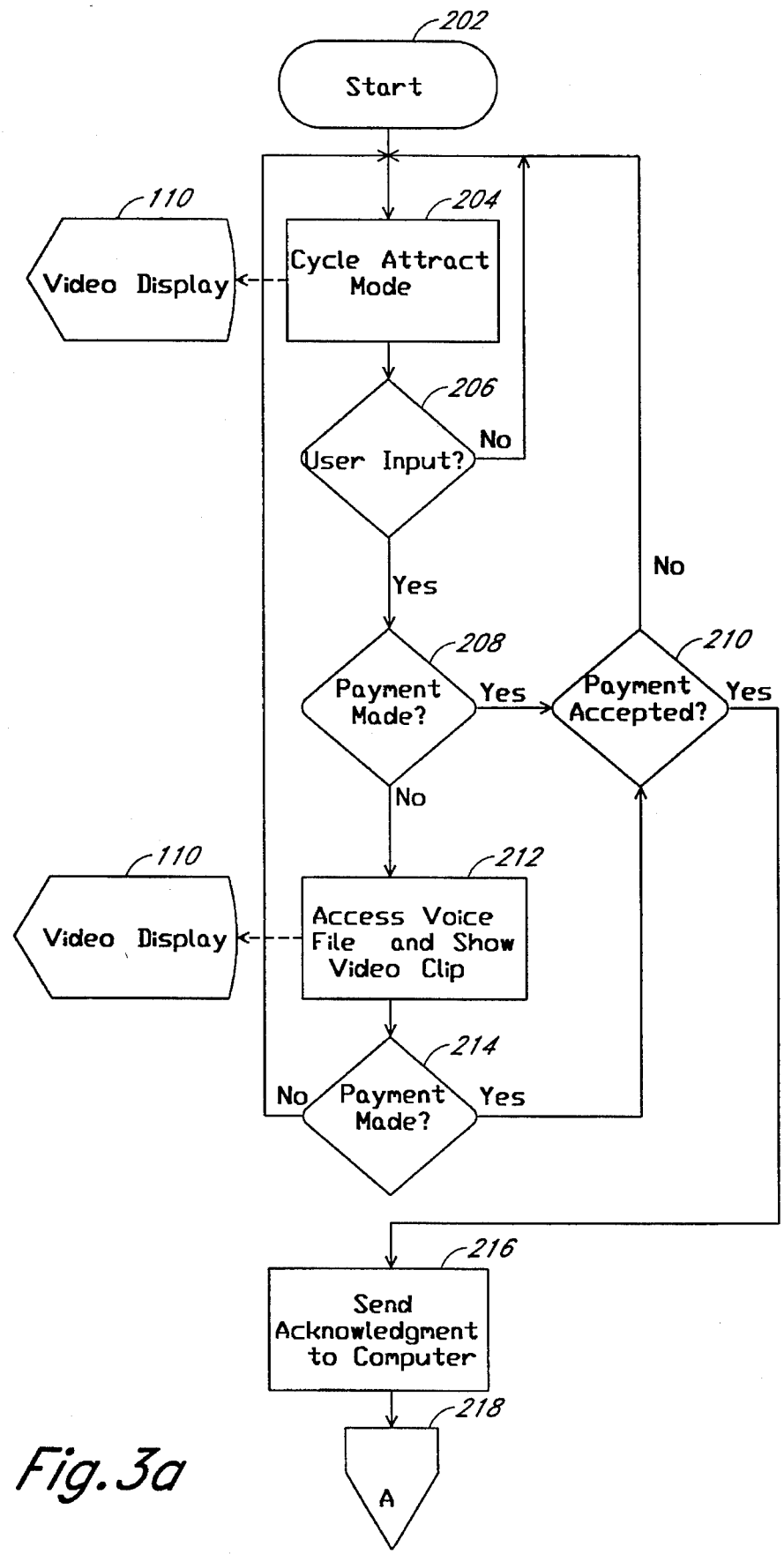
Figure 3B:
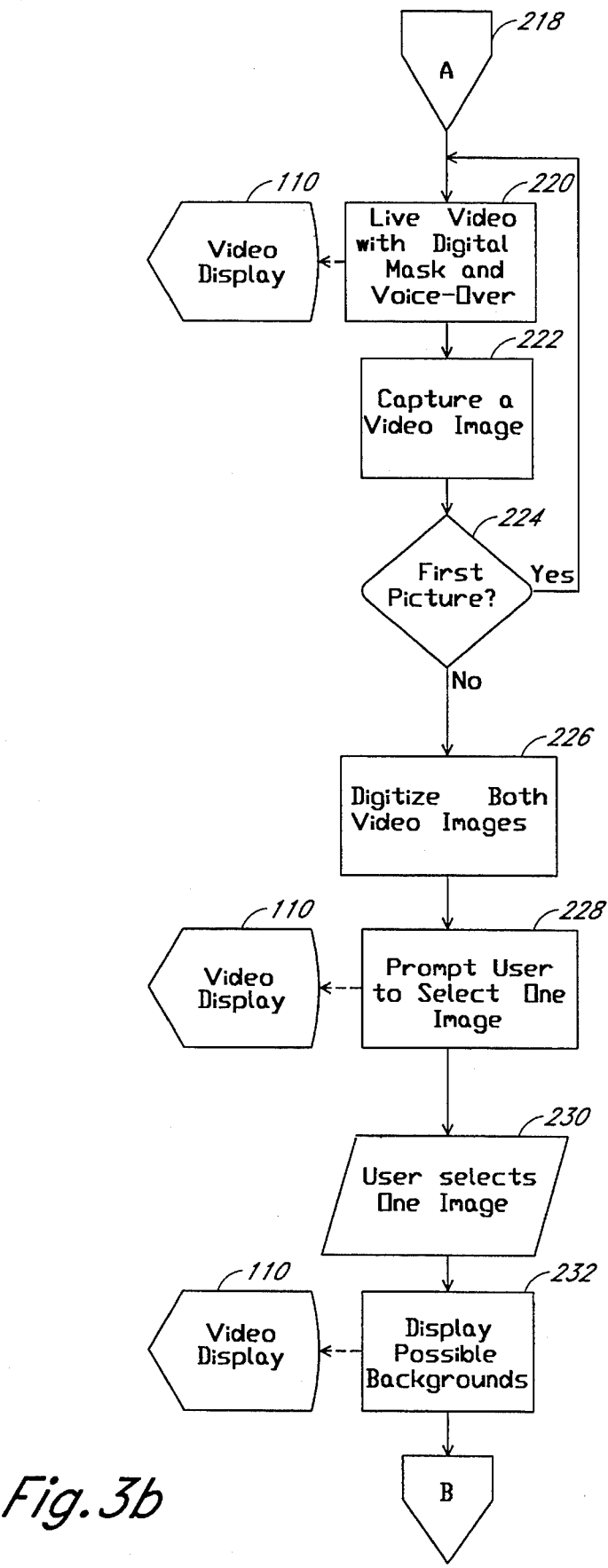

Now referring to FIGS. 1, 3a, 3b, 3c, 3d and 3e, the operation of one presently preferred embodiment of the imaging system 100 will be described. FIGS. 3a,b,c,d and e show the main or top-level control flow for the system 100. For the specific embodiment shown in FIG. 1, execution begins at a start step 202 of FIG. 3a and proceeds to a step 204 wherein a set of background scenes is displayed on the video monitor 110 (FIG. 1) to attract the attention ("attract" mode) of a potential user of the system 100. Periodically the computer 130 proceeds to a decision step 206 to check if someone has either touched the monitor screen 110 (FIG. 1) at an appropriate location or inserted payment into the payment adapter 116 (FIG. 1). If there is no user input at step 206, the computer 130 loops back to step 204 to continue the "attract" mode.

When there is user input at step 206, a decision step 208 then checks whether the user inserted payment into the payment adapter 116, in which case the computer 130 proceeds to a decision step 210. At step 210, the payment is tested to determine if it is the proper amount and is genuine. In the preferred embodiment, the system 100 accepts only a five dollar bill. However, a configuration file (not shown) used by the computer 130 allows a technician to alter the type of payment that is accepted, e.g., five one dollar bills. At step 210, if the payment is rejected for any reason, the computer loops back to step 204 to begin again.

If step 208 determines that the user payment has not been made, the computer 130 proceeds to step 212. At step 212, a voice file from a sound board in the computer 130 and voice driver activate to instruct the user to insert five dollars. Sound boards, such as Sound Blaster® from Creative Labs or Thunder Board™ from Media Vision are readily available. Sound Blaster is a registered trademark of Creative Labs, Inc. Thunder Board is a trademark of Media Vision, Incorporated. A video clip, having instructions on how to make payment, is stored on the storage disk 134 (FIG. 2) and is shown on the monitor screen 110 for about fifteen seconds. A check is made at a decision step 214 during the fifteen seconds to determine if payment has been made. If not, the computer loops back to step 204 to begin again. If payment is made at step 214, step 210 tests for correct payment. If the payment is correct, the computer moves to step 216 wherein a RS232 acknowledgement is sent to the computer 130. The main control flow leaves FIG. 3a through the off-page connector A 218 and resumes again at step 220 in FIG. 3b.

Figure 4A:
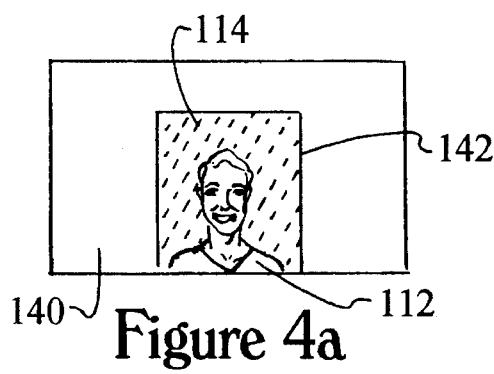
FIGS. 4a, 4b, 4c, 4d, 4e, 4f, 4g, and 4h are a sequence of images exemplary of those produced by the imaging system in performing the process steps shown in FIG. 3.

At step 220, live video with a digital mask 140 (FIG. 4a) is shown on the video display 110. A voice file from the computer 130 activates to give the user instructions. FIG. 4a illustrates what the user 112 may see on the video display 110. A box 142 delineates the edge of the digital mask 140 and defines a specific region where the head of the user 112 needs to be. Voice instructions prompt the user 112 to sit back or to raise or lower the provided stool (not shown) if the head is not within the box 142. When the user's head fits properly within the box 142, further processing is not necessary to shrink the head size. The digital mask 140 is a monochrome hue that is configurable by a technician.

Moving from step 220 to step 222 (FIG. 3b), the computer 130 activates the video camera 106 (FIG. 2) and a video signal is captured representative of an object, e.g., the person or user 112, and a background against which the object was imaged, e.g., the continuous hue background 114 (FIG. 4a). The computer 130 proceeds to a decision step 224 to determine if this is the first picture or image captured. If so, the computer 130 loops back to step 220 and step 222 to capture a second pose of the user 112. When step 224 determines that two images are captured, the computer 130 proceeds to step 226 wherein both video images are digitized. Of course, the system could be modified to receive and process only one or more than two images.

As shown in FIG. 4a, only a portion 142 of the camera view is digitized for processing by the computer 130. Ordinarily, the signal from the camera 106 is an analog signal, and is digitized into a two-dimensional matrix of pixels or image 144 (shown in FIG. 4b) by a video frame grabber on the Truevision Targa+card 132. In the presently preferred embodiment, the matrix of pixels 144 is 512×486, which is a digital video rectangular standard, although other matrix sizes can be used such as 640×480 or higher.

After both images have been digitized, the computer moves to step 228 wherein both images are displayed on the video display 110 (FIG. 1) and a voice file instructs the user 112 to pick one of the two images to be used for the rest of the process and to touch that image on the monitor screen 110 at step 230. The selected image 144 is stored in the video memory of the graphics interface card 132 (FIG. 2). After the user 112 makes the necessary selection at step 230, the computer 130 proceeds to step 232. At step 232, a set of different background scenes are displayed on the video display 110. For example, the background scenes could be of sports team members in various poses with their equipment, either individually or in groups. In the preferred embodiment, the computer 130 displays a preselected set of background scenes, but in other embodiments, the user may be able to select a different set to choose among, e.g., another sports team. Other embodiments may allow the user to pick which person, from a group of people in a scene, that the user would like his picture to replace. This choice may be done by pointing to a person, pointing to the name or title of a person, or other ways of selecting the location for replacement. The user 112 is prompted at step 232 to select one desired background scene by touching the appropriate scene on the video screen 110 (FIG. 1).

Figure 3C:
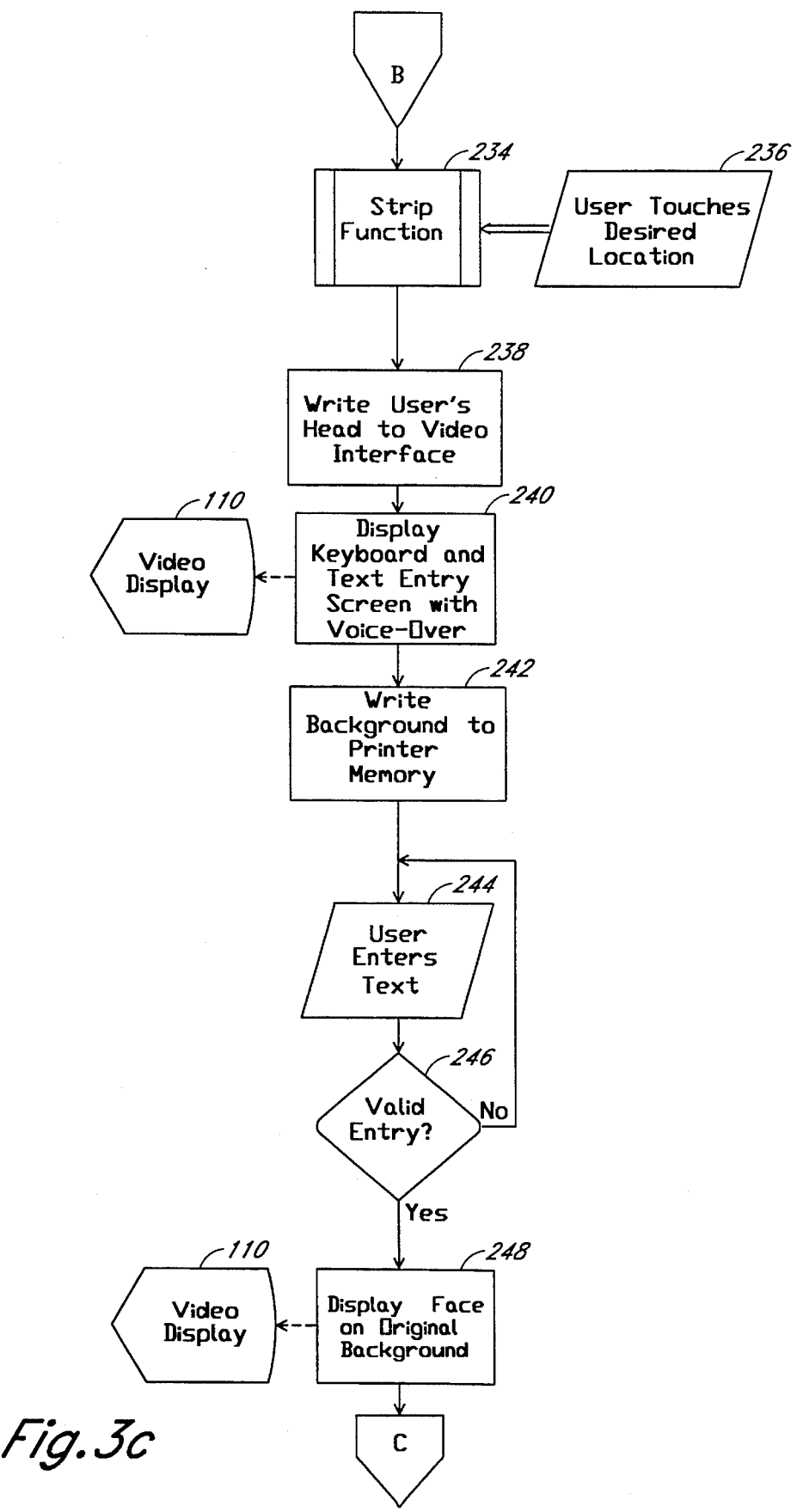

Proceeding through off page connector B to FIG. 3c, while the user is deciding which background scene to select, the computer executes a function 234 to strip portions of the image selected by the user at step 230. Function 234 will be explained in detail hereafter. When the user 112 touches the monitor screen 110 (FIG. 1) at step 236 to select the desired background scene, an interrupt is sent to the computer 130 to denote that the selection has been made. In the meantime, when the function 234 returns from execution, the computer 130 moves to step 238 wherein the results of function 234, i.e., the image of the user's head and neck along with the stripped background pixels, is written to the video memory on the graphics interface card 132 (FIG. 2). When the interrupt indicating the selection of the background scene from step 236 is received by the computer 130, the control flow 200 continues at step 240.

Figure 4B:
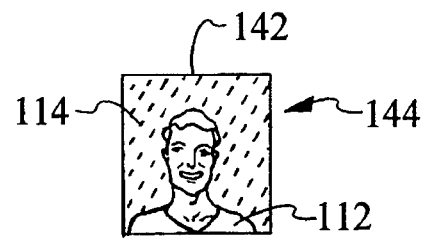
Figure 4C:
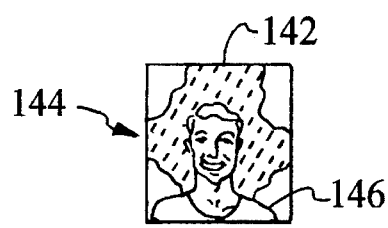
Figure 4D:
Figure 4E:
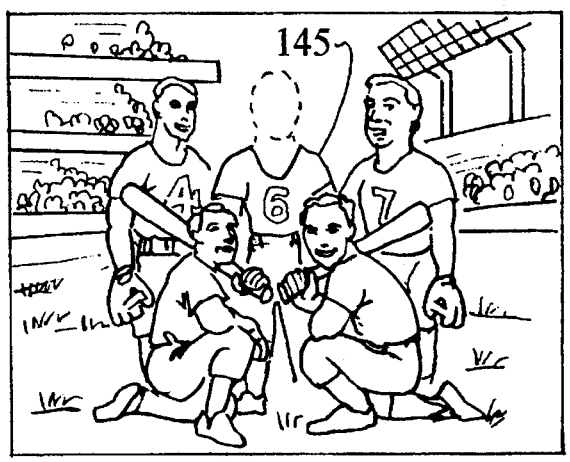

At step 240, a personal computer keyboard and text entry screen along with instructions to the user 112 are displayed on the video monitor 110. A voice file from the computer 130 activates to give the user oral instructions. The user is prompted to enter text, such as the user's name or another name, to personalize the final composite image. While the user 112 is thinking about the text to enter, the computer 130 moves to step 242 where the background scene selected by the user at step 236 is sent to a frame store in a memory of the printer 118. As shown in FIG. 4e, in the preferred embodiment, the background scene sent to the printer 118 will be missing the head and neck of a preselected person 145 in the original computer-stored scene. In other embodiments, the person in the original computer-stored background scene that is chosen to be replaced by the user (from multiple people in the scene) will be sent to the printer frame store without the head and neck. While the background is being written to the printer frame store at step 242, the user can press locations on the touch screen monitor 110 to choose characters composing the desired text at step 244. A location on the touch screen monitor 110 is provided to indicate completion of the text upon which the computer proceeds to a decision step 246. At step 246, a check is done to determine if a valid text entry has been made. If not, the computer 130 loops back to step 242 where locations are provided on the touch screen monitor 110 to correct the text entry.

After a valid entry has been determined at step 246, the computer 130 moves to step 248 wherein the image of the face (FIG. 4b) selected by the user 112 at step 230 is displayed on the video monitor 110 along with the original monochrome background present when the user's picture was taken. After completion of step 248, the main control flow 200 leaves FIG. 3c through the off-page connector C and resumes at step 252 in FIG. 3d.

At step 252, the computer 130 draws a horizontal reference line on the video display 110 and prompts the user 112 to touch and drag (move while touching) the reference line over the pupils of the eyes. At step 254 the user 112 centers the horizontal line over the pupils and presses a button location on the touch screen monitor 110 to signal completion of the step. Moving from step 254 to step 256, the computer 130 draws a reference cross on the video display 110 and prompts the user 112 to touch and drag the reference cross to the bottom of the chin and centered on the neck. At step 258 the user 112 centers the reference cross on the middle of the neck and bottom of the chin, and then presses a button location on the touch screen monitor 110 to signal completion of step 258. The monitor 110 has a display similar to FIG. 4g but including the monochrome background 114.

Figure 3D:
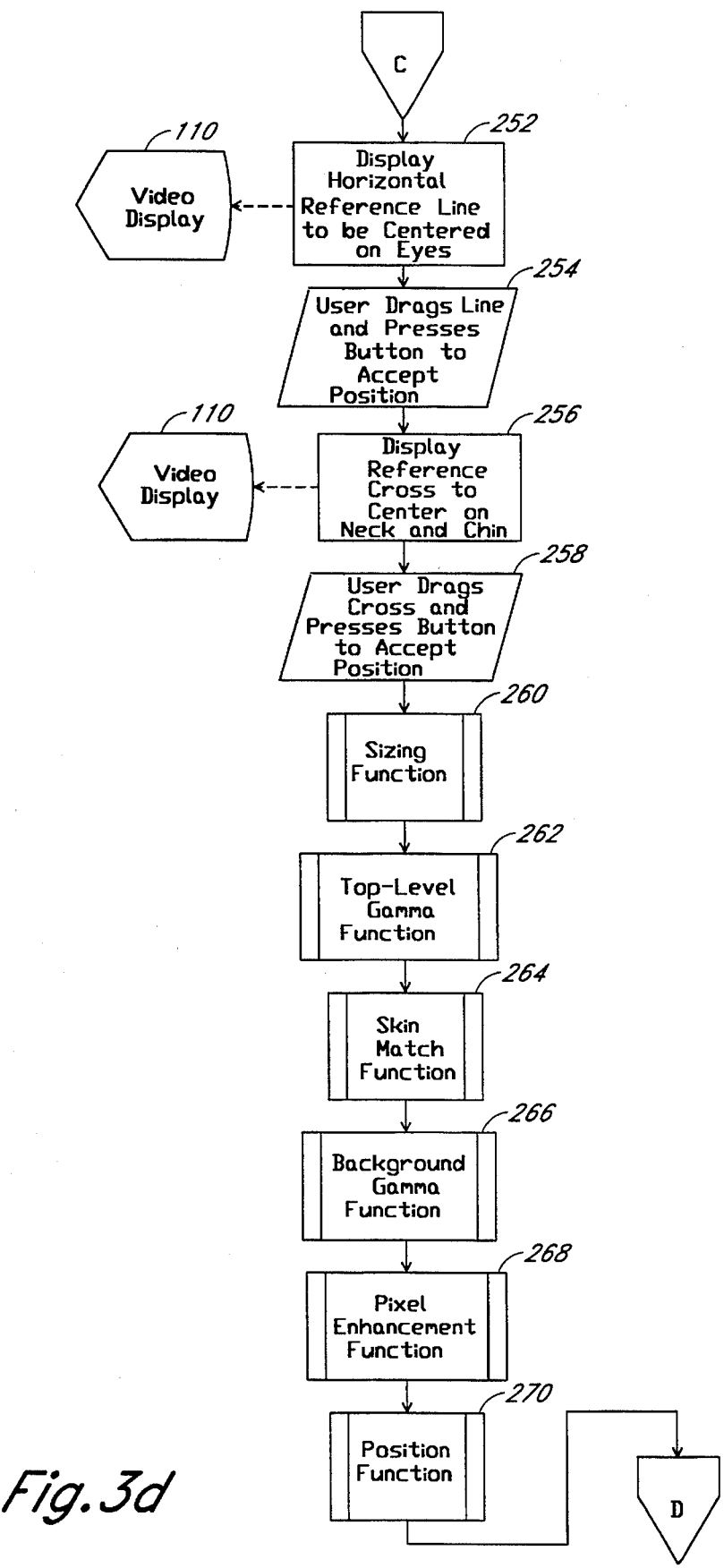

Upon completion of step 258 in FIG. 3d, the computer calls a function 260 to match the size of the user's face, as determined by steps 252 through 258 above, to the size of the face to be replaced of the previously selected person 145 (from step 236). The function 260 will be described below after the remainder of the main control flow 200 is described. After the function 260 returns, the computer calls a function 262 to change various gamma values.

The overall gamma includes many attributes: hue (H), saturation (S), lightness (L), intensity (I), contrast (C), red (R), green (G), blue (B), and combinations thereof such as HSL, HSI, HSC and RGB. The top-level gamma function 262 can change any combination of the gamma attributes by: pixel, area of the image or the entire image. For example, the user can change the hue, saturation and intensity of an area of the image. Other operations done by the top-level gamma function include: strip, fuzz, blend, transparency/opacity, and pixel enhancement. These functions, and the apparatus and method for accomplishing them, are disclosed hereafter in this document. For example, the user could choose to only enhance the pixels of a particular hue of blue, and blend the pixels of a certain saturation level. Any combination of gamma attributes and operations could be done.

To more fully understand the application of the top-level gamma function 262, as well as other aspects of the invention, one should appreciate that the composite final image is handled by the computer 130 on a layer basis, where each pixel on a layer has X, Y Cartesian coordinates. Thirty two layers are used in the presently preferred embodiment, but in other embodiments the numbers of layers may be greater, with the maximum number only being limited by the size of the memory. The final composite image is viewed with the layers stacked on top of each other. The layer number provides a Z coordinate with the original background scene having a Z coordinate of zero. Objects in the original background scene can be chosen to have a higher or the same priority or similar and hence be assigned to a higher numbered layer and Z coordinate. Other objects, such as the image of the user 112, can be assigned a Z coordinate and be placed in front of or behind objects (depending on their Z coordinate) from the background scene which were previously moved from layer zero.

Figure 4F:
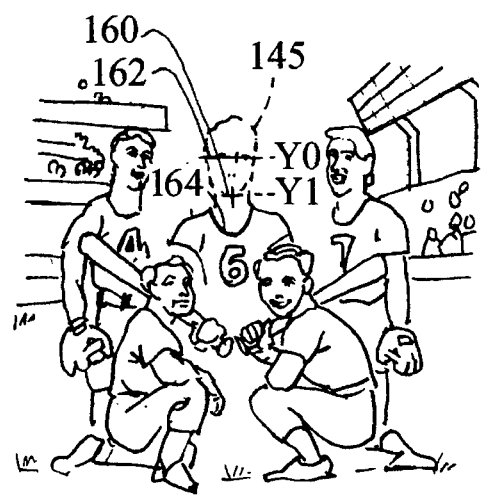
Figure 4G:
Figure 4H:
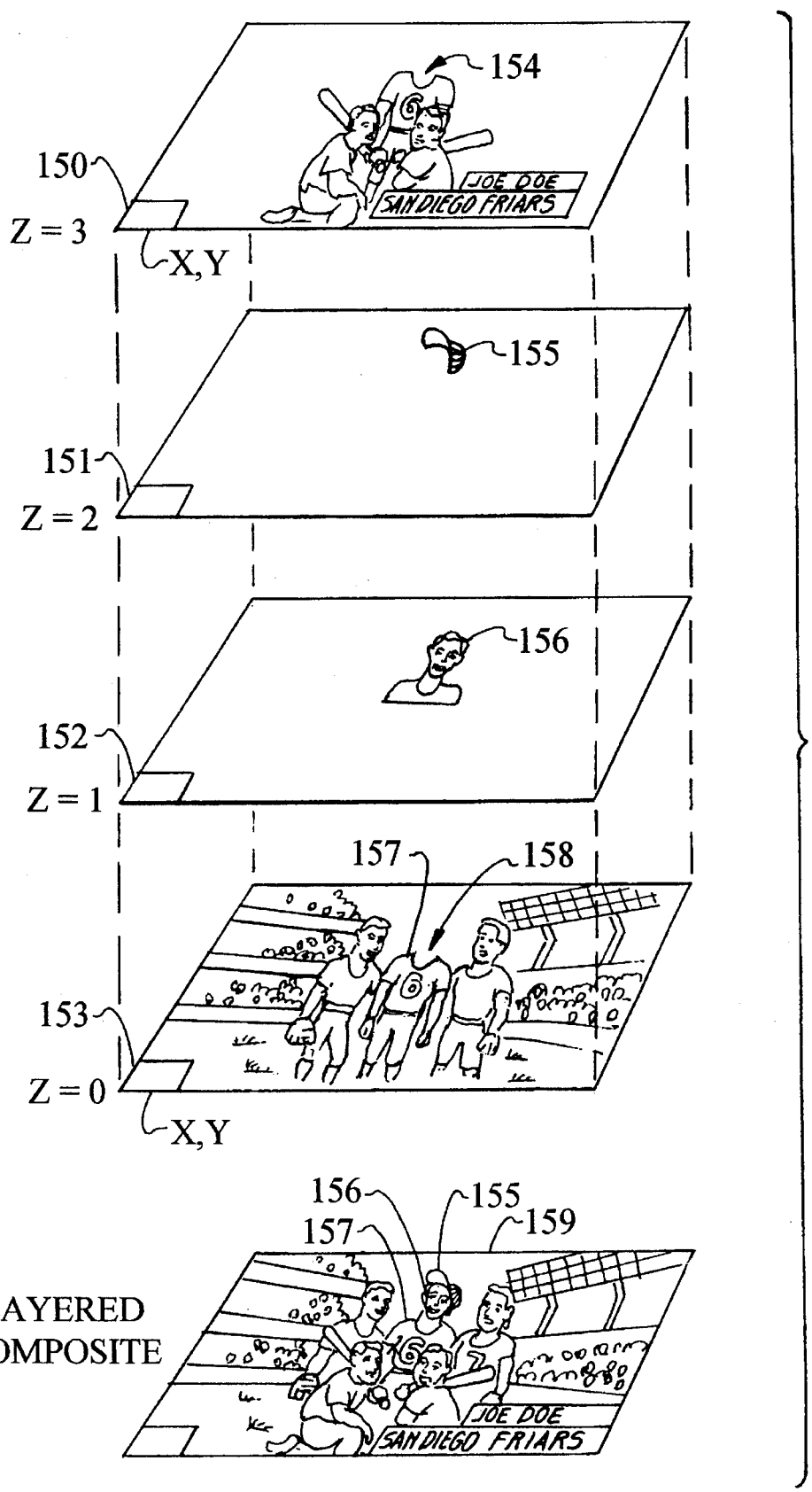

As an example, consider a final composite image having four layers (Z=0 to 3) as shown in FIG. 4h. If a pixel 150 at a particular X, Y cartesian coordinate address of the top layer (Z coordinate=3) has an attribute of transparent, then a pixel 151 at the same X, Y coordinate on the layer below (Z=2)

will be seen if the attribute is opaque. However, if the pixel 151 of layer Z=2 is also transparent, then a pixel 152 at the same X, Y coordinate on layer Z=1 will be seen if it has an attribute of opaque and so on. For a pixel 153 on the background or Z=0 layer to be seen, all pixels on higher numbered layers for that X, Y coordinate address must all have an attribute of transparent.

In further explanation of FIG. 4h, several objects have been moved from the original background layer (Z=0): two kneeling players 154 to the top layer (Z=3) and a hat 155 to the Z=1 layer. The head of the user 112 is placed as an object 156 on the Z=2 layer. The person 157 in the background scene whose head is to be replaced has the head area 158 set transparent. The final layered composite image 159 illustrates the user's head 156 wearing the hat 155 on the body of the person 157.

All the previously mentioned gamma attributes and operations can be done on a layer by layer basis. For example, the user can strip pixels of a particular hue of red from layer 1, 2 and 3, followed by sharpening pixels of a certain value of intensity on layers 0 and 1, and finishing with fuzzing all pixels with a desired saturation level on layers 1 and 3. Details of the top-level gamma function 262 will be given below.

After a return from the function 262, the computer 130 calls the function 264 to match the skin of the user 112 to the skin of the selected background person 145 (FIG. 4e). The function 262 will be described below.

After the function 264 returns, the computer 130 calls the function 266 to match the gamma of the user image and the gamma of the selected background scene (FIG. 4e), as selected at step 236. The function 266 will be described below.

In the presently preferred embodiment, after the function 260 returns, the main control flow 200 will move to function 268 and bypass functions 262, 264, and 266 (this bypass is not shown in FIG. 3d). However, it can be appreciated that the functions 262, 264, and 266, are included in other embodiments.

After the function 266 returns, the computer 130 calls the function 268 for pixel enhancement. The function 268 will be described below.

After the function 268 returns, the computer 130 calls a function 270 to position the object into the selected background scene (FIG. 4e). The function 270 will be described below.

Figure 3E:
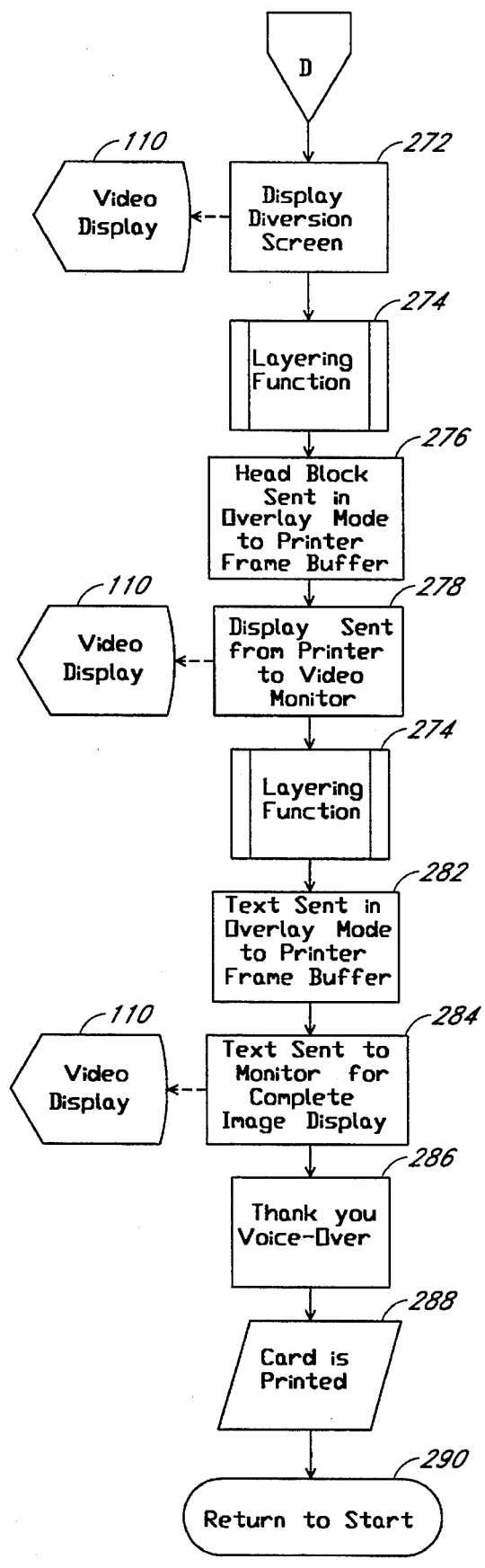

Upon return from the function and proceeding through off age connector d to FIG. 3e, the computer 130 will display, at step 272, a diversion screen, e.g., a team logo, on the video monitor 110 along with a message that the final image will be ready soon. While the diversion screen is displayed, the computer 130 proceeds to step 274. At step 274, the computer 130 calls a function to layer the image of the user's head and neck into the background scene chosen at step 236. The function 274 will be described below.

After the function 274 returns, at step 276, the computer 130 sends the user's head and neck block, as processed by the layering function, to the frame buffer of the printer 118 in overlay mode. In overlay mode, the block currently sent to the frame buffer overwrites the previous information in the buffer starting at a defined location associated with the current block. The information previously in the frame buffer outside of the area for the block being overlaid remains unchanged. The final composite image is built up at the printer memory. Previously, the background scene was sent to the memory of the printer 118 at step 242.

Upon completion of step 276, the computer 130 moves to step 278 where the composite image, which is almost complete, is sent from the printer memory to the video display 110. The computer 130 then proceeds to call the layering function 274 again to layer the personalization text that the user entered at step 244. When the layering function 274 returns, the computer 130 proceeds to step 282 where the personalization text is sent in overlay mode to the frame buffer of the printer 118. At this point, the final composite is complete in the printer memory. The computer 130 moves to step 284 where the personalization text is sent from the printer memory to the video display 110 to show the final composite image to the user 112 for a few seconds. As the final composite image is being displayed, the computer 130 moves to step 286 where a voice file from the computer 130 activates to thank the user 112 for using the system 104. The computer 130 then signals the printer 118 at step 288 to print the final composite image on the printer card stock 120 and release the printed product into the printer bin 122. After the final composite image is printed at step 290, the main control flow 200 returns to step 202 and begin the whole process again.

Figure 5:
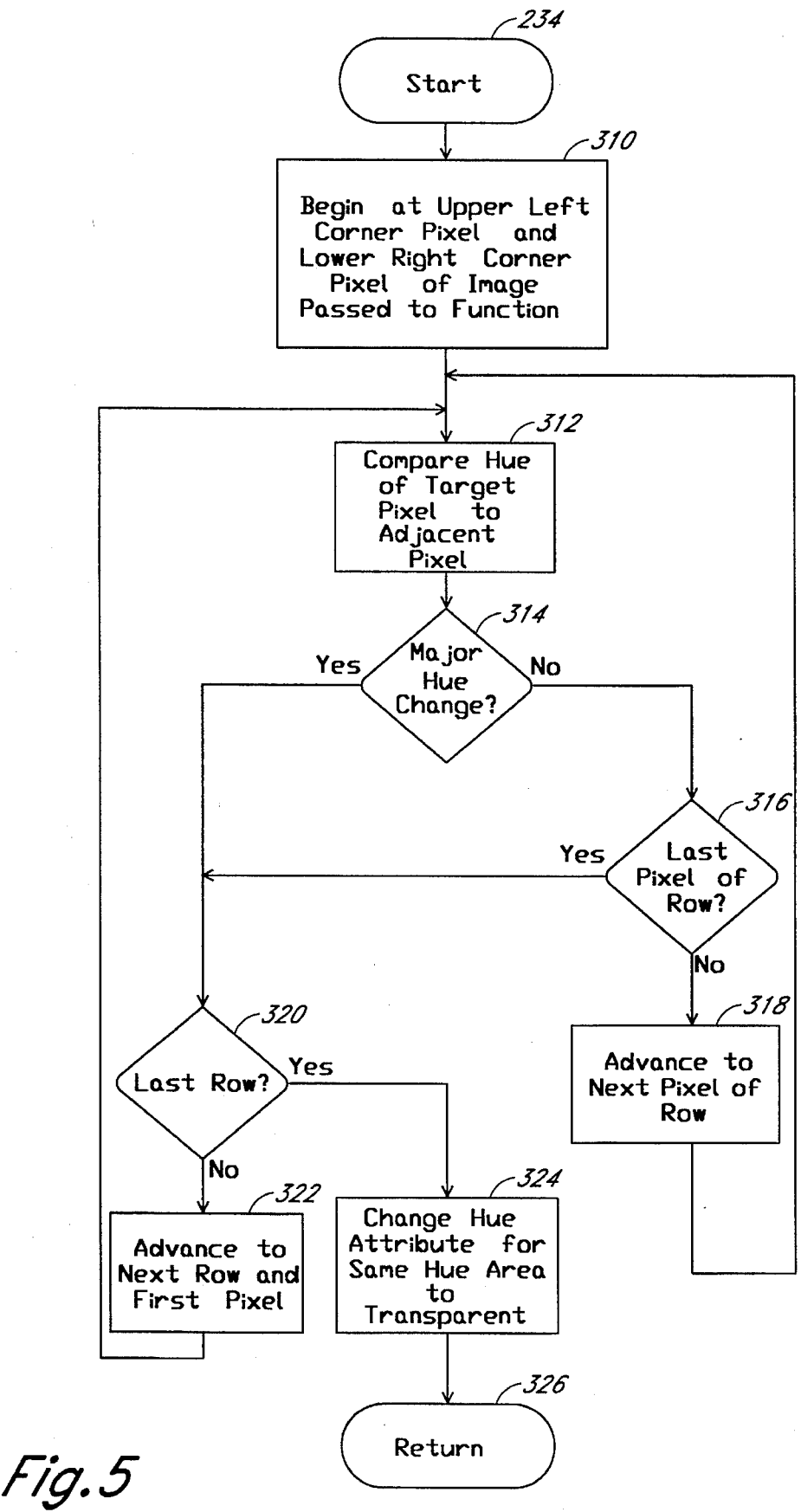
FIG. 5 is a flow diagram of the strip function defined as block 234 in FIG. 3.

Now referring to FIG. 5, the function 234 (FIG. 3c) for stripping portions of an image will be described. The function 234 starts and moves to a step 310 wherein the computer 130 selects the upper left and lower right pixels of the video image 144 passed to the function as shown in FIG. 4b. It is to be understood, however, that the principles of the process described below, which is executed by the computer 130, can be applied when selecting only a single pixel as a starting point or when selecting more than two pixels as simultaneous starting points. For example, as shown at FIG. 4c, the computer 130 could execute the process described below starting at all four corners of the image 144 simultaneously. The process described below can be coded in any suitable computer language, e.g. C.

Accordingly, for disclosure purposes, the process below will be described with reference to use of the upper left pixel of the digitized video image 144 as the starting point. It will be appreciated that the principles of the process will be substantially identical for other starting points, e.g., the lower right pixel of the video image 144, including instances wherein the computer 130 starts at two or more points simultaneously. The control of the parallel processing for multiple processing regions is known to those skilled in the technology.

Step 312 indicates that the computer 130 compares the gamma of the upper left pixel (target pixel) with the gamma of the next pixel in the top row of the video image 144 (FIG. 4b). As is used in the technology, the gamma of a particular pixel is a numeric value that refers to one or more of the particular data attributes which characterize the pixel. For example, some video image pixels have attributes that relate to the hue, intensity, lightness, saturation, and contrast of the portion of the image represented by the pixel. Accordingly, such pixels will have respective numeric "gammas" that represent each one of the above-listed attributes of the particular pixel.

For purposes of the present invention, the gammas that are compared between pixels are the hue gammas of the pixels, although other gammas may be used. In the present embodiment, the hue gamma of each pixel is an integer value from zero (0) to two hundred fifty five (255), with the hue gamma value indicating the hue of the portion of the image represented by the pixel. In the event that the video image is in black-and-white, the hue gamma of a pixel will represent the shade of gray of the pixel, or a gray scale value.

It will accordingly be appreciated that in the case of the continuous hue background 114 (FIG. 4b), adjacent background pixels will have substantially identical hue gamma values, with the particular value depending on the color of the background 114. For example, if the background was defined as 255, e.g., saturated blue, then the background pixels would typically not deviate more than 20 to 40. Thus, the computer 130 assumes that the upper left pixel of the video image 144 is a background pixel, and uses this pixel as a standard pixel. The computer 130 compares its hue gamma with the hue gamma of the immediately adjacent pixel (which can accordingly be considered the test pixel) that is in the same row as the target pixel, to determine whether the immediately adjacent pixel (i.e., test pixel) is also a background pixel. This step is represented at a decision step 314 in FIG. 5.

More specifically, as indicated at decision step 314, the computer 130 compares the difference between the hue gammas of the upper left corner pixel (i.e., the target pixel) and the immediately adjacent pixel (i.e., the test pixel) with a predetermined difference. When the predetermined difference is greater than the difference between the hue gammas of the two pixels, indicating that the test pixel has approximately the same hue as the target pixel and is therefore flagged as a background pixel to be acted upon later, the computer 130 proceeds from step 314 to a decision step 316 in FIG. 5. At step 316, the computer 130 determines whether the test pixel is the last pixel in the row. If there are more pixels in the row, the computer 130 advances to step 318, wherein the computer 130 sets the old test pixel to be the new target pixel, and selects the next pixel in the row as the new test pixel. The computer 130 then continues to step 312 to determine the difference between the hue gamma of the target pixel and the hue gamma of the test pixel, as described above, and compares this difference to the predetermined difference at decision step 314.

On the other hand, when the computer 130 determines that the test pixel is the last pixel in the row at decision step 316, the computer 130 proceeds to a decision step 320 that determines whether the last row of the image 144 (FIG. 4b) has been reached. Stated differently, at decision step 320, the computer 130 determines whether the row which had been under test is the bottom row of the digitized image, if the particular process is that portion of the processing that started at the upper left corner pixel of the digitized image. If, on the other hand, the particular process is that portion of the processing that started at the lower right corner pixel of the digitized image, the computer 130 determines whether the row that had been under test is the top row in the digitized image. If not, the computer 130 proceeds to step 322 wherein the computer 130 sets the target pixel to be the last pixel in the row and the test pixel to be the first pixel in the next immediately lower row. The computer 130 then loops back to step 312 to begin comparing the pixels of the next row. The computer 130 resumes the gamma test comparison described above. Thus, the computer 130 reads and tests the pixels of the background component of the video image 144 (FIG. 4b) in a pixel-by-pixel, row-by-row sequence.

When the computer 130 determines, at decision step 314, that the difference between the target pixel and the pixel under test exceeds the predetermined difference, indicating that the test pixel is not a background pixel and is therefore representative of an edge 146 of the image of the user 112 (FIG. 4c) which has been imaged against the monochrome background 114 (FIG. 1), the computer 130 stores the location of the test pixel in memory. Stated differently, the computer 130 maps the test pixel as a portion of the edge 146. As indicated in FIG. 5, the computer 130 then proceeds to step 320 and resumes processing as described above.

The computer 130 follows the process described above, working simultaneously from the upper left and lower right hand corner pixels, until the computer 130 determines that no more pixels remain to be tested, as indicated by a positive test at decision step 320. At the point wherein no more pixels remain to be tested, the computer 130 moves to step 324, wherein the computer 130 "floods" the background (i.e., turns all pixels that were outside the edge 146 transparent) by setting the hue gamma of the background pixels to zero (0). In other words, the computer 130 removes portions of the image 144 (FIG. 4b) which are represented by pixels that were designated as background pixels 114 in step 314. Alternatively, each background pixel could be turned transparent as soon as the computer 130 determines that the particular pixel is indeed a background pixel. The computer 130 then moves to step 326 and returns to the calling program. At this point in the process, the digitized video image 144 appears as schematically shown at FIG. 4d.

Thus, the computer 130 effectively removes substantially only the portion of the video image 144 that is outside the edge 146 (i.e., the background component of the image), and leaves intact the entire portion of the image 144 that is inside the edge 146 (i.e., the object component of the image). Consequently, portions of the image 144 inside the edge 146 can have the identical hue as the background 114, without being removed from the image 144. Further, no particular, predetermined hue is required to be used as the background hue, in contrast to the chroma-key technology. Instead, any hue may be used as the background hue.

From the disclosure above, it will be appreciated that the predetermined hue gamma difference is selected to be sufficiently large to avoid edge mapping due to a background test pixel that has a hue gamma which is marginally offset from the hue gamma of the target pixel. On the other hand, the predetermined hue gamma difference is selected to be sufficiently small to accurately detect the presence of an object edge pixel, even when the edge pixel has a hue gamma value that is relatively close to the value of the background hue gamma. The precise value of the predetermined hue gamma difference can vary from application to application, depending upon lighting conditions, location, subject matter, etc. In one presently preferred embodiment, the predetermined hue gamma difference is 20.

Figure 6:
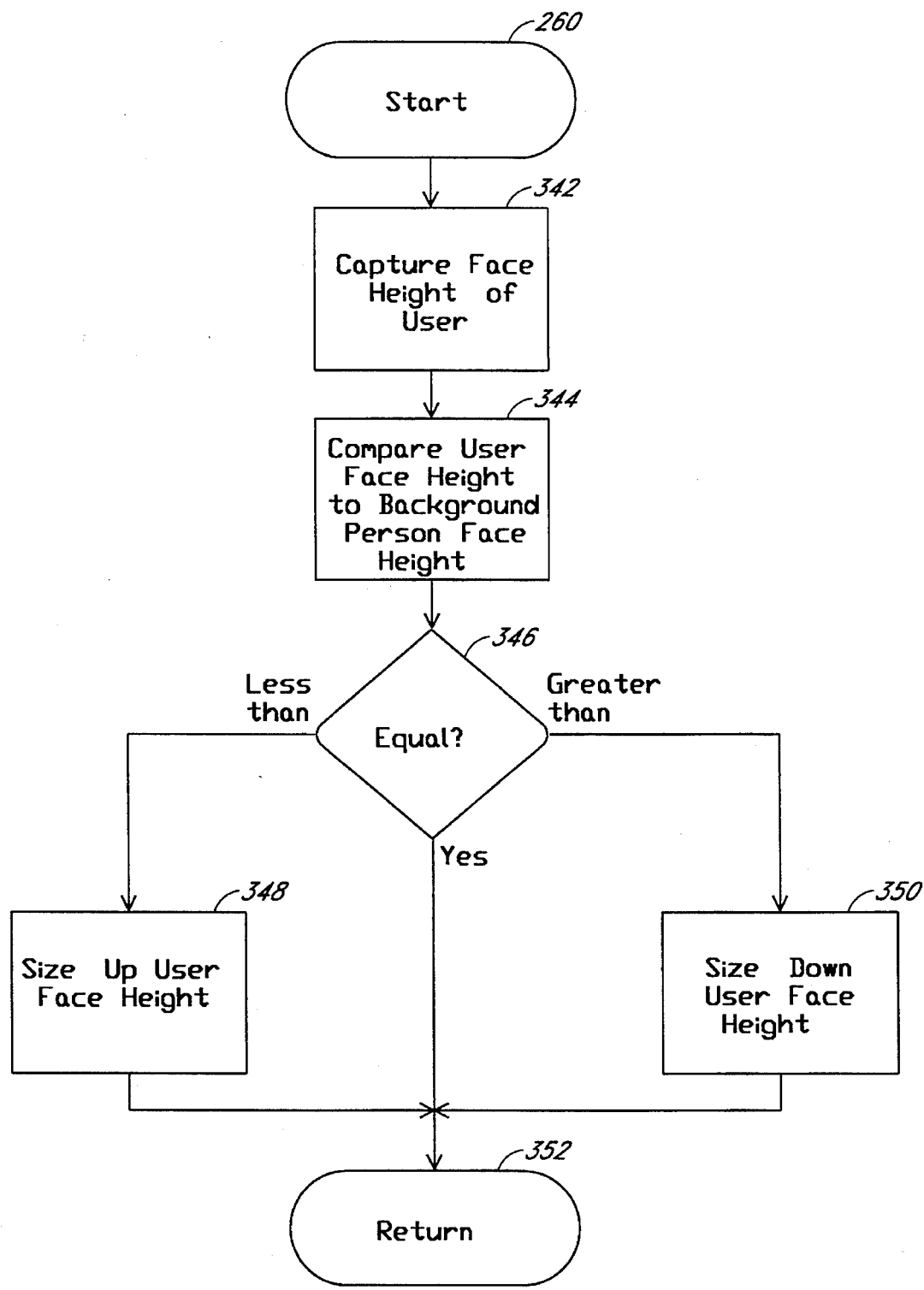
FIG. 6 is a flow diagram of the sizing function defined as block 260 in FIG. 3.

Referring to FIG. 6, the function 260 (FIG. 3) for matching the size of the object to the size of the selected background object will be described. In the preferred embodiment, the object is the head and neck of the user 112, and the selected background object is the head and neck of the background person 145 (FIG. 4e) that will be replaced.

The function 260 starts and moves to a step 342 wherein the computer 130 captures the face height of the user 112. Referring to FIG. 4f, a portion of the background scene chosen by the user at step 236 (FIG. 3c) is shown, including the background person 145 whose face and neck (shown by dashed lines) is to be replaced. A horizontal line 160 is centered over the pupils of the eyes at a coordinate $Y_0$. A cross symbol 162 is centered over the middle of the neck and at the bottom of the chin at a coordinate $Y_1$. A line 164 demarcates the edge of the clothing, e.g., a uniform, from which point downward the user's neck is assigned a lower priority layer than the uniform. Thus, the uniform may be seen to cover part of the user's neck in the final composite image. The face height is the absolute difference between the two coordinates $Y_0$ and $Y_1$. The face height information of the background person, or for each background person in background scenes where a choice of multiple people is given, has been previously calculated and stored in a file header for a file that contains the image of the background scene. The file header format for the presently preferred embodiment is encrypted and is unique to this embodiment. The header is encrypted by XORing with a pseudo-random function. The file header contains RGB information, location of the eyes, location of the chin (cross symbol), the face height, and so on to define the characteristics of the face or object in the file image.

Referring to FIG. 4g, an image of the user's face and neck is shown. A horizontal line 170 is centered over the pupils of the eyes at a coordinate $Y_0'$. A cross symbol 172 is centered over the middle of the neck and at the bottom of the chin at a coordinate $Y_1'$. The user's face height is the absolute difference between the two coordinates $Y_0'$ and $y_1'$. The user's face height information is stored in a file header for a file that contains the image of the user's head and neck.

Now returning to FIG. 6, after the completion of step 342, the computer advances to step 344. At step 344, the computer 130 compares the user's face height captured at step 342 to the face height of the background person at the location chosen by the user at step 236 (FIG. 3c). If, at a decision step 346, the face height of the user is less, e.g., the user 112 is a child, the computer moves to a step 348. At step 348, the computer 130 will proportionately size up the image of the user's face and neck until the face height of the user equals the face height of the background person, and then returns at step 352. If, at a decision step 346, the face height of the user 112 is greater than that of the background person, the computer 130 moves to a step 350. At step 350, the computer 130 will proportionately size down or up the image of the user's face and neck, until the face height of the user equals the face height of the background person, and then returns at step 352. However if, at a decision step 346, the face height of the user 112 is equal to that of the background person, the computer 130 returns at step 352 to the calling main flow 200 (FIG. 3).

Figure 7:
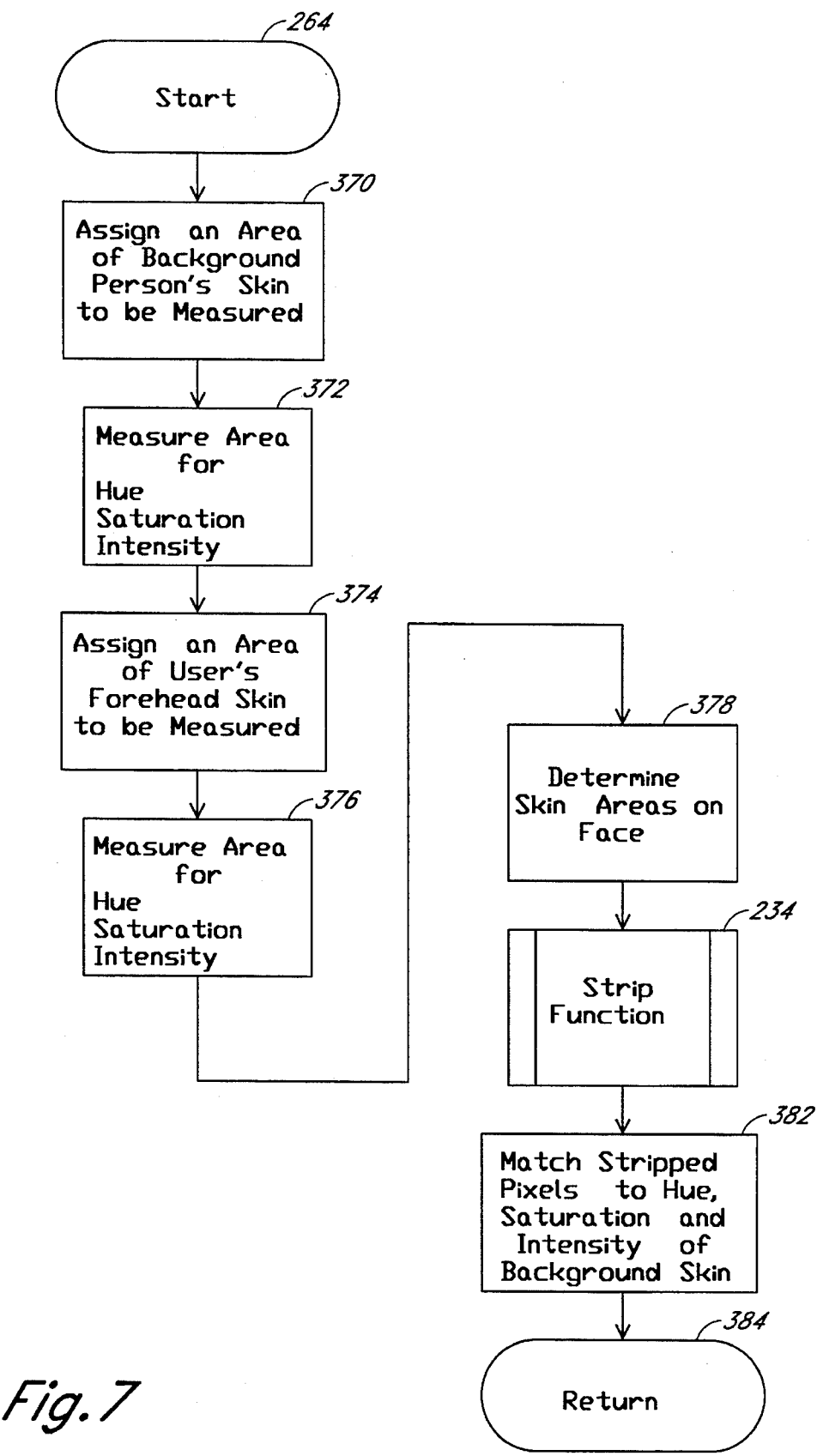
FIG. 7 is a flow diagram of the skin match function defined as block 264 in FIG. 3.

Referring to FIG. 7, the function 264 (FIG. 3d) for matching the object or user person's skin to the skin of the selected background person 145 (FIG. 4e) will be described. The function 264 starts and proceeds to a step 370 wherein an area of the background person, that is to be replaced in the composite image, is assigned to be measured. Moving to step 372, the computer 130 measures three gamma attributes in the assigned area: overall hue, overall saturation, and overall intensity. Next, at step 374, the computer 130 assigns an area of the user's skin to be measured. The computer 130 knows where the eyes of the user 112 are on the image shown in FIG. 4g because of the line 170. The computer assigns the area on the forehead of the image of the user 112 just above the eyes. This area is then measured at step 376 for the same attributes: hue, saturation, and intensity. Proceeding to step 378, the computer 130 then determines the skin areas of the image of the user's face by using the attributes measured at step 376, which describe the user's skin, to be compared against upon calling the strip function 234. The function 234, in this call, will flag the skin pixels of the image of the user's face. The hair, eyebrows, eyes, lips, beard and/or mustache (if present), and so forth will not be flagged. Then, upon return from the function 234, the computer 130 proceeds to step 382. At step 382, the flagged skin pixels identified by the function 234 are set to the values of the attributes measured at step 372 of the background person's skin, and then the function 264 returns at step 384 to the calling main flow 200 (FIG. 3).

Figure 8:
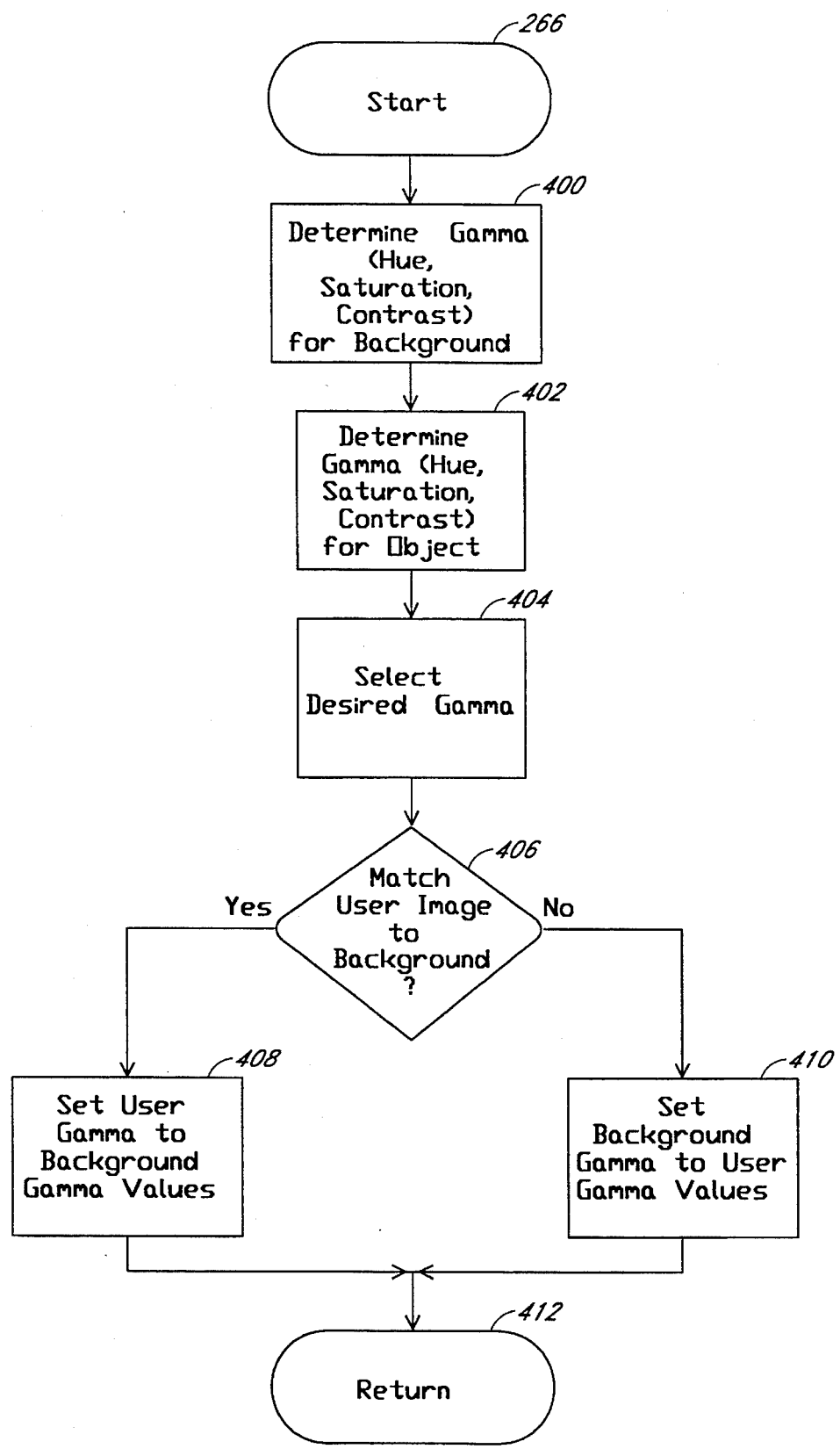
FIG. 8 is a flow diagram of the background gamma function defined as block 266 in FIG. 3.

Referring to FIG. 8, the function 266 (FIG. 3d) for matching the object or user gamma to the gamma of the selected background scene (FIG. 4e) will be described. The function 266 can make it appear as though the object were imaged under the same lighting conditions as the background into which the object will be digitally layered. The function 266 starts and proceeds to a step 400 wherein the computer 130 determines the type of lighting used for the background scene (FIG. 4e). The lighting conditions are determined by measuring the gamma attributes of hue, saturation, and contrast at a software determined area of the background scene. Moving to step 402, the computer 130 measures the same gamma attributes as at step 400, but for the user image 144 (FIG. 4d).

Next, the computer 130 proceeds to step 404 wherein the computer 130 chooses which lighting condition is desired. In other words, the computer 130 at step 404 determines whether the hue gamma of the object will be changed to match the hue gamma of the background or whether the hue gamma of the background will be changed to match the hue gamma of the object. This determination by the computer 130 can be accomplished in response to an interactive command by the user of the system 100, i.e., the user of the system 100 can decide whether he wishes to change the lighting condition of the background scene to match the lighting conditions under which he was imaged, or whether he wishes to change the apparent lighting conditions under which he was imaged to match the lighting conditions of the background scene. Furthermore, the apparent lighting conditions of the object and background scene can both be changed to match a third lighting condition if desired (this choice is not shown in FIG. 8).

From step 404, the computer 130 proceeds to a decision step 406 wherein the computer 130 determines whether the object gamma is to be changed. If so, the computer 130 proceeds to step 408 wherein the computer 130 sets the gamma attribute values for hue, saturation, and contrast of the object to equal the background scene gamma attribute values for hue, saturation, and contrast. Otherwise, the computer 130 proceeds to step 410 wherein the computer 130 sets the gamma of the background scene to equal the gamma values of the object. Upon completion of either step 408 or step 410, the computer 130 proceeds to step 412 and returns to the main calling flow 200.

Figure 9:
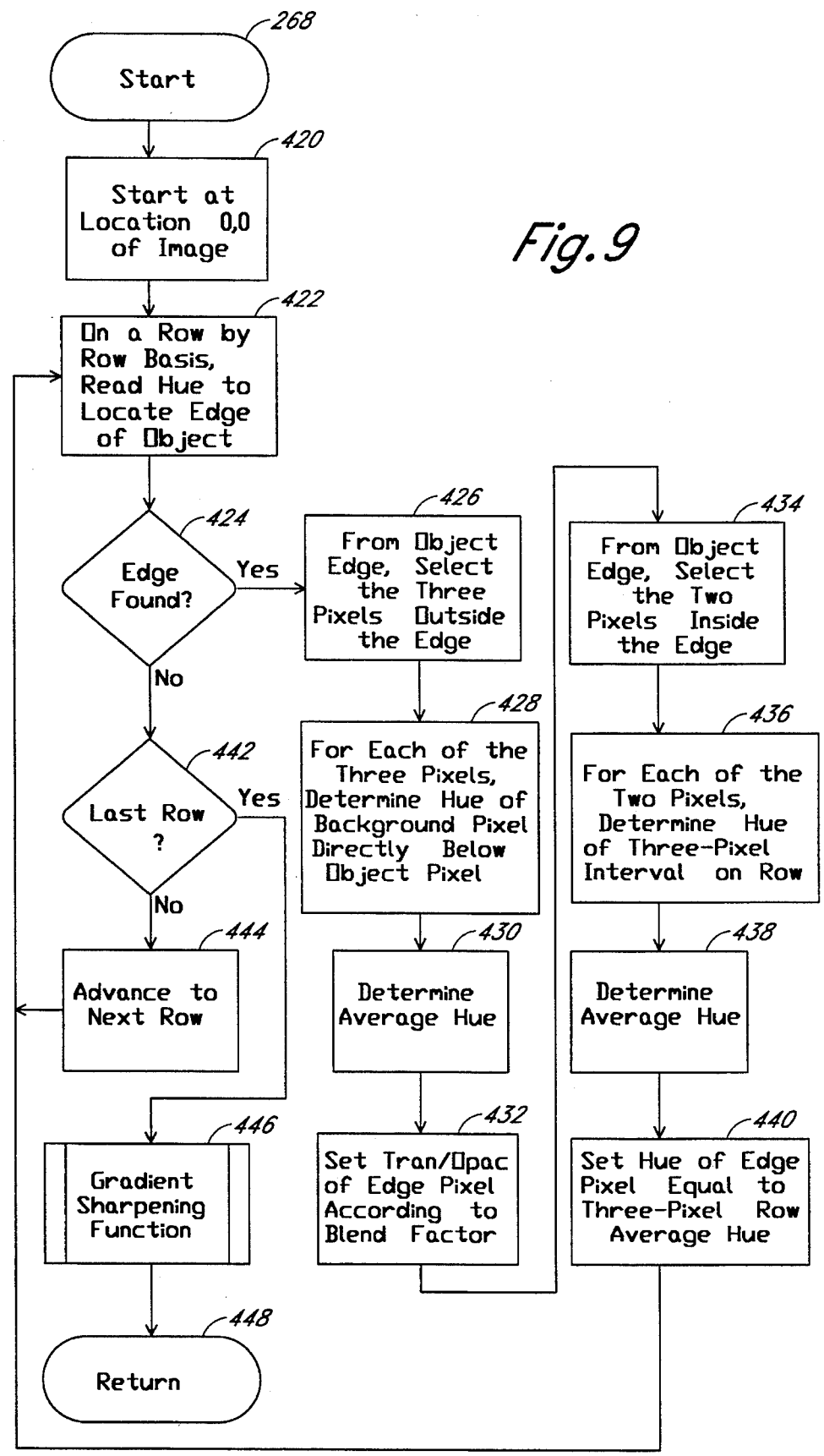
FIG. 9 is a flow diagram of the pixel enhancement function defined as block 268 in FIG. 3.

Referring to FIG. 9, the function 268 for enhancing the pixels of an image will be described. The function 268 is called by either the main flow 200 (FIG. 3d) or the top-level gamma function 262 (FIG. 12). The function 268 starts and proceeds to a step 420 wherein the computer 130 begins processing the image at a predetermined location, e.g., X, Y coordinates 0, 0. Moving to step 422, the computer 130 determines the hue value of each pixel on the current row to attempt to locate an edge of the object in that row. If an edge is found, as determined by a decision step 424, the computer 130 proceeds to a step 426. The edge is located if the computer 130 determines that the hue of the pixel has a major change compared to the previous pixel. In the preferred embodiment, such a change would be found if the value of hue changed by an amount of 80 or more, where the full range of hue values runs from 0 to 255. Of course, the change threshold could be any value within the above-indicated range, as selected for the particular application of the system.

At step 426, the computer 130 selects the three pixels just outside the edge of the object and uses them as edge pixels in performing a blend operation. The blend operation is performed by the computer 130 in steps 428, 430, and 432 wherein the aforementioned three pixels are blended to the background layer directly below the current object layer. At step 428, for each of the three pixels, the computer 130 determines the hue of the background pixel in the layer beneath the object pixel and then averages the hue value of each of the three background pixels with the corresponding object pixel at step 430. Moving to step 432, the computer 130 sets the transparency or opacity of each of the three object layer edge pixels according to a blend factor that is found in the file header. The blend factor, having a value from zero (opaque) to 127 (transparent), is used for dynamic variable transparency of the object, and is selected from within this range of values by the programmer using trial and error in view of what the results are desired to be. Upon completion of step 432, the computer moves to a step 434, wherein the computer 130 uses the edge found on the current row, as determined at step 422, and selects the two pixels inside the object edge for a fuzz operation. The fuzz operation is performed by the Computer 130 in steps 436, 438, and 440 wherein the edge of the object is smoothed. At step 436, for each of the two aforementioned pixels, the computer 130 determines the hue of the three pixels immediately adjacent them on the same row. Then, as indicated at step 438, the computer 130 determines the average hue value of the three-pixel interval. Moving to step 440, the computer 130 sets the hue value of each of the two aforementioned pixels equal to the average determined in the previous step 438.

Upon completion of step 440, the computer loops back to step 422 to attempt to locate another edge in the current row. If another edge is found, as determined at the decision step 424, the previously described process is performed. However, if the end of the current row is reached without locating an edge, the computer 130 moves to a decision step 442 to determine whether the last row of the image has just been processed. If not, the computer 130 proceeds to step 444 and selects the next row for processing and then loops back to step 422 to locate an edge. However, if the last row has been processed, as determined by decision step 442, the computer calls a gradient sharpening function 446 to enhance the object edges.

The file header has predetermined values for the amount of sharpening to be done. For example, the image could have no sharpening done on the edges but full sharpening done at the center, 100% with a linear scale in between the center and borders. Other percentages can be used as a sharpening factor. For example, the image can have 30% sharpening at left edge, 20% at center and 80% at right edge with a linear scale in between the center and borders. The function 446 will be described hereinbelow. After the function 446 has returned back to the function 268, the computer 130 exits the pixel enhancement function 268 at a step 448.

Figure 10:
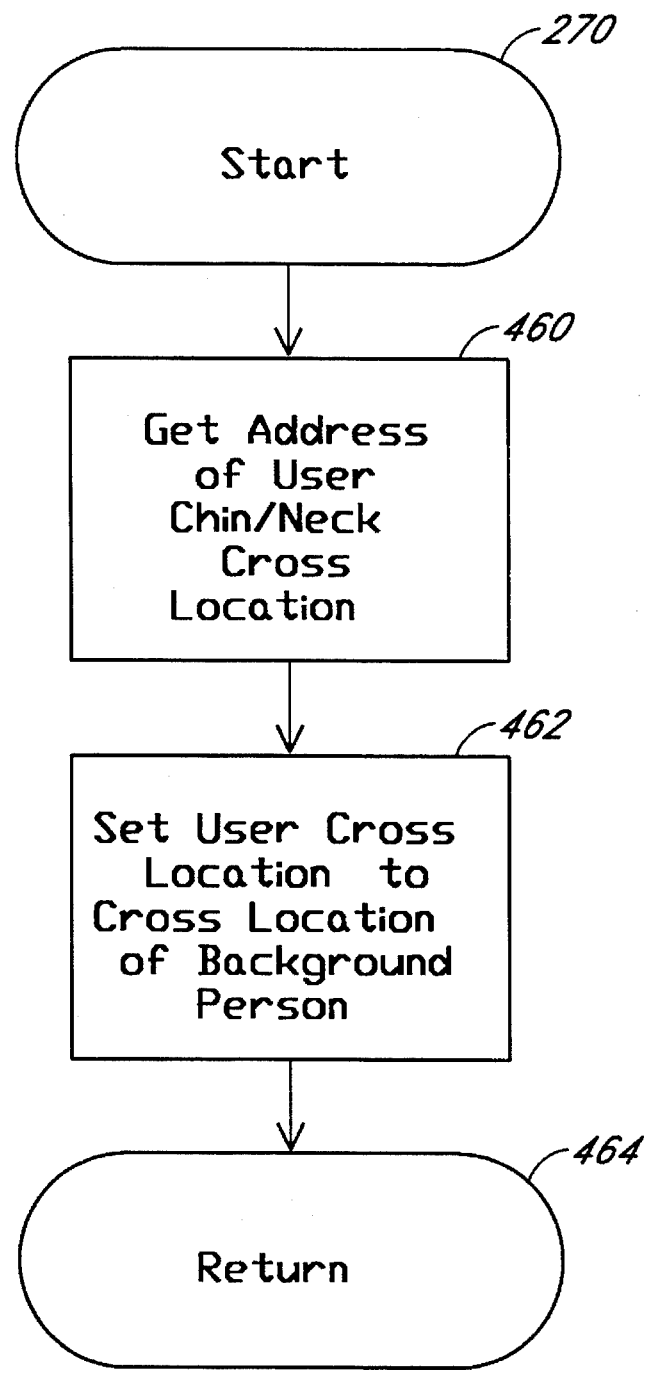
FIG. 10 is a flow diagram of the position function defined as block 270 in FIG. 3.

The details of the process carried out by the computer 130 at function 270 of FIG. 3d are more fully understood in reference to FIG. 10. The function 270 for positioning the object or user 112 into the selected background scene (FIG. 4e) will be described. The function 270 starts and proceeds to a step 460 wherein the computer 130 gets the address of the cross symbol 172 (FIG. 4g) on the user image. This symbol is at the middle of the neck and bottom of the chin on the user image as placed by the user 112 at step 258 of FIG. 3d. The address of the cross symbol 172 is retrieved from the file header of the user image file. The computer 130 then proceeds to step 462 and retrieves the address of the cross symbol 162 (FIG. 4f) for the selected person 145 of the background scene. This address is retrieved from the file header of the background scene image file. The computer then sets the address of the user's cross symbol 172 equivalent to the address of the cross symbol 162 of the selected person 145 in the background scene. Therefore, when the composite image is layered together, the image of the user 112 will be at the correct location. The computer 130 returns at step 464 to the calling main flow 200 (FIG. 3).

Figure 11:
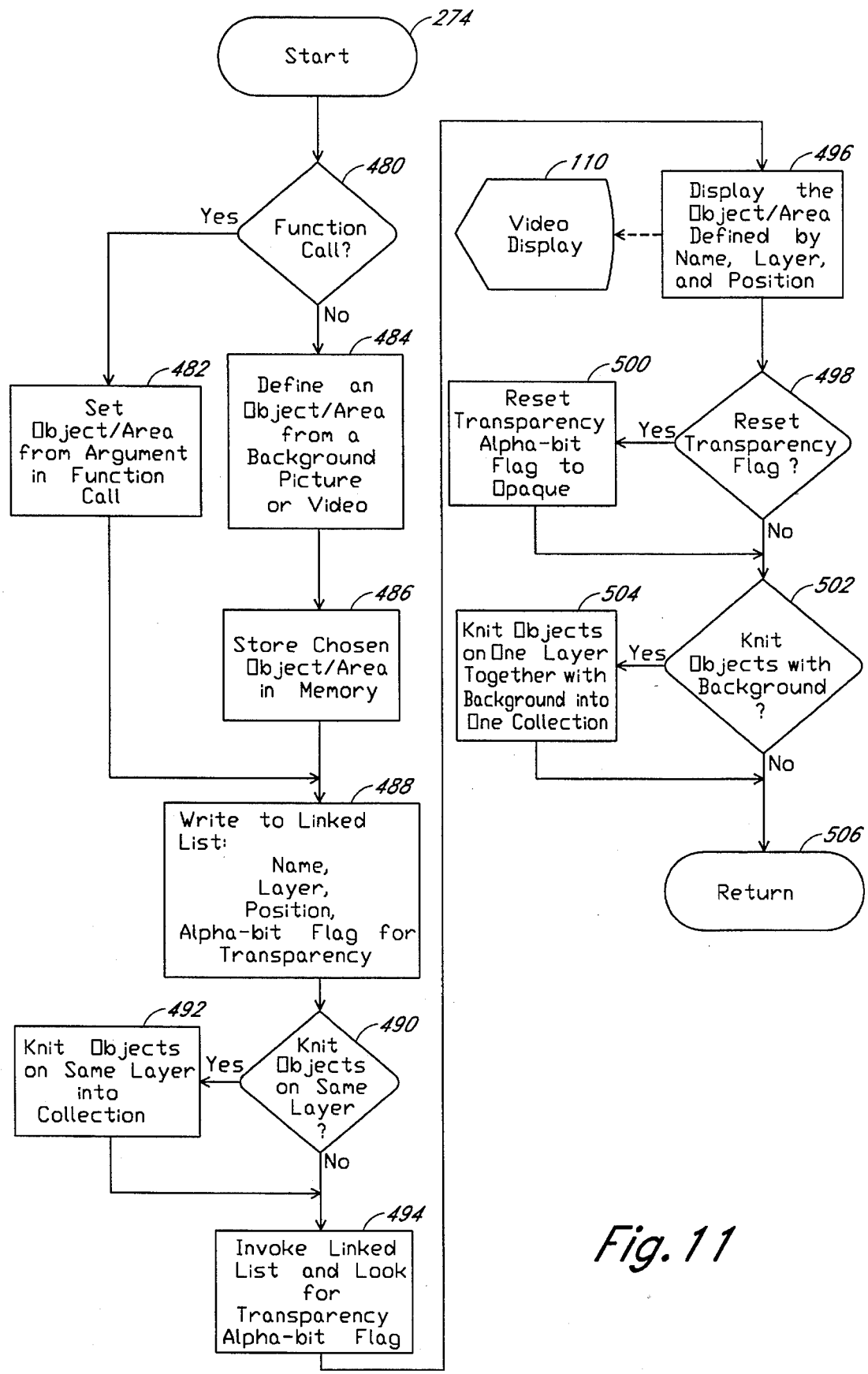
FIG. 11 is a flow diagram of the layering function defined as block 274 in FIG. 3.

The details of the process carried out by the computer 130 at function 274 of FIG. 3c are more fully understood in reference to FIG. 11. The function 274 for layering an object or personalization text into the selected background scene (FIG. 4e) will be described. The function 274 is called twice by the main control flow 200. The first call in the preferred embodiment is to layer the image of the user's head and neck, such that user image will result being slid down, for example, a jersey or uniform, in the final composite image. The jersey has a higher priority than the user image, such that the user's neck and head become visible at the top of the jersey. Both the jersey and the user image have a higher priority than the background scene.

The second call in the preferred embodiment is to layer the personalization text which the user has entered at step 244 (FIG. 3c). The text has the highest priority and, therefore, will always be visible in the final composite image.

The function 274 starts and proceeds to a decision step 480 wherein a determination is made whether this routine is a function call, as in the preferred embodiment, or is a user call, for an alternate embodiment. In the preferred embodiment, the computer 130 proceeds to step 482 wherein the item, e.g., text or an object, or the area of an image to be layered is identified in the argument for the function call. The computer 130 then accesses the information corresponding to the item or area and proceeds to step 488. If however, at step 480, the call to this routine is a user call, the computer 130 proceeds to a step 484. At step 484, an area or object in the background scene can be defined by the user 112 to be moved to another layer. At step 486, the selected area or object is stored to memory along with information for name, layer, position within the layer, and alpha-bit flag used to set transparency bits.

Upon completion of either step 486 or 482, the name, layer, position within the layer, and alpha-bit flag, all corresponding to the item or area, are written to a linked list by the computer 130 at step 488. The alpha-bit flag denotes transparency or opacity of the item or area. The position is stored in X, Y coordinates. After completion of step 488, the computer 130 moves to a decision step 490 and checks to see if an option is invoked, in an alternate embodiment, to stitch, or link together, multiple objects on the same layer. If so, at option step 492, the computer stitches the objects desired on the same layer together into a layer collection. After completion of option step 492 or if the decision step 490 is false, the computer 130 moves to step 494. At step 494, the computer 130 invokes the linked list and looks for the transparency alpha-bit flags. At step 496, for the item pointed to by the linked list, the computer 130 displays the object or area defined by name, layer, and position within the layer on the monitor 110 (FIG. 2).

In an alternate embodiment, a check is made at an option decision step 498 to determine if the user 112 (FIG. 1) desires to reset the transparency alpha-bit flag. If so, the computer moves to option step 500 wherein the transparency flag is reset to opaque by use of a pointing tool, e.g. a mouse, or by area definition using X, Y cartesian coordinates. Upon completion of step option 500 or if the decision step 498 is false, the computer 130 moves to an option decision step 502. In an alternate embodiment, step 502 determines if the user 112 wants to stitch an object or objects on one layer together with the background. If so, at option step 504, the computer 130 stitches the objects on one layer together with the background into one collection and then the objects are removed from the linked list. The collection may include objects, an area, backgrounds, text, and so forth. In the presently preferred embodiment, a file format for storing the background, or the collection as a new background, has a file extension ".spo". At the completion of option step 504 or if decision step 502 is false, the computer 130 returns at step 506 to the calling main flow 200 (FIG. 3).

Figure 12B:
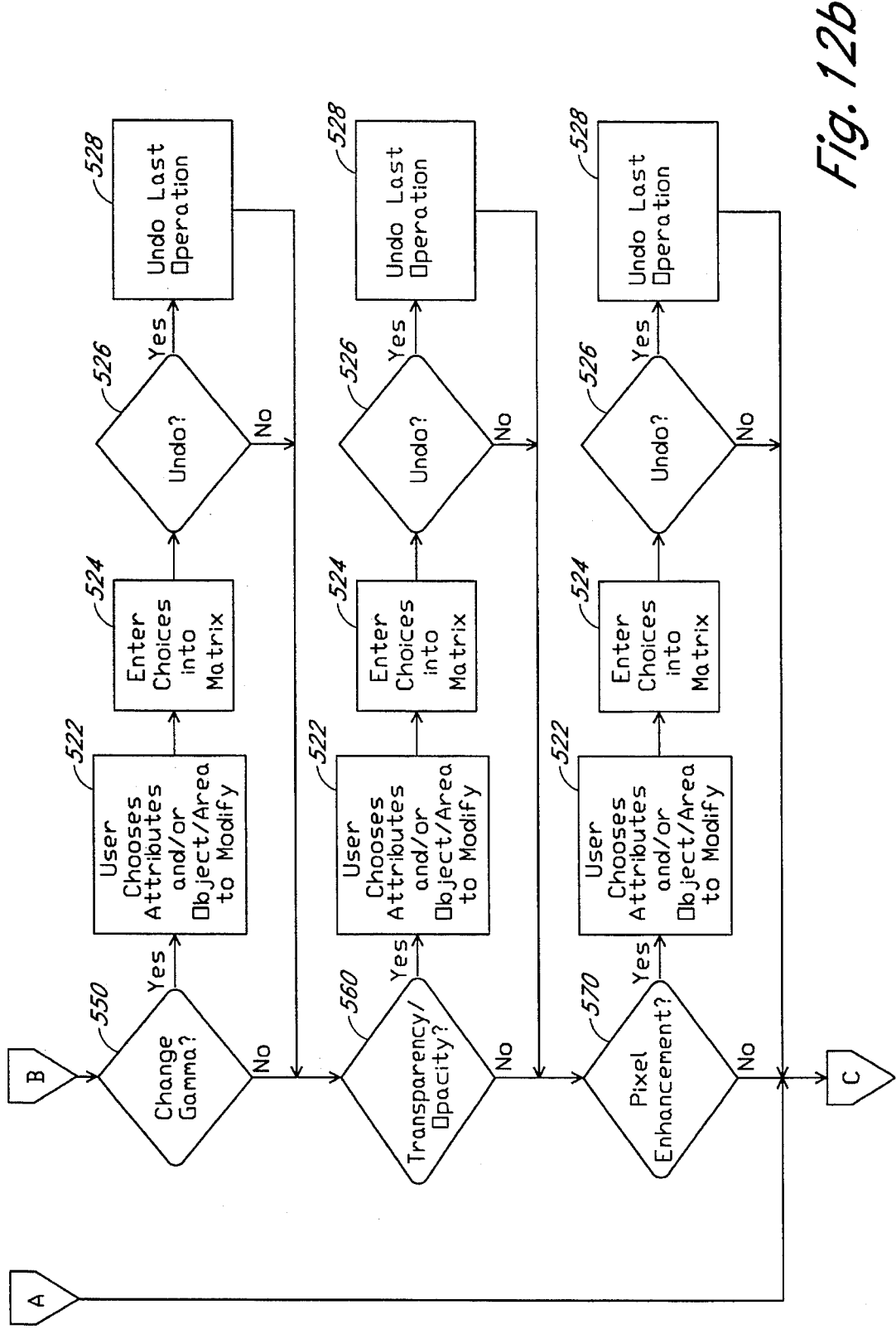
Figure 12C:
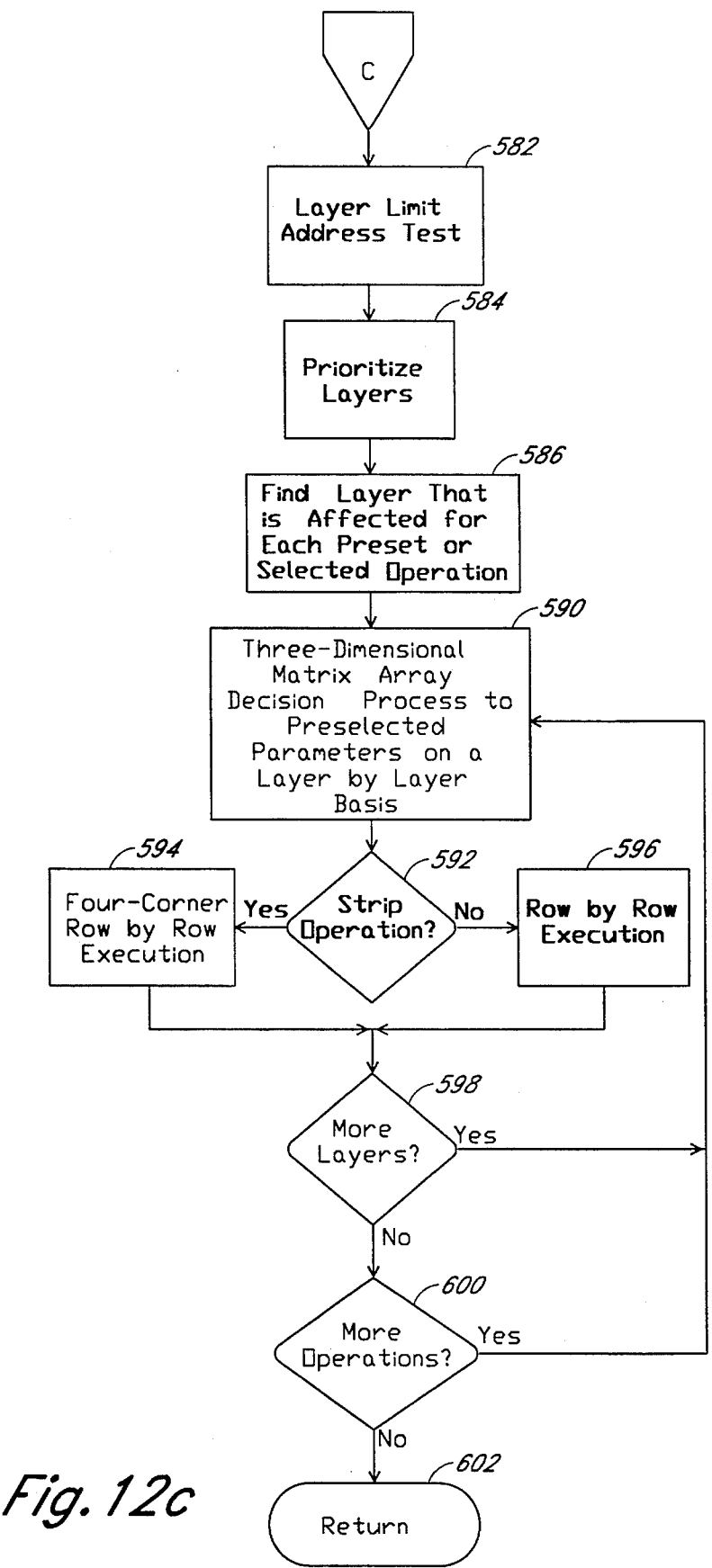

Referring to FIGS. 12a, 12b and 12c, the top-level gamma function 262 (FIG. 3d) will now be described. Although the preferred embodiment disclosed herein does not include the top-level gamma function 262, an alternate embodiment may include this function. The function 262 may be utilized in two ways: as a function call, wherein attributes to be changed are preselected, or as a user call, wherein attributes to be changed are selected by the user 112. When function 262 is accessed by a user call, the system 100 operates as a highly interactive and very powerful image editing tool.

The function 262 starts and moves to a decision step 514 to determine if the routine 262 is called as function. If so, the computer 130 proceeds to a step 516 to access preset gamma attributes, layer, and object or area selections, e.g., all pixels on layer one with a hue of blue at a value range of 10 to 75. The computer 130 then moves from step 516 and proceeds through the off-page connector A and resumes again at step 582 on FIG. 12c. However, if the routine 262 is a user call as determined at step 514, the computer 130 proceeds to a decision step 520 wherein the computer 130 checks to determine if a strip operation is to be done. The strip operation in this function may be done on an object or on the background scene. If so, the computer 130 proceeds to step 522 wherein the user 112 selects the gamma attributes, with corresponding values, and/or a layer and an object or an area on the layer to be changed. At the completion of step 522, the computer 130 proceeds to step 524 and enters the selections from step 522 into a matrix. At a decision step 526, the computer 130 checks to see whether the user 112 wants to undo the operation selected at step 520. If so, at step 528, the computer 130 will negate the operation selected at step 520.

The x-axis of the matrix mentioned above includes the gamma attributes: hue (H), saturation (S), lightness (L), intensity (I), contrast (C), red (R), green (G), blue (B), and the combinations HSL, HSI, HSC and RGB. The y-axis of the matrix includes the operations done by the top-level gamma function: strip, fuzz, blend, change gamma, transparency/opacity, and pixel enhancement. Associated with the matrix is a z-axis that corresponds to the layer number of a composite image. In the presently preferred embodiment, the z-axis utilizes 32 layers. The matrix permits one or multiple operations on one or multiple gamma attributes to be performed on one or multiple layers of the composite image in any combination.

After completion of step 528, or if decision step 526 result is false, or if the decision step 520 result is false, i.e., strip was not selected, the computer 130 proceeds to a decision step 530 wherein a check is made to determine if a fuzz operation is to be done. The fuzz operation may be done on an object or on the background scene. If so, the computer moves to a set of steps essentially the same as steps 522 through 528 as described above and then proceeds to a decision step 540. If the check to determine if the operation is to be done at step 530 (and steps 540, 550, and 560 below) is false, the computer 130 continues to the next decision step to test for the next possible operation.

At step 540, the computer 130 checks to determine if a blend operation is to be done. The blend operation in this function may be done on the background scene or on an object on the adjacent layer. If so, the computer moves to a set of steps essentially the same as steps 522 through 528 as described above and then proceeds to a decision step 550 on FIG. 12b through off page connector B.

At step 550 (FIG. 12b), the computer 130 checks to determine if a gamma change operation is to be done. The gamma operation in this function may be done on an object and/or the background scene. If so, the computer moves to a set of steps essentially the same as steps 522 through 528 as described above and then proceeds to a decision step 560.

At step 560, the computer 130 checks to determine if a transparency/opacity operation is to be done. The transparency/opacity operation in this function may be done on the background scene or on an object on the adjacent layer. If so, the computer moves to a set of steps essentially the same as steps 522 through 528 as described above and then proceeds to a decision step 570.

At step 570, the computer 130 checks to determine if a pixel enhancement operation is to be done. The pixel enhancement operation in this function may be done on an object and/or the background scene. If so, the computer moves to a set of steps essentially the same as steps 522 through 528 as described above and then proceeds to step 582 via the off-page connector C to FIG. 12c. If the pixel enhancement operation was not selected at step 570, the computer 130 also proceeds to step 582 via the off-page connector C.

The next three steps (582, 584, 586 of FIG. 12c) of function 262 are recursively performed by the computer 130 for each preset (from step 516) or selected operation (from steps 520 to 570) in preparation for step 590. At step 582, the computer 130 performs a layer limit address test. In the presently preferred embodiment there are 32 layers. The computer 130 tests to see if it is at the top layer (Z=31) or at the bottom layer (Z=0). Moving to step 584, the computer 130 prioritizes the layers and operations. The first operation that is prioritized is transparency/opacity. Layer zero (Z=0) is the original background scene. As an example, for an area on layer zero to be opaque, nothing in the same area on the 31 layers above layer zero can be opaque, so therefore that area would be set transparent in each of the 31 layers. As another example, if layer seven (Z=7) is made semi-transparent, then all the layers above layer seven (Z=8 to 31) must be transparent, and the layers below (Z=0 to 6) layer seven are adjusted in transparency/opacity to account for the semi-transparency of layer seven. In another example, the top layer (Z=31) is made opaque, so nothing needs to be changed on the other 31 layers. The other preset or selected operations are then also prioritized. At step 586, the computer 130 looks for the layer that is affected for each preset or selected operation. There could be six different layers corresponding to the six operations from steps 520 to 570 in the priority list. The steps 582 through 586 are recursively performed until the layer limit address test is satisfied for each operation.

At step 590, the computer 130 goes through a process to schedule the execution of the operations selected in steps 520 through 570, or from step 516, as described above, on a layer by layer basis. At a decision step 592, the computer 130 checks to see if the operation scheduled for execution is the strip operation. If so, at step 594, the computer 130 performs the strip on a layer (chosen for execution by step 590) using the method that starts at the four corners of the layer and advances through the rows, as previously described in conjunction with function 234. If the test at step 592 is false (not strip), one operation, e.g., fuzz, as scheduled by the computer 130, is executed on a layer ( chosen for execution by step 590) using the row by row method of execution. After all the rows of a layer have been processed at step 596, the computer 130 advances to a decision step 598 and checks whether more layers are to be processed. If so, the computer 130 loops back to step 590 to schedule the next selected layer with the same operation as previously executed, e.g., fuzz. One operation is done on all desired layers before moving to a decision step 600 wherein a check is made to determine if additional operations are to done. If so, the computer 130 loops back to step 590 wherein the next selected new operation, e.g., blend, is scheduled to be executed. If all operations are complete at step 600, the computer returns at step 602 to the calling main flow 200 (FIG. 3).

The top-level gamma function 262 can be used to create interesting composite images. As an example, the user desires the image of his head to replace the image of the head of a hockey player on a hockey playing card. The hockey player has a big scar on his face which the user wants to have on the image of his face in the resultant composite image. Using the top-level gamma function 262, the image of the scar can be isolated and made opaque. The rest of the image of the hockey player's head is made transparent. The image of the user's head is made opaque except for the area where the scar is, which is made transparent. In the resultant composite image playing card, the scar appears on the image of the user's head which is on the image of the hockey player's body.

Four functions execute the operations as selected by steps 530, 540, 550 or 560 of the top-level gamma function 262 (FIG. 12). The actual scheduling and call for execution of these functions is carried out by steps 590 and 596. However, for sake of reference, the operation selected by step 530 is referred to as a fuzz function 530', the operation selected by step 540 is referred to as a blend function 540', the operation selected by step 550 is referred to as a change gamma function 550', and the operation selected by step 560 is referred to as a transparency/opacity function 560'. These four functions will be described hereinbelow. The operation selected by step 520 is performed by the strip function 234 as described in conjunction with FIG. 5. The operation selected by step 570 is performed by the pixel enhancement function 268 as described in conjunction with FIG. 9.

Figure 13:
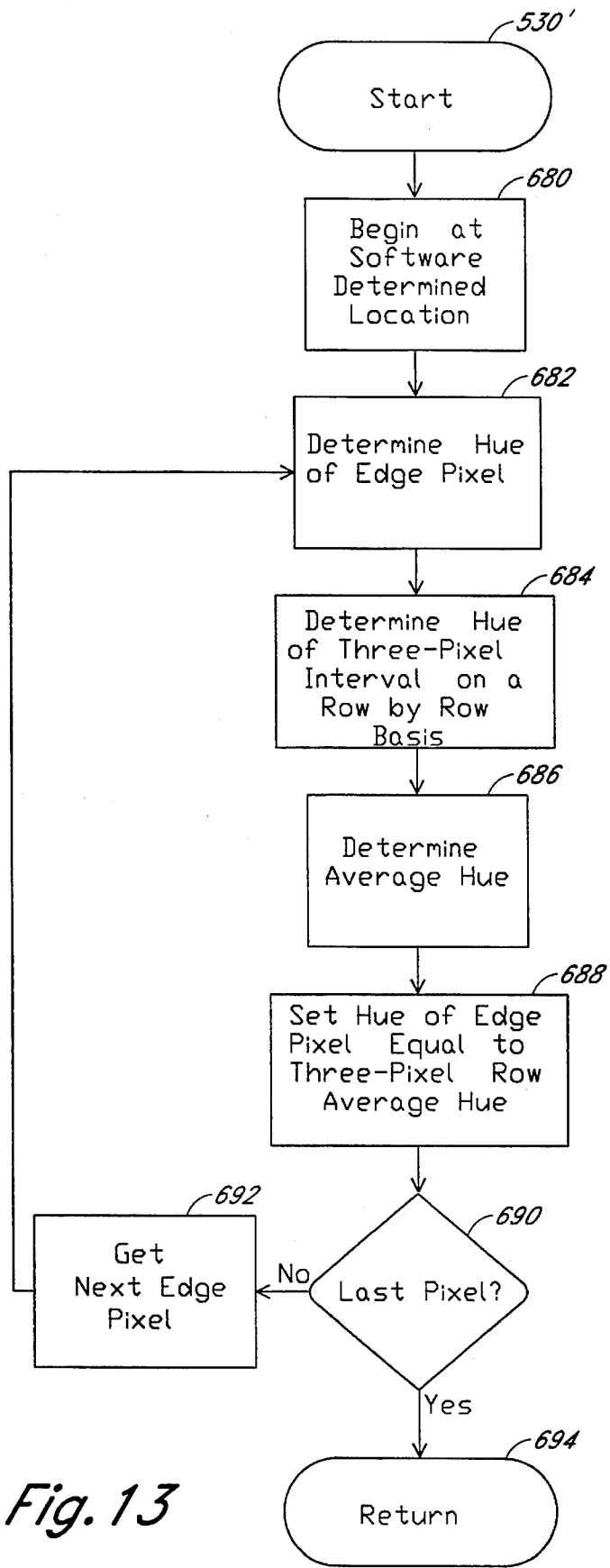
FIG. 13 is a flow diagram of the fuzz function corresponding with block 530 in FIG. 12.

After the background component 114 of the digital image 144 (FIG. 4b) has effectively been removed, the component representing the image of the user 112 remains (FIG. 4d), and has a relatively "fuzzy" edge, characterized by a pixel width of about one or two pixels. Accordingly, to produce a digital image having a smooth edge the digital computer 130 executes the fuzz function 530' as shown in FIG. 13. The fuzz function 530' may be called by either the pixel enhancement function 268 (FIG. 9) or the top-level gamma function 262 (FIG. 12). The function starts at a step 530' and proceeds to a step 680 wherein the computer 130 selects one of the edge pixels (i.e., a "test" pixel) by using a software determined address (e.g., by selecting the uppermost left pixel) and determines its hue at step 682. Next, as indicated at step 684, the computer 130 selects the edge pixels which are immediately adjacent the test pixel for a three-pixel interval on one row and determines the hue of these pixels.

Then, as indicated at step 686, the computer 130 determines the average hue gamma value of the three pixels. As indicated at step 688, the computer 130 then sets the hue gamma value of the test pixel to be equal to the average value calculated in step 686. The computer 130 proceeds to a decision step 690, wherein the computer 130 determines whether the test pixel is the last edge pixel to be processed in the fuzz function 530'. If not, the computer 130 proceeds to step 692, wherein the computer 130 selects one of the edge pixels that is immediately adjacent the test pixel, designates this adjacent pixel as the new test pixel, and loops back to step 682. If, at step 690, the computer 130 determined that the test pixel was the last edge pixel, the computer 130 exits the fuzz function 530' at a step 694.

Figure 14:
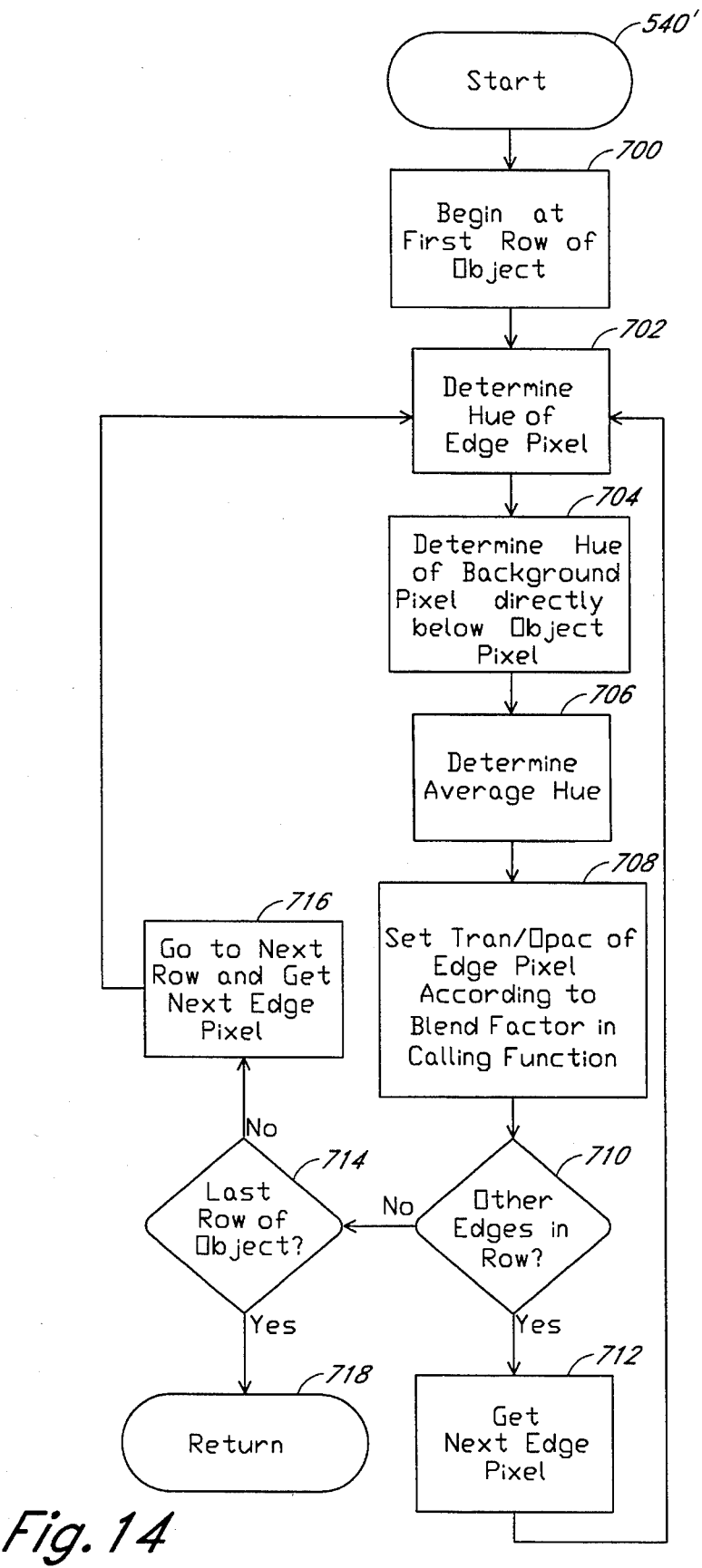
FIG. 14 is a flow diagram of the blend function corresponding with block 540 in FIG. 12.

The computer 130 blends the surrounding background to the edges of an object or an area on the layer adjacent to background scene layer in function 540'. The blend function 540' is more fully understood by reference to FIG. 14. The blend function 540' may be called by either the pixel enhancement function 268 (FIG. 9) or the top-level gamma function 262 (FIG. 12). The computer 130 starts at step 540' and proceeds to step 700 wherein the computer 130 selects an object edge pixel as the test pixel. The selection of the object edge pixel is made at a software determined address, e.g., the left edge pixel of the first row of the object. Moving to step 702, the computer 130 determines the hue gamma value of the test pixel. From step 702, the computer 130 proceeds to step 704 and determines the hue of the background pixel that is on the layer immediately below the selected test pixel in the same row as the test pixel. Then the computer 130 proceeds to step 706 wherein the computer 130 determines the average hue of the two pixels. From step 706, the computer 130 proceeds to step 708, wherein the computer 130 sets the transparency/opacity of the test pixel according to the blend factor in the calling function.

From step 708, the computer 130 proceeds to a decision step 710, wherein the computer 130 determines whether there are other edges in the current row; that is, whether the test pixel is the last edge pixel to be processed in the current row. If there is at least one additional edge in the current row, the computer moves to step 712 and selects the next edge pixel. This pixel is designated as the new test pixel, and then the computer 130 loops back to step 702. However, if there are no more edge pixels in the current row as determined at step 710, the computer 130 advances to a decision step 714 wherein a check is made to determine if the last row of the object has been processed. If not, the computer 130 proceeds to step 716, wherein the computer 130 selects the next row and the first edge pixel in that row. This pixel is designated as the new test pixel, and then the computer loops back to step 702. If, at step 714, the computer 130 determined that the last row of the object has just been processed, the computer 130 exits the blend function 540' at a step 718.

Figure 15:
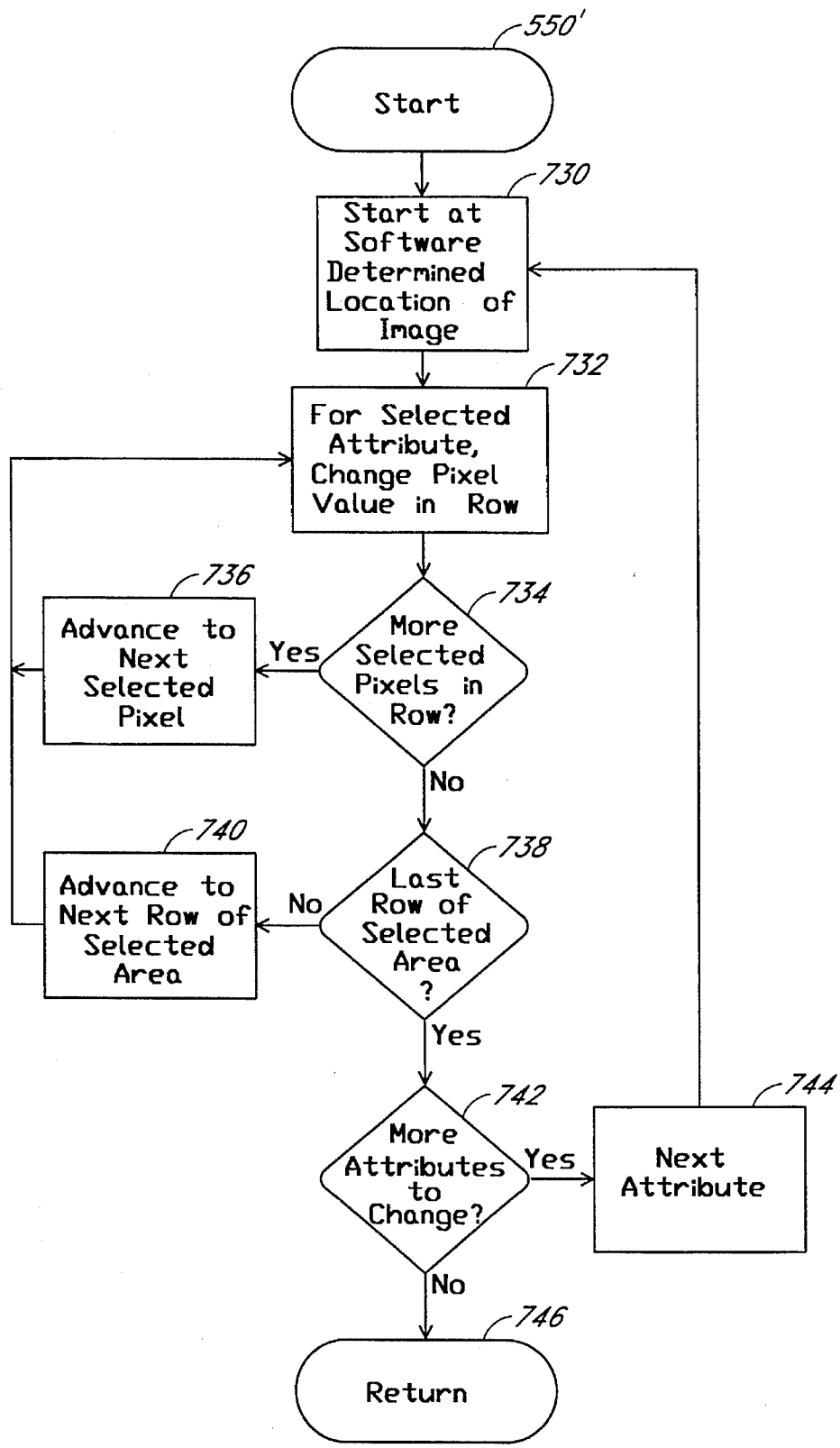
FIG. 15 is a flow diagram of the change gamma function corresponding with block 550 in FIG. 12.

Referring to FIG. 15, the function 550' for changing the gamma attributes of an image will be described. The function 550' is called by the top-level gamma function 262 (FIG. 12). A list of the gamma attributes that may be changed was disclosed in conjunction with FIG. 12. The file header may contain information about the area or object for which a gamma attribute or multiple attributes is to be changed. Depending on the complexity of the background, the header may contain additional information necessary to properly achieve photo-realistic events. The change gamma function allows the user to change one or more gamma attributes on a whole layer or on an area or object on the layer. For example, the saturation attribute can be pumped up from a value of 40 to a value of 80 on the whole layer.

The function 550' starts and proceeds to a step 730 wherein the computer 130 begins processing at a software determined location of the image. This location may be at the X, Y coordinates of the top left corner of an object or area in one embodiment or it may be the entire layer. Moving to step 732, the computer 130 changes the pixel value of the selected attribute, e.g., hue. The computer 130 then moves to a decision step 734 to determine if additional preselected pixels (of the object, area, or layer) in the current row are to have an attribute changed. If so, the computer 130 moves a step 736 and advances to the next pixel in the current row. The computer 130 then loops back to step 732. If there are no additional preselected pixels in the current row as determined by step 734, the computer 130 moves to a decision step 738 to determine if the last row of the selected area has been processed. If not, the computer 130 moves to step 740, advances to the first pixel on the next row of the selected area, and then loops back to step 732. However, if the last row of the selected area, object, or layer has been processed, the computer moves to a decision step 742 wherein a determination is made whether there are any more attributes to change. If so, the computer 130 moves to step 744, gets the next gamma attribute for change, and then loops back to step 730. If there are no further attributes to change, as determined by step 742, the computer 130 exits the change gamma function 550' at a step 746.

Figure 16A:
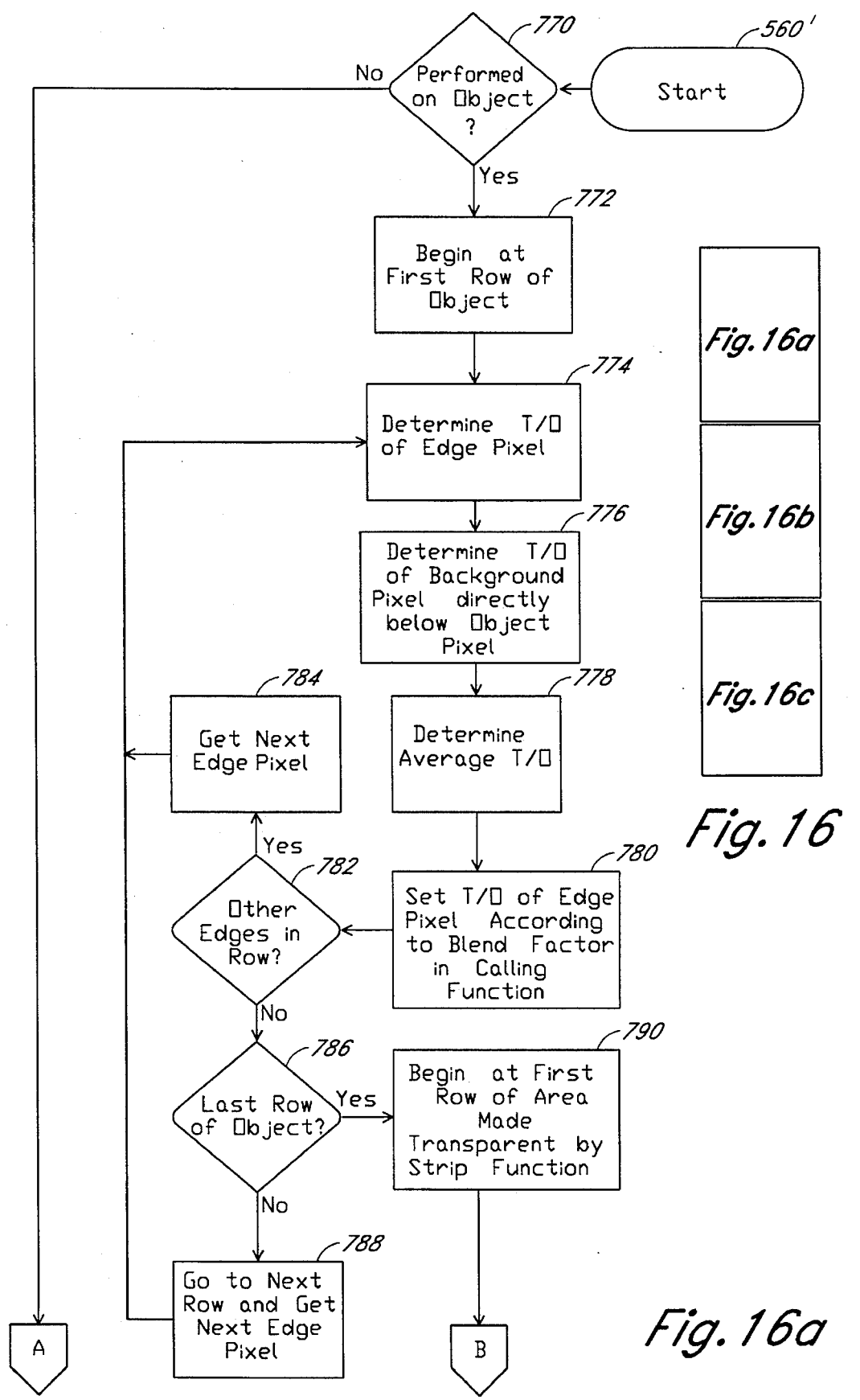
FIGS. 16a, 16b and 16c are a flow diagram of the transparency/opacity function corresponding with block 560 in FIG. 12.
Figure 16B:
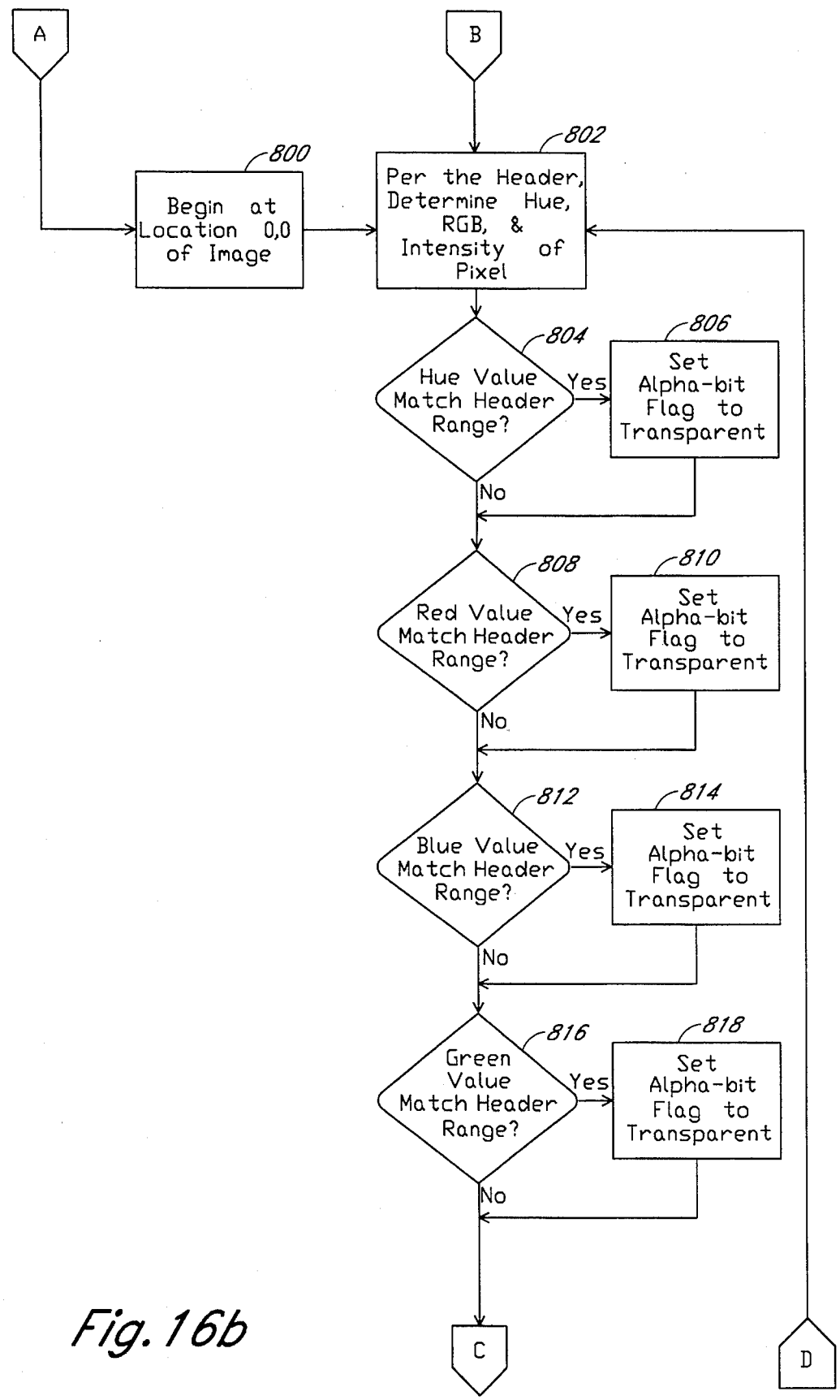
Figure 16C:
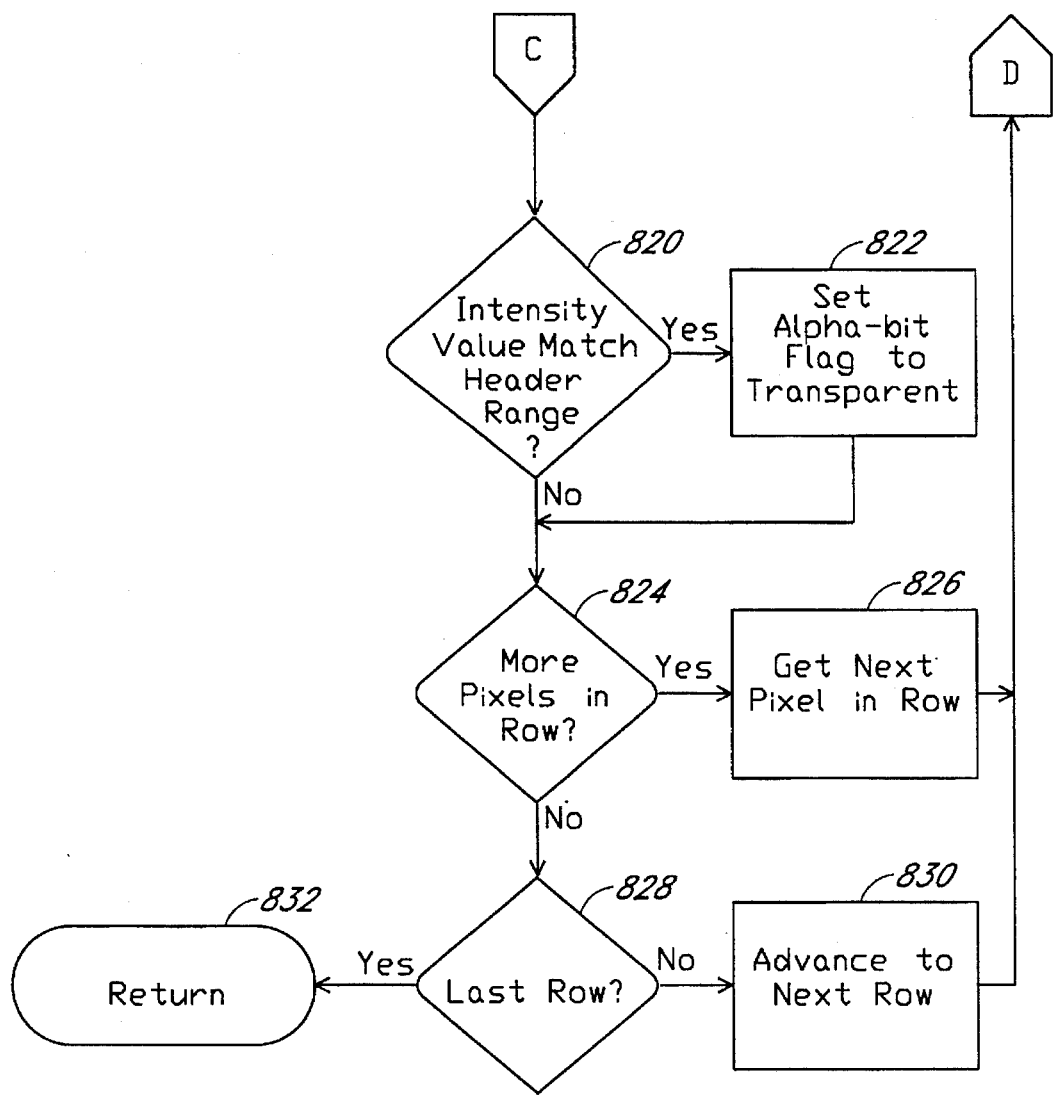

Referring to FIG. 16a, 16b, and 16c the transparency/opacity function 560' (FIG. 16a) will be described. The function 560' is called by the top-level gamma function 262 (FIG. 12). The function 560' starts and proceeds to a decision step 770 wherein the computer 130 determines whether the function is to be performed on an object or on a background scene. If it is determined at step 770 that an object is to be processed, the computer 130 moves to step 772 to begin processing at the first row of the object as defined in the file header. The computer 130 selects an object edge pixel on the current row as the test pixel. The selection of the object edge pixel is made at a software determined address, e.g., the left edge pixel of the first row of the object. Moving to step 774, the computer 130 determines the transparency/opacity (T/O) value of the test pixel. From step 774, the computer 130 proceeds to step 776 and determines the T/O of the background pixel that is on the layer immediately below the selected test pixel in the same row as the test pixel. Then the computer 130 proceeds to step 778 wherein the computer 130 determines the average T/O of the two pixels. From step 778, the computer 130 proceeds to step 780, wherein the computer 130 sets the transparency/opacity of the test pixel according to the blend factor in the calling function.

From step. 780, the computer 130 proceeds to a decision step 782, wherein the computer 130 determines whether there are other edges in the current row; that is, whether the test pixel is the last edge pixel to be processed in the current row. If there is at least one additional edge in the current row, the computer moves to step 784 and selects the next edge pixel. This pixel is designated as the new test pixel, and then the computer 130 loops back to step 774. However, if there are no more edge pixels in the current row as determined at step 782, the computer 130 advances to a decision step 786 wherein a check is made to determine if the last row of the object has been processed. If not, the computer 130 proceeds to step 788, wherein the computer 130 selects the next row and the first edge pixel in that row. This pixel is designated as the new test pixel, and then the computer loops back to step 774. If, at step 786, the computer 130 determines that the last row of the object has just been processed, the computer 130 moves to a step 790. At step 790, the computer 130 initializes further processing by accessing the first pixel of the first row of the area made transparent by use of the strip function 234 (FIG. 5).

If the decision step 770 determination is that the function 560' is processing the background scene, the computer 130 moves through off page connector A to a step 800 (FIG. 16b) and accesses the first pixel of the first row of the image as the test pixel. After completion of step 800, the computer 130 moves to a step 802 wherein the file header is utilized to determine which of hue, red, green, blue (RGB), and intensity tests are to be run. Any combination or all five tests can be run. The test is to determine the hue, red, green, blue, or intensity value of the pixel. For each test, a range is kept in the file header along with information that denotes whether the test on the test pixel is for values that are inside the range or for outside the range. The range and the inside/outside information can be different for each of the five tests. As an example, a predetermined limit on hue values may be from zero to 255 and the test may look for pixels that fall outside the hue value range of 50 to 100. These pixels will have their alpha-bit flag set. Thus, of the steps 804, 808, 812, 816, and 820 (FIG. 16c), only those tests selected to run, according to the file header, will have their respective ranges checked. So, for the example just above, the computer 130 moves to a decision step 804 and determines whether the hue value of the test pixel is outside the range specified in the header, e.g. 50 to 100. If so, the computer 130 sets the alpha-bit flag to transparent at step 806. However, if the pixel value does not match the range specification in the file header for hue, as determined by step 804, the computer 130 moves to the next decision block as selected in the file header, if any, among steps 808, 812, 816, and 820. A set of steps similar to steps 804 and 806 above is executed for each test selected in the file header.

At the conclusion of the one to five tests above, the computer 130 moves to a decision step 824 (FIG. 16c) and determines if there is at least one additional pixel in the current row to be tested. If so, the computer 130 advances to step 826, accesses the next pixel in the current row, and loops back to step 802 (FIG. 16d) to repeated the above-described process. If the last pixel on the current row has been processed, as determined by step 824, the computer 130 moves to a decision step 828 to determine if the last row has just been processed. If not, the computer 130 moves to step 830, advances to the next row of the image, and loops back to step 802 (FIG. 16b). If the last row has been processed, as determined by step 828, the computer 130 exits the transparency/opacity function 560' at step 832.

After completion of step 790, the computer 130 moves through off page connector B to step 802 (FIG. 16b). Steps 802 to 832 are then similar to that described above except that for steps 806, 810, 814, 818, and 822 (FIG. 16c), the alpha-bit flag is set opaque rather than transparent, because the area to be processed is already transparent (when step 802 is reached via step 790). As an example, setting the alpha-bits opaque allows the user to make a drop shadow in the shape of the user's head, which is known as shadow preservation.

Figure 17A:
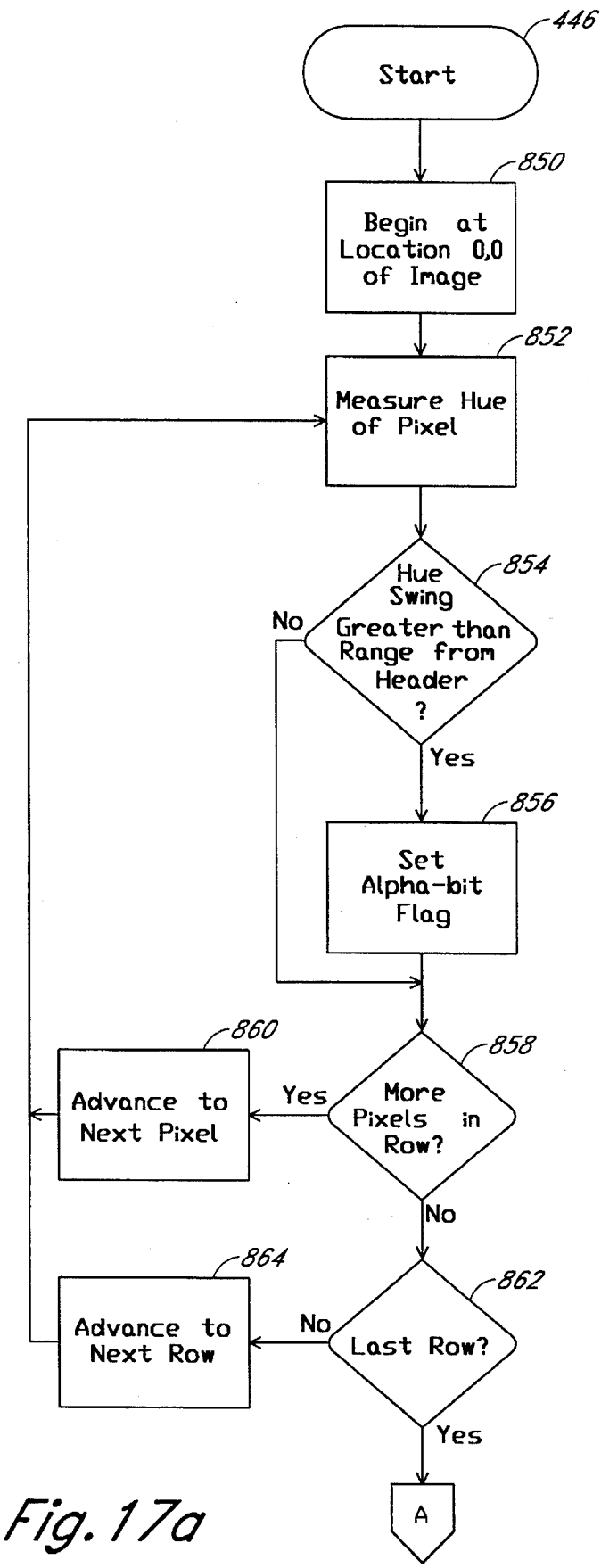
FIGS. 17a and 17b are a flow diagram of the gradient sharpening function defined as block 446 in FIG. 9.
Figure 17A:
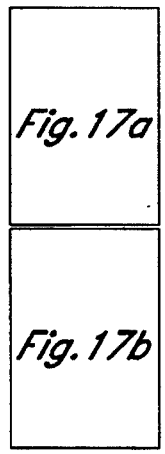
Figure 17B:
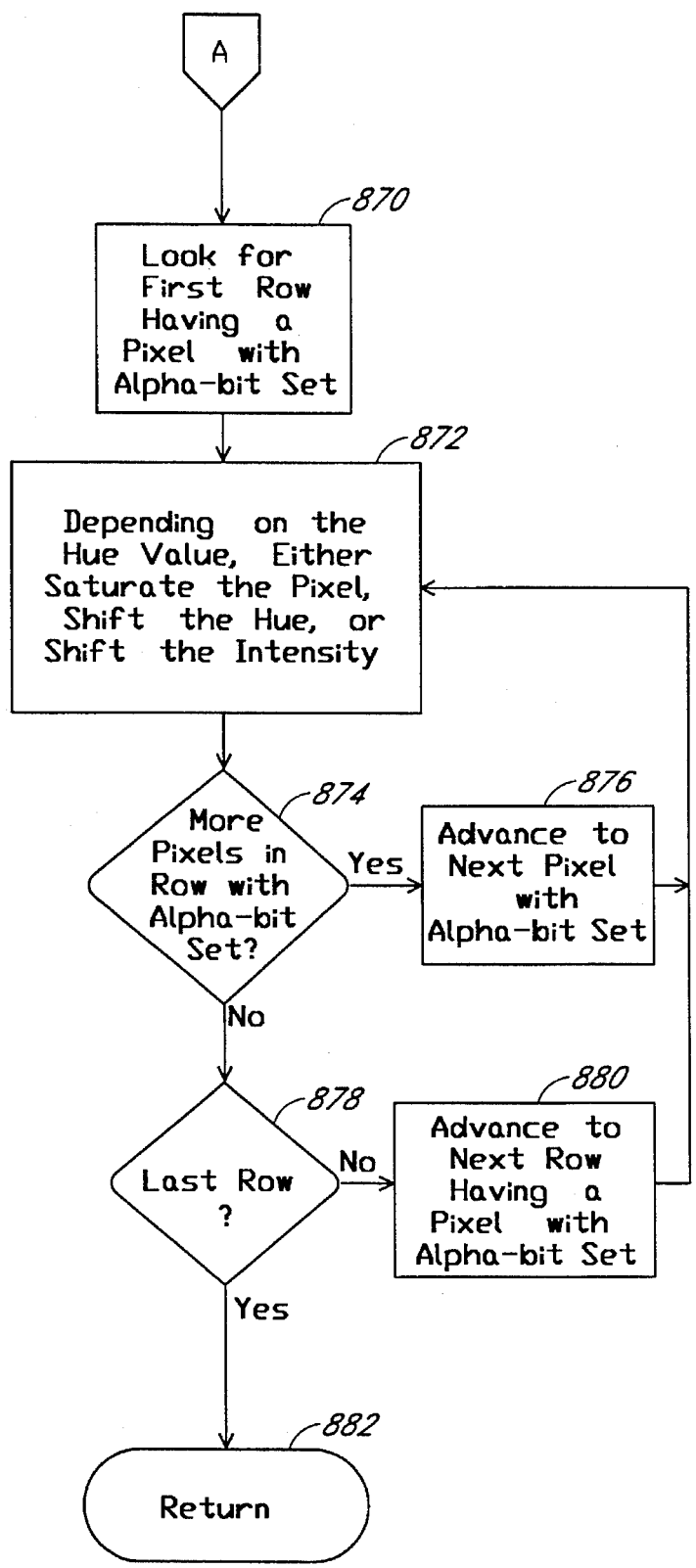

Referring to FIGS. 17a and 17b, the gradient sharpening function 446 will be described. The function 446 is called by the pixel enhancement function 268 (FIG. 9). As an example, the function 446 may be used to locate the eyes on an image of a face so that the eyes could be enhanced while the skin is left unchanged. The function 446 starts and the computer 130 proceeds to a step 850 and accesses the first pixel of the first row as the test pixel of the image that is passed to function 446 from function 268. Moving to step 852, the computer 130 measures the hue of the test pixel and advances to a decision step 854. At step 854, the computer determines whether the hue value falls outside a range specified by the file header, e.g., 110 to 150. If so, e.g., the value is less than 110 or greater than 150, the computer 130 moves to step 856 wherein the alpha-bit flag is set for that pixel. At the completion of step 854 or if the hue value does fall in the range, as determined at step 854, the computer 130 moves to a decision step 858. At step 858, the computer determines if there is at least one additional pixel left in the current row. If so, the computer 130 moves to step 860, accesses the next pixel in the current row and loops back to step 852. However, if the computer 130 determines, at step 858, that the last pixel in the current row has been processed, a decision step 862 determines whether the last row has just been processed. If not, the computer 130 moves to step 864, accesses the next row, and loops back to step 852 to process the new row.

If the determination is made, at step 862, that the last row has been processed, the computer 130 moves through off page connector A to a step 870 (FIG. 17b) to look for the first row having a pixel with the alpha-bit flag set. Moving to step 872, the computer 130 does edge enhancement on the pixel. The computer 130 performs one, two or three operations on the pixel, depending on the hue value of the pixel and a set of ranges for the hue value and associated operations which are kept in the file header. The three operations are: saturate the pixel, shift the hue (make the blacks blacker and the whites whiter), and shift the intensity. A set of hue value ranges are set up in the file header such that, for example, if the measured hue value exceeds the file header value by more than 40, the saturation operation is done; if the measured value exceeds the header value by more than 70, the shift intensity operation is done; and if the measured value exceeds the file header value by more than 100, the saturation and the shift hue operations are done. The hue value ranges are background specific, and are set by the programmer to achieve the desired results based on that background. For example, if the skin color of the background object is green, the range will be selected so that the skin color of the object being placed in the background will also match this green color.

Moving to a decision step 874, the computer 130 determines whether there is at least one more pixel in the current row that has the alpha-bit flag set. If so, the computer 130 proceeds to step 876, accesses the next pixel in the current row having the alpha-bit set, and loops back to step 872. However, if decision step 874 is false, the computer 130 moves to a decision step 878 to determine if the last row of the image has just been processed. If not, the computer 130 moves to a step 880, advances to the next row having a pixel with the alpha-bit set, and loops back to step 872. If the last row has been processed, as determined by step 878, the gradient sharpening function 446 returns at step 882 to the pixel enhancement function 268.

The software described herein for the image editing system 100, some of which is listed in the attached Microfiche Appendix from frame 1 to frame 124, is written in the "C" language and was translated from source code to machine-readable object code using a Photo Novelty Programming Language (PNPL) compiler developed by ImageWare Software, Inc., formerly Practically Perfect Productions, Inc. of San Diego, Calif. Nonetheless, one skilled in the technology will recognize that the steps in the accompanying flow diagrams can be implemented by using a number of different compilers and/or programming languages.

Figure 18:
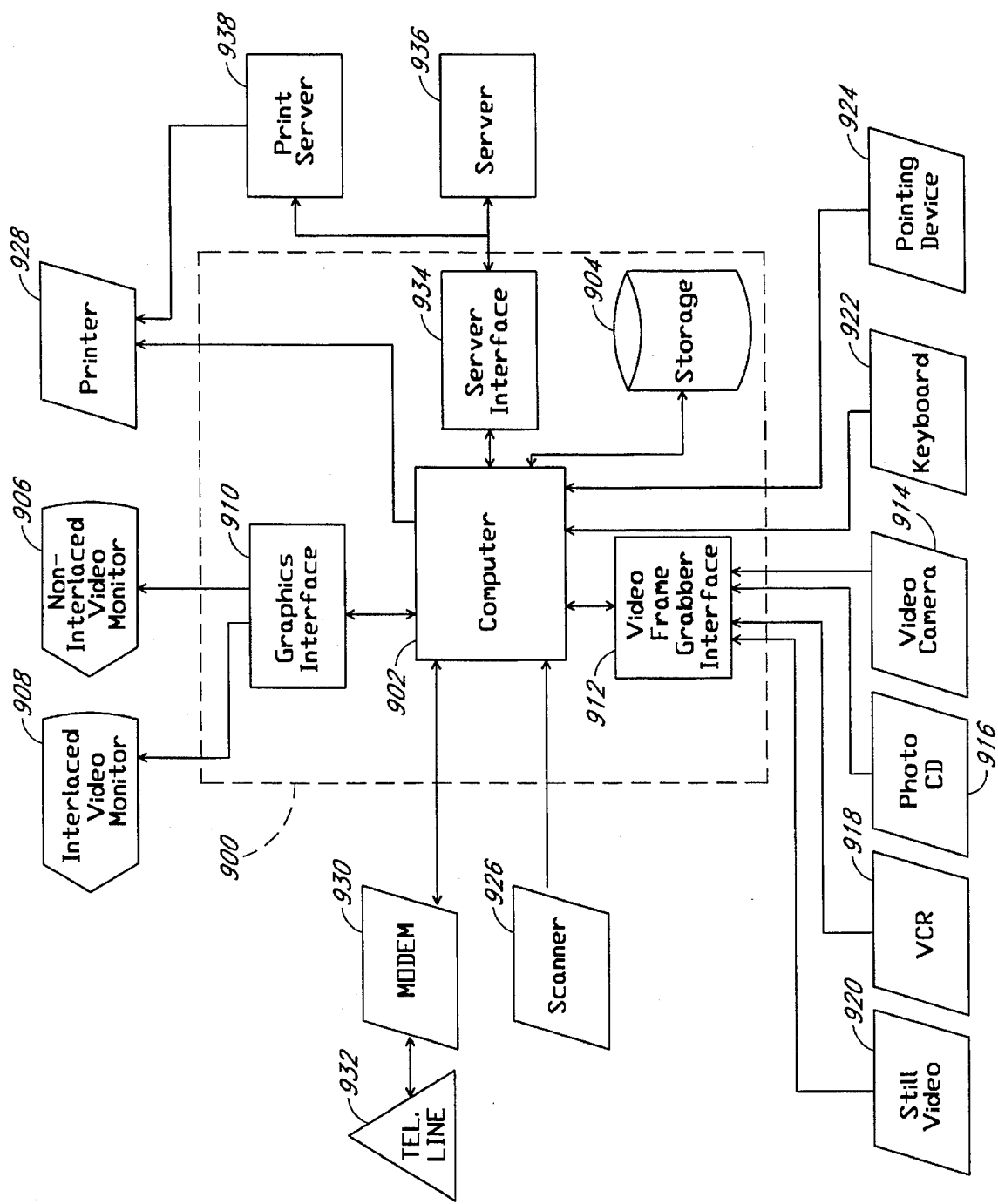
FIG. 18 is a block diagram illustrating the components of another embodiment of the imaging system.

Referring to FIG. 18, another embodiment of an image editing system of the present invention is generally indicated at 900. The imaging system 900 can be used in virtually any application where it is desirable to separate an object from a background in a digital or video image, and then to combine the object with a different background to form a new image. One such application is shown in FIG. 18, which shows the system 900 integrated with a group of computer peripherals.

The imaging system 900 includes an advanced photo-realistic image-editing and manipulation program operating in the popular Windows™ environment on a computer. Windows is available from Microsoft Corporation. Although this embodiment is described using the Windows environment on a personal computer, other embodiments may use a different environment or a different computer or both.

With the imaging system 900, images are manipulated faster and more easily than ever before. Most image-editing programs offer the ability to manipulate areas of images, but with the imaging system 900, one or more objects in each image can also be manipulated. These objects are easily moved around, enlarged, reduced, or rotated, and even layered over other objects. Objects can be saved for later use with the same or different background files. This ability to select and work with as many objects as desired, set in the familiar and easy-to-use Microsoft Windows environment, provides more flexibility, ease, and speed in image editing.

In addition to the versatility of multiple objects, the imaging system 900 offers many other features in creating professional graphic images. With the variety of selection tools, painting tools, and special effects available in the imaging system 900, images are enhanced with functions as simple as sharpening or as advanced as gradually blending one image into another image beneath it. Complete color editing is available, and text is easily added to images. The term color herein is used to describe hue and shades of hue within a particular color, but also includes hues of gray including the absolutes of black and white. Font style and size of text is easily adjusted, and can be rotated just like an object. Despite the advance capabilities of the imaging system 900, there is no need to worry about mistakes, which are easily corrected with an "undo" function.

Referring again to FIG. 18, the system 900 includes a computer 902 having a minimum of an Intel 80386SX or similar microprocessor that will run Microsoft Windows version 3.0 or higher in enhanced mode. A minimum of four megabytes (Mb) of RAM memory (not shown) plus a permanent swap file is required, and preferably eight Mb of memory or more is desired for professional level manipulations. In general, the more memory the computer 902 has, the faster the system 900 performs.

The system 900 includes a hard disk drive 904 connected to the computer 902. The drive 904 has at least four megabytes of free space, after Microsoft Windows has been installed and a permanent swap has been created. The system 900 also includes either a 3 ½ inch or 5 ¼ inch floppy disk drive (not shown) connected to the computer 902. Image files require, on the average, about one megabyte of storage space each.

The system includes either a non-interlaced video monitor 906 or an interlaced video monitor 908. If a user has a choice between a non-interlaced monitor 906 and the interlaced monitor 908 and both have equal resolution capability, the non-interlaced monitor 906 is preferred. A monitor designed to the VGA (video graphics array) display standard, or better, is required to use all the features of the imaging system 900.

The imaging system 900 includes, at a minimum, a Microsoft Windows-compatible, 256-color Super VGA graphics adapter or interface 910, having a memory (not shown), connected to the computer 902 and to a monitor 906 or 908. The adapter 910 preferably has accelerated capabilities in Microsoft Windows for faster and more efficient operation. For greater color capability, however, a Microsoft Windows-compatible True Color VGA adapter is preferred.

An optional component of the imaging system 900 to capture video images for manipulation is a color video frame grabber interface or capture board 912 connected to the computer 902. Two such frame grabber interfaces are AITech and ComputerEyes RT. Typical video sources optionally connected to the frame grabber interface 912 include a video camera 914, a photo CD (Compact Disk) 916, a VCR (video cassette recorder) 918, a still video camera 920, a video camcorder (not shown), or a laser disk player (not shown). The preceding video sources are not intended to be the only ones that can be used, since other video sources that the user may have available could also be utilized. A procedure for capturing a video image using the frame grabber interface 912 will be described hereinbelow.

A keyboard 922 that is compatible with IBM AT computers is connected to the computer 902. A pointing device 924 supported by Microsoft Windows such as any two or three button mouse also connects to the computer 902. Reference throughout the detailed description to use of the mouse is not meant to preclude use of another type of pointing device.

Another optional way to capture a video image is by use of a scanner 926 connected to the computer 902. The imaging system 900 supports the following scanners: any Twain-compliant scanner, such as the Logitech ScanMan Color hand scanner; the Polaroid Digital Scanner SC-500; and the Toshiba SC-7500 scanner.

The computer 902 connects to a printer 928 to provide a way to produce hard-copy output. The imaging system 900 allows printing images to any graphics printer currently set up in Microsoft Windows with a Microsoft Windows driver, such as the Polaroid CI-700 printer. In addition, the imaging system 900 provides internal printer drivers that allow printing from a plurality of color printer choices.

The imaging system 900 requires Microsoft Windows version 3.0 or higher and MS-DOS version 5 operating software. However, Microsoft Windows version 3.1 is preferred to obtain high quality, scalable fonts and the ability to rotate text objects smoothly.

Several optional components that provide additional flexibility in use of the system 900 will now be described. To upload a video image or download an object or image file, a modem 930 interfaces between the computer 902 and a telephone line 932. By use of the modem 930, the user may have access to remote sources of video images. A video image can later be sent to a remote location via the modem 930 after the user has performed image manipulation.

Another set of optional components connected to the computer 902 includes a server interface 934 which further connects to a server 936 and/or a print server 938. The print server 938 further connects to the printer 928. The server 936 and print server 938 are typically part of a network such as a LAN (local area network) which is not shown. Use of a server 936 conveniently provides the user with greater storage capacity for raw and final video images. The server 936 also provides a means of sharing objects and video images with other users of the server. The print server 938 provides a means to offload printing of video images from the computer 902. The frame grabber 912 has a memory (not shown) in which an image may be manipulated at an industry standard video resolution (640 by 480 pixels) by the computer 902. Other video resolutions may be utilized, however. The frame grabber 912 has a video port (not shown) that may be optionally connected to the printer 928.

The images utilized in the imaging system 900 have a background from which the user can select areas and objects to manipulate. Each of these image components will now be defined, along with manipulation of the components.

The background is the file that the user opens which serves as the backdrop of the image that will be manipulated. Areas of the background to manipulate are selected as discussed below. The user may also create objects from the background, as discussed below.

An area is a portion of the background (or the entire background, if desired) that is selected for manipulation. The user can manipulate areas by using the options from Area or Brush Options, which will be described hereinbelow. For example, the user can paint on or adjust the color of an area. When painting or adjusting the color of an area, the size and shape of a paint brush is adjustable. The user can choose to change the foreground, middle ground, or background colors that are used for painting. Areas are stationary portions of the background and cannot be moved.

Objects are the key to manipulating images with the imaging system 900 because of their versatility. Unlike areas, objects can be moved around or over the background (or even into another file), rotated, enlarged, reduced, layered, cloned, and even saved for future use.

Once the user has selected an object, options from Object Options are used to manipulate the object. Text is also considered an object, so it can be manipulated in the same way. Manipulations to objects do not affect the background.

If the user has selected more than one object, the imaging system 900 identifies the current object by surrounding it with a white box. Any object manipulations done are applied only to the current object. Other objects are still visible on the screen, but without the white border. The user can easily move from one object to another, making another object become the current object for manipulation.

When the user is satisfied with how an object is manipulated, a copy of the object may be pasted to the background. At this point, the copy of the object becomes part of the background. It is no longer an object. The original object, however, remains on top of the newly pasted copy. The user may continue to move and manipulate the original object or delete it.

Any objects that are not pasted to the background will not be saved when the background file is saved unless specifically invoked by another file format. If the user wishes to save an object, it can be saved separately as an object.

Glossary

In view of the Windows environment that the system 900 operates in, a glossary of Windows terminology is provided in Table 1.

TABLE 1

| | |
|---|---|
| Choose | To use a mouse or key combination to pick an item that begins an action. |
| Click | To press and release a mouse button quickly. |
| Dialog box | A rectangular box that either requests or provides information. Many dialog boxes present options to choose among before |

TABLE 1-continued

|  |  |
|---|---|
|  | Windows can carry out a command. Some dialog boxes present warnings or explain why a command cannot be completed. |
| Double-click | To rapidly press and release a mouse button twice without moving the mouse. Double-clicking carries out an action, such as opening an icon. |
| Drag | To move an item on the video screen by holding down a mouse button while moving the mouse. |
| Icon | A graphical representation of an element in a software program or in Windows. |
| Menu | A list of items, most of which are commands. Menu names appear in the menu bar near the top of the window. A command is used by selecting the menu name and then choosing the command. |
| Option | A choice in a dialog box. An option affects the way in which a command is carried out. Dialog boxes have several kinds of options, including mutually exclusive option buttons and non-exclusive check boxes. |
| Pixel | The smallest graphical units on the video screen. Also known as picture elements (pels). |
| Point | To move the pointer on the video screen until it rests on the item desired to be selected or chosen. |
| Pointer | The arrow-shaped cursor on the screen that indicates the position of the mouse. |
| Sub-menu | A menu contained within another menu. |
| Window | A rectangular area on the video screen providing a view of an application or document. |

The menus, sub-menus, dialog boxes, icons and so forth in the Windows environment that are controlled by the keyboard 922 (FIG. 18) and pointing device 924 make up what is known as a user interface. By choosing a particular item in a dialog box, for example, the user controls a type, shape, or size of a manipulation tool that is visible on the video monitor 906/908. By another choice, the user can execute a particular command, operation or process. Thus, by using the Windows user interface to interact with the system 900, the user can manipulate or edit an image.

A Clipboard is a temporary storage location that is available for transferring information. A Cut option and a Copy option are used to transfer information to the Clipboard, while a Paste option is used to transfer information from the Clipboard. The information is stored in the Clipboard until it is pasted or until another item (area or object) is cut or copied to the Clipboard. Only one area or object can be stored in the clipboard at a time.

The Cut option has two variations: "Cut Area" places a selected area on the Clipboard without removing the selected area from an image, while "Cut Object" removes selected objects from the image and places the objects on the Clipboard. The Cut option requires at least one image to be open or active. Cutting to the Clipboard replaces the current contents of the Clipboard. This option is useful for moving areas or objects into another image. The Copy option is similar to the Cut option except that "Copy Object" does not remove the selected object from the image but instead makes a copy of the object. The Paste option also has two variations: "Paste as New Image" inserts a copy of the Clipboard contents into a new image window, while ∓Paste as Object" inserts the contents of the Clipboard as an object into the active image. The Paste option is not valid if the Clipboard is empty. The user can therefore use "Copy Area" to make a copy of a selected area and then use "Paste as Object" to paste the selected area as an object without having to first explicitly make the area an object. The original copied area remains an area, not an object.

Referring generally to FIGS. 18, 19a, 19b, 19c and 19d, the top-level control flow 1002 performed by the system 900 will now be described. As previously mentioned, the flow 1002 is executed in the Windows environment on the computer 902.

Beginning at a start step 1004, the computer 902 proceeds to a decision step 1006 to determine if an image is to be acquired by use of the scanner 926. If so, at step 1008, the image is scanned by the scanner 926 and then saved to a file with an associated filename provided by the user of the system 900. The preferred location for saving the file is storage 904, although the file may be saved elsewhere, e.g., server 936. If the test at step 1006 proves false, the computer 902 proceeds to a decision step 1010 to determine if an image is to be acquired by use of the frame grabber 912. If so, at step 1012, the video image is captured by the frame grabber 912 and then saved to a file with an associated filename provided by the user of the system 900. Video images may be captured from a number of sources and later manipulated in the imaging system 900. For example, video images may be captured from the video camera 914, Photo CD 916, VCR tape 918, still video 920, or video camcorder (not shown). The user of the system 900 may utilize none, some, or all of these video sources for capturing an image or sequence of images.

The steps to capture a video image in the imaging system 900 are as follows:

1. Click "File" on the imaging system 900 menu bar.
2. Click "Acquire."
A sub menu appears on the video monitor screen.
3. Click "Video . . . " A dialog box appears on the video monitor screen.
4. Click on the name of the video frame grabber interface installed in the computer and then click "OK."
A dialog box appears on the video monitor screen.
5. Turn on the video image source (VCR, Photo CD Player, Video Camera, Still Video, Laser Disk, Camcorder, or other analog video source).
The video image appears in the Preview window of the dialog box.
6. Advance or reverse the video source until the frame desired for further editing or manipulation is reached. Then click on "Freeze."
7. If the frozen frame is the desired image for manipulation, click "OK." Otherwise, click on "Live" and repeat step 6.

After clicking on "Freeze" and "OK," the dialog box closes, a new document window opens on the video monitor screen, and the video image selected appears in the new window.

8. Save the new file as follows:
Click "Save Image as . . . " on the File menu. A dialog box appears on the video monitor screen.
Click on the drive and directory (and sub directory, if applicable) desired to save to.
Click inside the "File name" box in the dialog box.
Type the name desired for this file. Use up to eight characters plus a period and a three letter extension that denotes a file format. Files saved by the system 900 are formatted in Targa True Color 24-bit (.TGA extension) format, e.g., DOGS.TGA, or another format as described hereinbelow.

After saving the file at step 1012 or if the test at step 1010 proves false, the computer 902 moves to a decision step 1014 to determine if an upload operation is to be performed. If so, at step 1016, the computer 902 retrieves an image from a remote location via the modem 930 and telephone line 932, and saves the image to a file as previously described. For example, a business may have several branch locations with computers having video images needed by the user of the system 900. Step 1016 provides a quick way to retrieve these images. After saving the file at step 1016 or if the test at step 1014 proves false, the computer 902 moves to a decision step 1018 to determine if an image is to be imported from another program. These images may be formatted as Targa True Color 24-bit (TGA), BitMap (BMP), Joint Photographic Experts Group (JPEG), Tagged Image File Format (TIFF), Microsoft Paintbrush (PCX), Photo Compact Disk (PCD), Graphics Interchange Format (GIF), Run Length Encoded (RLE), Work in Progress (WIP), or Compressed (CMP) files. If so, at step 1020, the user selects a TGA or other accepted format file to be imported into the system 900. If the decision step 1018 proves false, at step 1022 the user selects an existing file to be opened by the computer 902. This file may be from a previous editing or manipulation session on the system 900, or as the result of step 1008, 1012, or 1016. Nevertheless, at the conclusion of step 1020 or step 1022, the computer opens an image file and proceeds to the off-page connector A 1024 to resume the flow on FIG. 19b at a decision step 1026.

At step 1026, a determination is made whether the user desires to work with an area of the image. If so, the computer 902 moves to a decision step 1028 to begin a series of area choices that are presented to the user. If the user does not desire to perform an area operation as determined by step 1026, the computer 902 moves through off page connector B to a decision step 1044 (FIG. 19c) to determine if the user desires to work with an object.

Returning attention to decision step 1028 (FIG. 19b), the computer 902 determines if the user desires to perform a mask procedure. If so, the computer 902 proceeds to a mask function 1030. A mask is an advanced feature of the imaging system 900 offering the user great flexibility in manipulating color in images by choosing which existing colors in the image will or will not be affected by further color manipulations. The mask function 1030 will be further described in conjunction with FIG. 20.

Upon return from the mask function 1030, or if the decision step 1028 is false, the computer moves to a decision step 1032 to determine if the user desires to perform a top-level gamma procedure. If so, the computer 902 proceeds to the top-level gamma function 262. The function 262 was previously described in conjunction with FIG. 12. Upon return from the top-level gamma function 262, or if the decision step 1032 is false, the computer moves to a decision step 1034 to determine if the user desires to perform one of the area options. If so., the computer 902 proceeds to step 1036 wherein one or more area options are performed. The area options will be described hereinbelow.

A description of how an area is selected follows. The presently preferred process of selecting an area of the background image to be manipulated is defined has eight options: Drag Box, Drag Free, Area Addition, Color Select, Brush Select, Area Subtraction, None, and Inverse. Of course, other embodiments of the invention may include other area selection methods. Drag box, drag free, and other pointing device selection methods are commonly called "mouse events", as the mouse is a very popular example of the pointing device 924. A selected area is indicated on the video monitor 906/908 by an animated black and white marquee that borders the selected area. Descriptions of these options follow:

Drag Box: Allows the user to .create a box boundary around part of an image for manipulation only within that selected area.

Freehand Drag: Allows the user to select an area of the image with a freehand outline or a series of connected lines. To create a freehand outline or boundary, drag the mouse and double click when finished. To create a connected-line outline, click once, position the mouse pointer at the next point, click again, and so on, until all lines have been drawn; then double click to complete the selection. The boundary created by the connected lines defines a polygon.

Area Addition: Allows the user to add additional selections to the current selection. Once the user clicks the area addition tool, "add" mode is retained until it is clicked again or switched to a different selection tool (drag box, drag free, color select, or brush select). All areas selected are outlined with the animated black and white marquee.

Color Select: Allows the user to select all contiguous pixels of the color that is clicked on. For example, having a red shape surrounded by another color, if the user clicks on the red shape, all contiguous red pixels are selected.

Brush Select: Allows the user to select an area using the brush. The pixels that are electronically "touched" by the brush that is controlled by the user using the pointing device 924 are selected.

Area Subtraction: Allows the user to deselect certain regions of the currently selected area. Click on the Area Subtraction tool and select areas to be subtracted. Again, "subtract" mode is retained until it is clicked again or switched to a different selection tool (drag box, drag free, color select, or brush select).

None: Clears all current area selections and selects the entire image for manipulation.

Inverse: Reverses the current selection. All currently selected areas become unselected and all previously deselected areas become selected.

Upon return from the area options step 1036, or if the decision step 1034 is false, the computer 902 moves to a decision step 1038 to determine if any alpha bits or flags are set in the alpha channel. If so, the computer advances to step 1039 and adjusts the available option set of subsequent operations. Certain options of an option family, e.g, brush options, are available or performed only if a particular alpha bit that corresponds to that option is set. Alpha channel bits were previously described in conjunction with layering (FIG. 11) and transparency/opacity (FIG. 16).

Upon return from the alpha channel step 1039, or if the decision step 1038 is false, the computer 902 moves to a decision step 1040 to determine if the user desires to perform one of the brush options. If so, the computer 902 proceeds to step 1042 wherein one or more brush options are performed. The brush options will be described hereinbelow. A link (not shown) exists between the brush options 1042 and the area options 1036 to allow .the option groups to work together, such as the brush shape being a small area of itself. A similar link (not shown) exists between the brush options 1042 and object options 1052 (FIG. 19c) to allow those option groups to work together, for such cases where a brush option is only effected on an object.

Upon return from the brush options step 1042, if the decision step 1040 is false, or if the decision step 1026 is false, the computer moves through off page connector B to decision step 1044 (FIG. 19c) to determine if the user desires to work with an object. If so, the computer 902 moves to a decision step 1046 to begin a series of object choices that are presented to the user. If the user does not desire to perform an object operation as determined by step 1044, the computer 902 moves to a decision step 1066 to determine if the user desires to make any additional selections.

Returning attention to decision step 1046 (FIG. 19c), the computer 902 determines if any alpha bits or flags are set in the alpha channel. If so, the computer advances to step 1047 and adjusts the available option set of subsequent operations. Moving to a decision step 1048, the computer 902 determines if the user desires to perform the mask procedure. If so, the computer 902 proceeds to the mask function 1030. The mask function 1030 will be further described in conjunction with FIG. 20.

Upon return from the mask function 1030, or if the decision step 1048 is false, the computer moves to a decision step 1050 to determine if the user desires to perform one of the object options. If so, the computer 902 proceeds to step 1052 wherein one or more object options are performed. The object options will be described hereinbelow. A link (not shown) exists between the object options 1052 and the area options 1036 to allow the option groups to work together, such as with the option "Object Re-color" where an object is used to affect an area. Upon return from the object options step 1052, or if the decision step 1050 is false, the computer moves to a decision step 1054 to determine if the user desires to perform a top-level gamma procedure. If so, the computer 902 proceeds to the top-level gamma function 262. The function 262 was previously described in conjunction with FIG. 12. Upon return from the top-level gamma function 262, or if the decision step 1054 is false, the computer moves to a decision step 1058 to determine if the user desires to perform layering. If so, the computer 902 proceeds to the layering function 274. The layering function 274 was previously described in conjunction with FIG. 11.

Upon return from the layering function 274 or if the decision step 1058 is false, the computer moves to decision step 1062 to determine if the user desires to work with text. If so, the computer advances to a step 1064 wherein text is added, deleted, or otherwise manipulated. Options available include changing font, font size, font style; regular type, bold type, shadow, keyline, 3-dimension; centering horizontally, centering vertically; left justification, center justification; restore; transparent text background; moving text; sizing text; and rotating text. Keyline formats the text in a typeface that incorporates into each letter the foreground, middle ground, and background colors selected by the user. Since text is considered an object by the system 900, the move, size, and rotate options basically are the same as those in the object options step 1052. Text objects default to black with a transparent background. Note that text rotation requires, at a minimum, Microsoft Windows revision 3.1 and True Type fonts.

Upon completion of the text step 1064, if decision step 1062 is false, or if the decision step 1044 is false, the computer 902 moves to a decision step 1066 to determine if the user desires to perform additional area or object manipulations. If so, the computer 902 loops back through off page connector C to step 1026 (FIG. 19b) to repeat the steps 1026 through 1066. If no additional manipulations are desired, as determined by step 1066, the computer 902 advances to a decision step 1068 (via the off-page connector d to FIG. 19d to determine if the user desires to print the current image. If so, at step 1070, the computer 902 sends the current image to be printed at the printer 928. This image is a digital image from the computer 902 or the storage 904 at a user-selectable resolution. In another embodiment, the computer 902 sends the current image through the server interface 934 to the print server 938 for subsequent printing at the printer 928. In yet another embodiment that is not shown on FIG. 18, the frame grabber 912 can send a video image, at video resolution, via the video out port to the printer 928.

Upon completion of the printing step 1070 or if decision step 1068 is false, the computer 902 moves to a decision step 1072 to determine if the user desires to perform a download operation. If so, at step 1074, the computer 902 sends the current image to a user-determined destination via the modem 930 or to the server 936. The download operation can be done only if the modem 930 or server 936 are connected to the system 900.

Upon completion of the download step 1074 or if decision step 1072 is false, the computer 902 moves to a decision step 1076 to determine if the user desires to save the current image in a file. If so, at step 1078, the user chooses among several options. If the user created the current image, e.g. by drawing, the "Save Image As . . . " selection prompts the user for a path and filename in which to save the file, and the number of colors with which to perform the save. After the user enters the requested information, the computer 902 performs the save. To save changes to a file that has previously been saved, the user selects "Save Image". To save changes to a file while keeping a copy of the original version, the user selects "Save Image As . . . " and provides a filename that is different than the original version. Only the image background is saved. Any objects not affixed to the background are not saved. To save an image and its objects without affixing the objects to the background, the user selects "Save Work in Progress" and provides a patch and filename. The .WIP extension is used with saving all work in progress. To save a current object that has been created, the user selects "Save Object. . . " and provides a path and filename. Object images are saved with a file extension of .IMI, while picture or background images are saved with a file format (e.g., TGA) as described in conjunction with step 1018. Three formats in addition to those previously described, Encapsulated PostScript (EPS), Windows Metafile (WMF), and Imagewear (PAM), are only available for saving (write only).

Upon completion of the save step 1078, or if decision step 1076 is false, the computer 902 moves to step 1080 to close the current file, which removes it from the video monitor screen. The top-level control flow 1002 ends at step 1082.

Figure 19A:
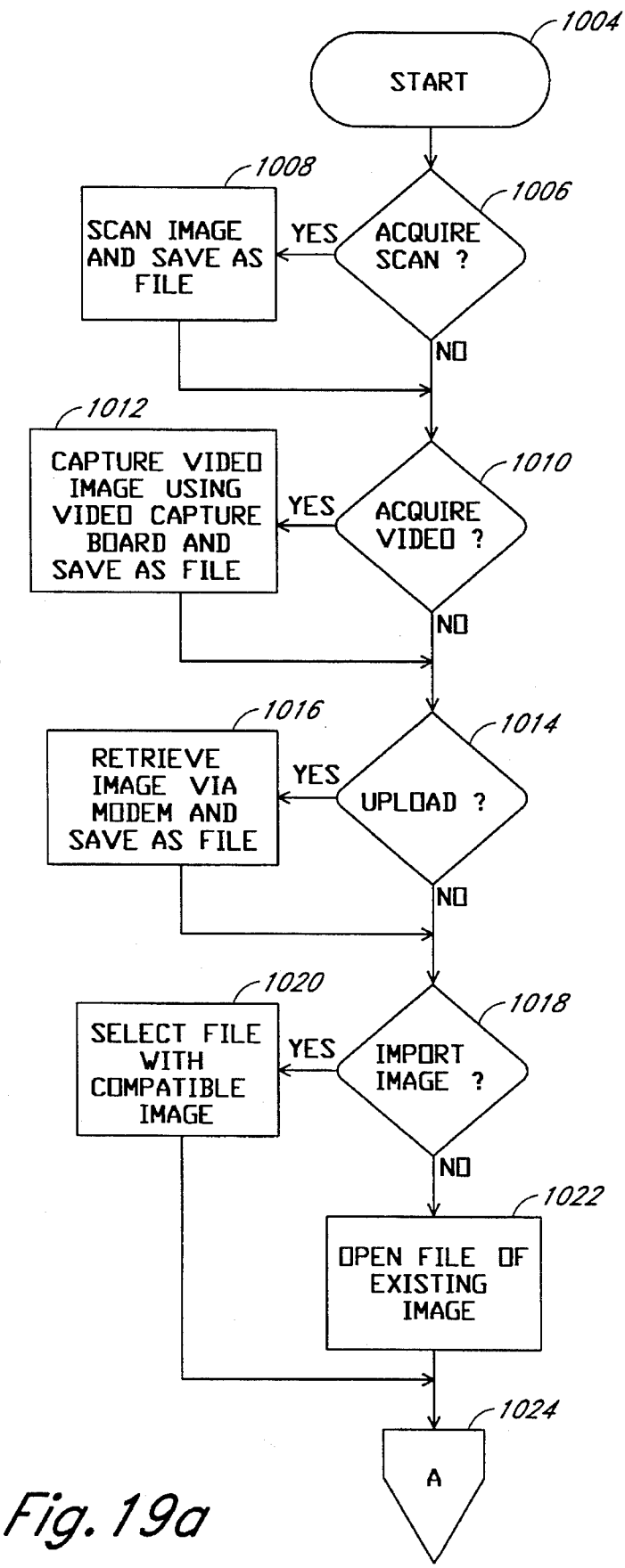
FIGS. 19a, 19b, and 19c and 19d are a top-level flow diagram of the imaging system of FIG. 18.
Figure 19B:
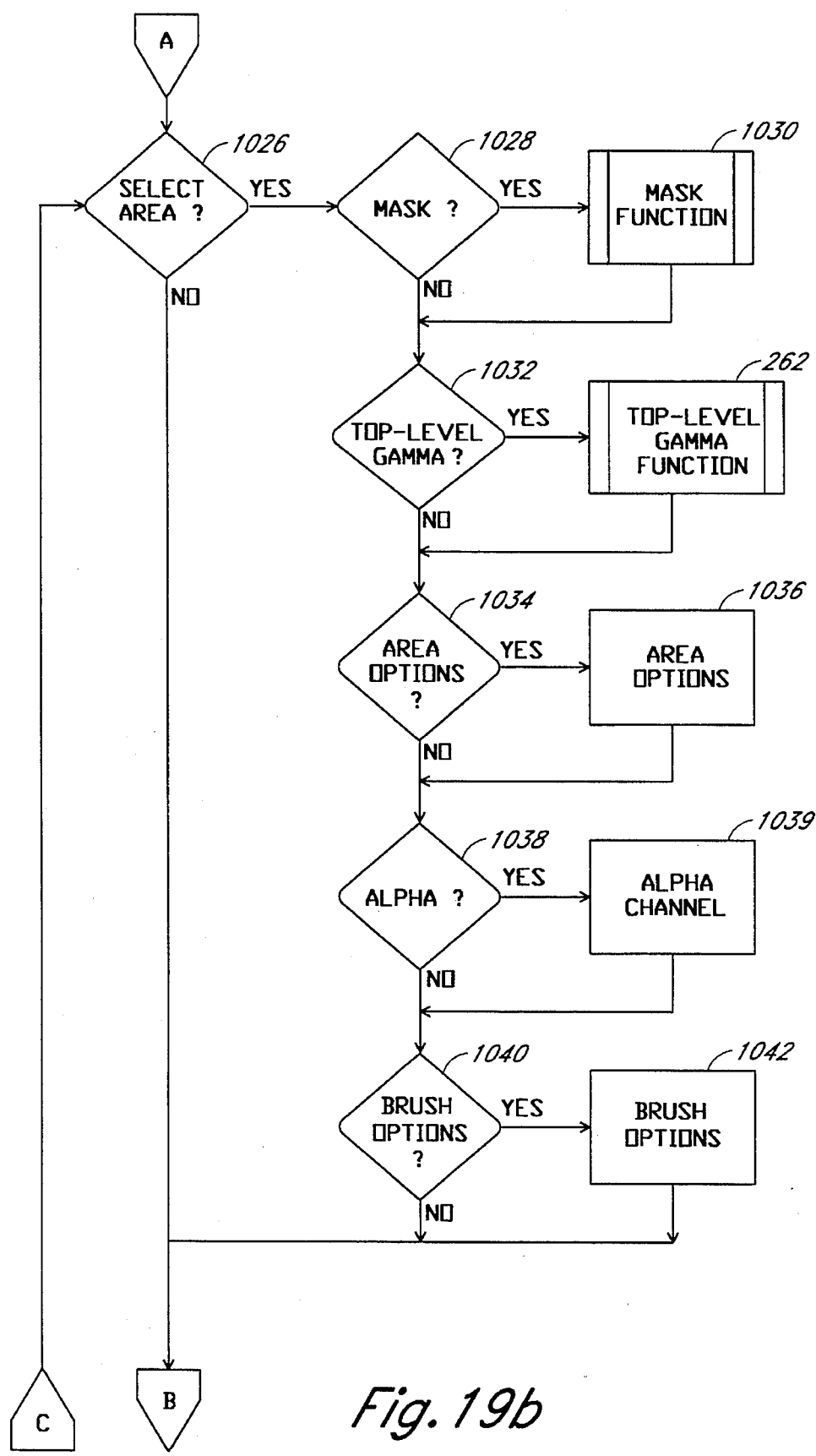
Figures 20, 20A:
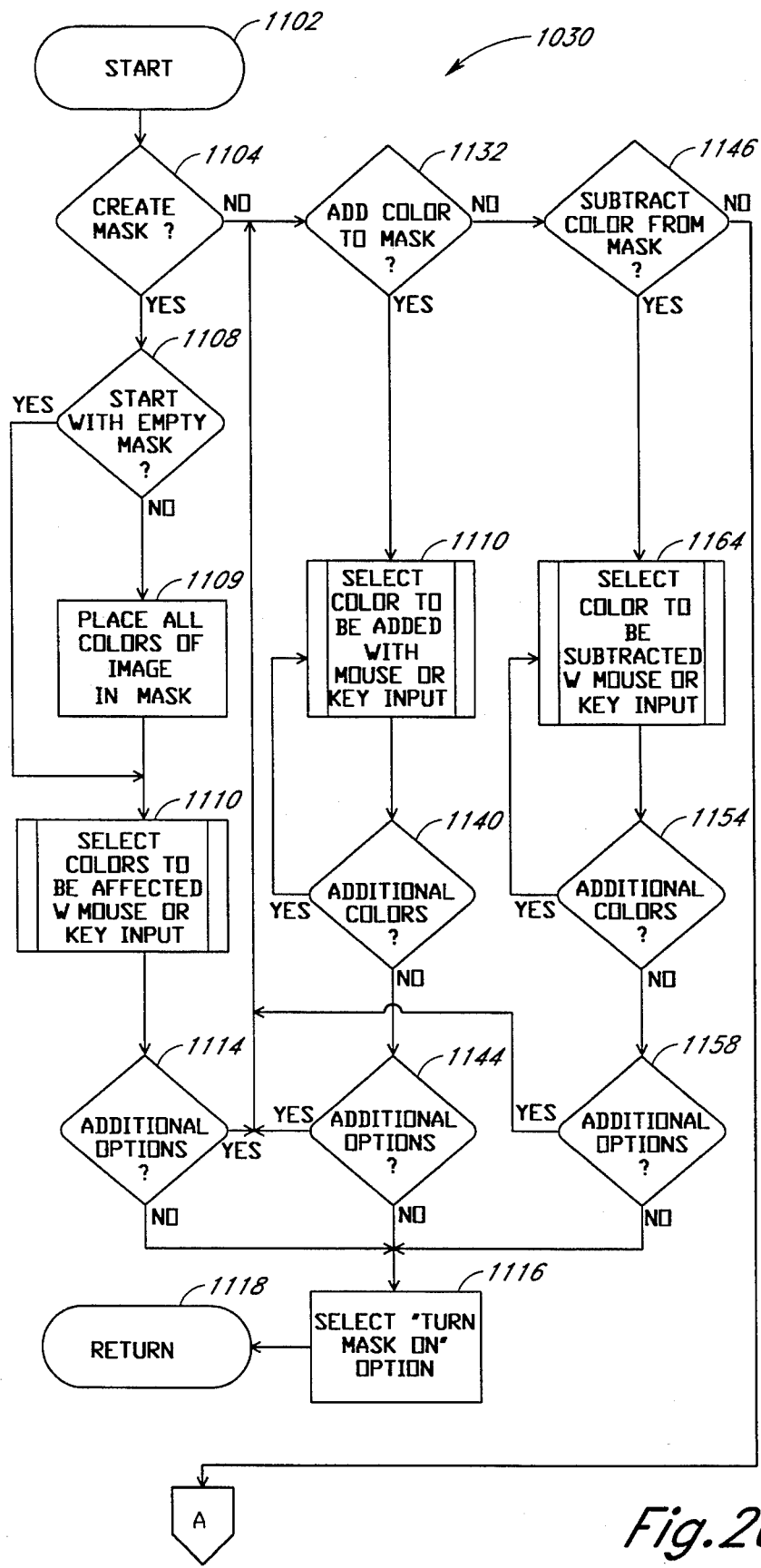
FIGS. 20a and 20b are a flow diagram of the mask function defined as block 1030 in FIG. 19b.
Figure 20B:
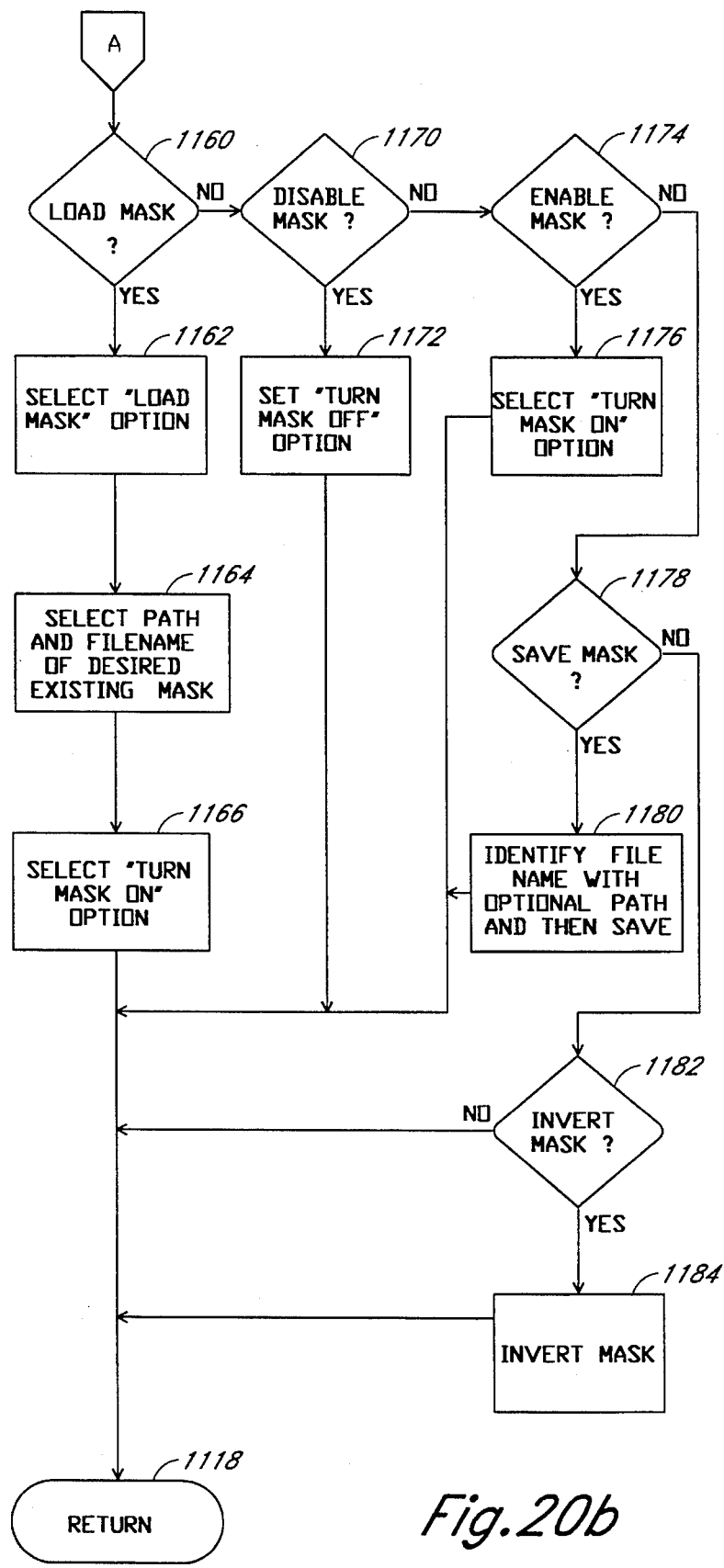

Referring to FIGS. 20a and 20b, the color mask function 1030 defined in FIG. 19b will now be described. The masking feature of the imaging system 900 provides the flexibility in manipulating color in images by choosing which existing colors in an image will or will not be affected by further color manipulations. The mask allows changes to be made based on color instead of area. When a mask is in use, manipulations affect only those colors defined in the mask, unless the Invert option is selected. Using the Invert option, all colors of the image except those defined to be in the mask will be affected by further manipulation. Only one mask is in use at a time. A mask applies only to the active image window.

Beginning at a start step 1102 (FIG. 20a), the computer 902 proceeds to determine if the user desires to create a mask at a decision step 1104. If so, the computer 902 moves to a decision step 1108 and determines if the user desires to begin with an empty mask, i.e., no colors are in the mask. Each non-object image has an associated mask that originally is available when the image is created, and the mask is in the empty condition. If the user does not desire to begin with an empty mask, the computer moves to step 1109 wherein all the colors of the image are captured on a pixel by pixel basis by the computer 902 and placed in the current mask. Color capture is described at function 1110 (FIG. 21) below. However, if the user desires to begin with an empty mask as determined by step 1108, the computer 902 proceeds to a mask color structure function 1110 wherein the user selects the colors to be affected or unaffected by further color manipulations. The user performs this selection by any of the methods previously described for selecting an area, e.g., Drag Box. A color value entry is then made in the mask color structure by the computer 902 for each color selected. Function 1110 is further described in conjunction with FIG. 21. Moving to a decision step 1114, a determination is made whether the user desires to select any additional mask options. If so, the computer 902 moves to a decision step 1132. However, if no additional options are desired by the user as determined in step 1114, the computer 902 moves to step 1116 wherein the user selects a "Turn Mask On" option. The word "Mask" appears on the lower portion of the video monitor 906/908 to indicate that the mask is in effect or activated. The computer 902 returns at step 1118 to the top-level control flow 1002 (FIG. 19).

The user is now ready to use the mask. The user selects an area, using any of the area selection methods previously mentioned, or selects an object for color manipulation. The area can be the entire image or a portion of the entire image. Object selection will be described in conjunction with the description of the object options hereinbelow. When the mask is activated, any changes made using the following options affects only those colors identified in the mask: Brush options; Area and Object options of Fill, Tint, Posterize, Gray-scale, Sharpen, Blur, and Adjust Color; and Area option Stamp into Selection. These Brush, Area, and Object options are described hereinbelow. Colors of the image that are not included in the mask are not changed. The image manipulation performed by these options on the pixels that correspond to the colors identified in the mask is done automatically for all the colors of the mask, i.e., the user does not repeat the option individually for each color in the mask. Once the user selects the colors desired for the mask and initiates one of the above-listed image manipulation options, the computer 902 processes all the colors of the mask without further user intervention.

The system 900 provides several commands for the user to obtain mask information while creating the mask. These are described as follows:

Change to White, Colors in Mask: All the colors selected for the mask appear in white on the image. The user thus sees how much of the image is impacted by the mask colors.

Change to White, Colors Not in Mask: All the colors not selected for the mask appear in white on the image, or in other words, the image is displayed with only the colors selected for the mask and all other colors are shown in white. The user thus sees how much of the image is not affected by the mask colors.

Normal Mask View: This command cancels either of the Change to White commands above. The image is shown with normal colors, i.e., the white covering is removed.

View Outline of Mask Colors: An outline of alternating yellow and black dashes is displayed around all instances of the colors selected for the mask within the image.

Remove Outline of Mask Colors: This command takes away the mask color outline of the View Outline command.

Preview Mask: A View Mask box is displayed on the video monitor 906/908 so that the user can quickly and easily see, before actually using the mask, if all the colors desired for the mask have been selected. Thus, the user can check the colors selected so far for the mask, and determine, for example, if too many colors were inadvertently selected. The left side of the box displays a preview of the entire image. A selection box below the preview image allows the user two choices of the colors to view. When "In Mask" is selected, only the colors selected for the color mask are displayed in color. All other colors of the image are displayed in white. When "Not in Mask" is selected, only the colors not in the mask are displayed. Colors in the mask are displayed in white. The right side of the View Mask box displays a palette or spectrum of colors that are in, or not in, the color mask, depending on whether "In Mask" or "Not in Mask" is selected.

Referring again to FIG. 20a, if the decision step 1104 proves false, i.e., the user does not desire to create a mask, or if the user desires an additional mask option, as determined by step 1114, the computer 902 proceeds to determine if the user desires to add additional colors to the mask at the decision step 1132. If so, the computer moves to the mask color structure function 1110 wherein the user selects the colors to be added to the mask for further color manipulations. Function 1110 is further described in conjunction with FIG. 21. Moving to a decision step 1140, a determination is made whether the user desires to select any additional colors to be added. If so, the computer 902 loops back to function 1110 to repeat the function for the additional selection.

However, if the decision step 1140 step proves false, i.e., when no further colors are to be selected for the mask, the computer 902 moves to a decision step 1144 wherein a determination is made whether the user desires to select any additional mask options. If so, the computer 902 moves to decision step 1132. However, if no additional options are desired by the user as determined in step 1144, the computer 902 moves to step 1116 wherein the user sets the "Turn Mask On" option. The word "Mask" appears on the lower portion of the video monitor 906/908 to indicate that the mask is in effect. The computer 902 returns at step 1118 to the top-level control flow 1002 (FIG. 19). As previously described, the user is now ready to use the mask.

However, if the decision step 1132 proves false, i.e., the user did not desire to add colors to a previously defined mask, the computer 902 proceeds to determine if the user desires to subtract or delete colors from the mask at a decision step 1146. If so, the computer executes function 1110 and a set of steps 1154, 1158 that are the same as function 1110 and steps 1140, 1144 except that function 1110 and step 1154 subtract or delete colors from the mask rather than adding colors. Also, at function 1110, a color value is deleted from the color structure by the computer 902 for each color selected.

However, if the decision step 1146 proves false, i.e., user did not desire to subtract colors from a previously defined mask, the computer 902 proceeds through off page connector A to determine if the user desires to load a previously defined mask at a decision step 1160 (FIG. 20b. If the mask for the current image is not empty, i.e., has colors in it, at the time of the load, the colors in the mask are replaced by those in the mask that is loaded. If decision step 1160 is true, the computer 902 moves to step 1162 wherein the user mouse clicks on a "Load Mask..." option. The computer 902 then displays a dialog box on the video monitor 906/908 showing a list of previously created mask files from which to choose. The user can change the drive and/or directory to see a list of previously created mask files on different drives and/or directories. At step 1164, the user selects a mask file to be loaded and mouse clicks on the file name. Moving to step 1166, the user sets the "Turn Mask On" option. The word "Mask" appears on the lower portion of the video monitor 906/908 to indicate that the mask is in effect. The computer 902 returns at step 1118 to the top-level control flow 1002 (FIG. 19). As previously described, the user is now ready to use the mask.

However, if the decision step 1160 (FIG. 20b) proves false, i.e., the user did not desire to load a previously defined mask, the computer 902 proceeds to determine if the user desires to disable the most recently defined or current mask at a decision step 1170. If so, the computer 902 moves to step 1172 wherein the user sets a "Turn Mask Off" option. This capability is for when the user does not wish to use the most recently defined mask, but may use the mask later, or if the user is finished using the mask. The "Mask" indicator disappears from the bottom of the video monitor screen to indicate that no mask is in use. The computer 902 maintains the selected colors in the mask color structure until the user terminates the image editing program, or the user selects the create mask option at steps 1104 to 1114 (which begins the color selection process anew). In either of the two cases of the last sentence and if the user has not saved the mask to a file, the colors selected for the mask are lost. The computer 902 returns at step 1118 to the top-level control flow 1002 (FIG. 19).

If the decision step 1170 proves false, i.e., the user did not desire to disable the current mask, the computer 902 proceeds to determine if the user desires to enable the most recently defined mask at a decision step 1174. If so, the computer 902 moves to step 1176 wherein the user sets the "Turn Mask On" option. Then, "Mask" appears on the lower portion of the video monitor screen to indicate that the mask is in effect. The computer 902 returns at step 1118 to the top-level control flow 1002 (FIG. 19). As previously described, the user is now ready to use the mask.

If the decision step 1174 proves false, i.e., the user did not desire to enable the current mask, the computer 902 proceeds to determine if the user desires to save the most recently defined mask at a decision step 1178. The user may want to save the mask, and thereby save the colors in the mask, if there is a chance of reusing the mask at a later time. If so, the computer 902 moves to step 1180 wherein the user mouse clicks on a "Save Mask..." selection. The computer 902 then displays a dialog box on the video monitor 906/908. The user can change the drive and/or directory to which the created mask will be saved and then type the desired name to correspond with the file using up to eight characters plus an extension of ".MSK" to identify this file as a mask file. The computer 902 returns at step 1118 to the top-level control flow 1002 (FIG. 19). The save capability allows the user to keep a current copy of a recently created mask, which may often be reused in the future, as a file. In this way, the user can then load the mask with the same or any other image file desired. The user can save as many masks as desired.

If the decision step 1178 proves false, i.e., the user did not request a save of the current mask, the computer 902 proceeds to determine if the user desires to invert the current mask at a decision step 1182. If so, the computer 902 moves to step 1184 wherein the computer performs an invert of the mask. The invert operation results in the mask having all the colors of the image except those that were defined to be in the mask before step 1184. At the completion of step 1184 or if decision step 1182 proves false, the computer 902 returns at step 1118 to the top-level control flow 1002 (FIG. 19).

Figure 21:
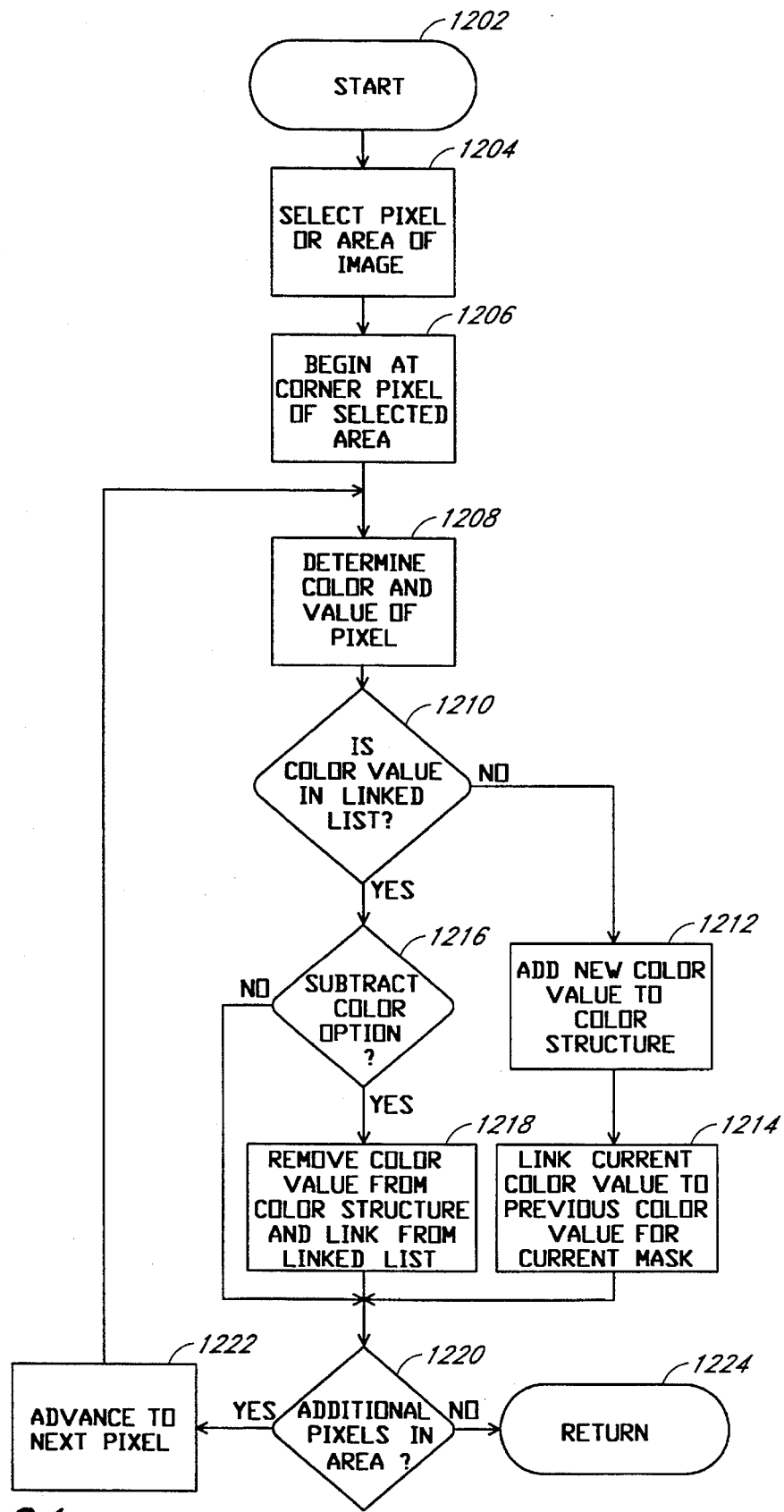
FIG. 21 is a flow diagram of the mask color structure function defined as block 1110 in FIG. 20.

Referring to FIG. 21, the mask color structure defined in block 1110 of FIG. 20a will now be described. Beginning at a start step 1202, the computer 902 moves to step 1204 wherein the user selects an area of the current image to identify a color or colors of interest. This selection is accomplished by any of the area selection methods previously described. The selected area is surrounded by an outline of alternating dashes. By use of a zoom option, the area selected may be as small as a single pixel.

Moving to step 1206, the computer begins at a preselected pixel location of the selected area. Then, at step 1208, the computer 902 determines the color and value of the current pixel. The value, for example, may include hue and saturation attributes or components, and will be described hereinbelow. Moving to a decision step 1210, the computer 902 tests whether the color value for the color of the current pixel as determined at step 1208 is already linked in a linked list structure of color values. If not, the computer 902 adds the color value for the color of the current pixel to the mask color structure at step 1212. The mask color structure is further described below. At the completion of step 1212, the computer 902 moves to step 1214 wherein the color value for the color of the current pixel is linked to a previous color value for another color (if one exists) of the current mask by use of the linked list structure. There is a linked list structure for each mask (current or saved as a file). Linked list structure, along with linking and unlinking procedures, is well known in the software art.

However, if the decision step 1210 proves true, i.e., the color value of the current pixel is already in the linked list, the computer 902 proceeds to a decision step 1216. At step 1216, the computer 902 determines if the subtract option was selected in the calling color mask function 1030 (FIG. 20). If so, at step 1218, the computer 902 deletes the color value from the color structure and also removes the color value from the linked list.

Upon completion of either step 1218 or step 1214, or if the decision step 1216 proves false, the computer 902 moves to a decision step 1220 to determine whether there are additional pixels in the selected area to be tested. If so, at step 1222, the computer 902 advances to the next pixel in the selected area and loops back to step 1208 to determine the color and value of the new current pixel. The loop of steps 1208 through 1222 continues until the decision step 1220 determines that all pixels in the selected area have been tested, at which time the computer returns at step 1224 to the color mask function 1030 (FIG. 20).

Figure 22A:
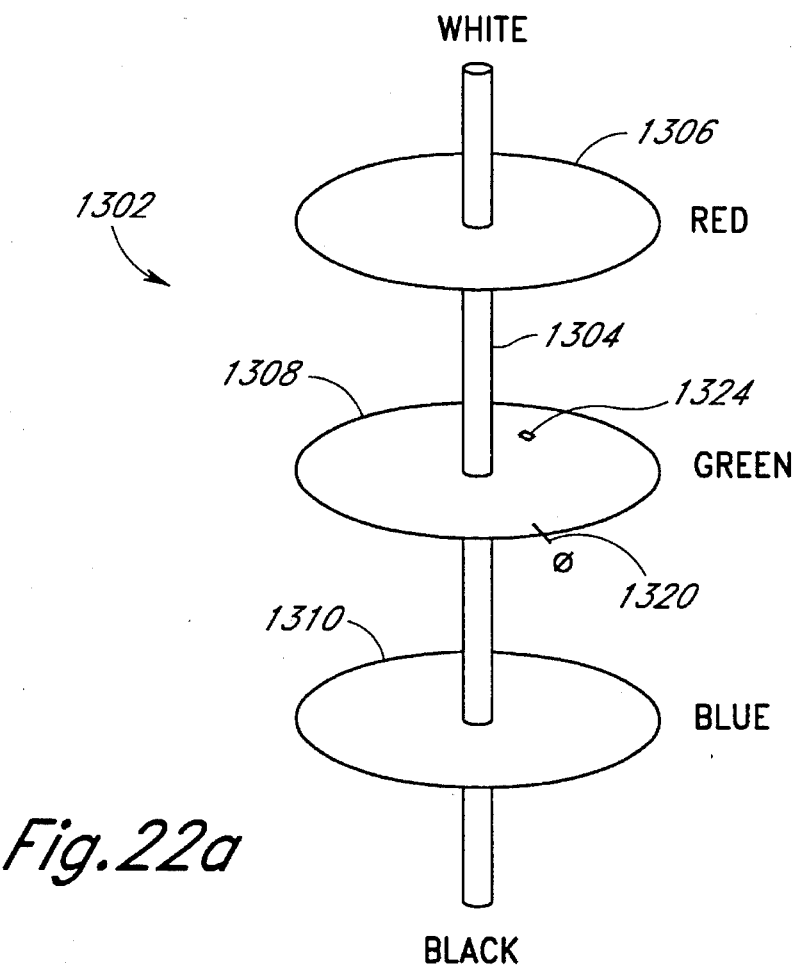
FIGS. 22a and 22b are diagrams of an exemplary mask color structure as used by the mask function of FIG. 20.
Figure 22B:
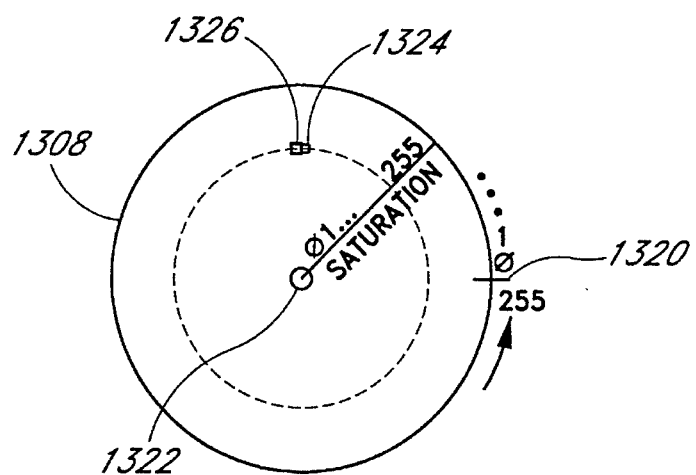

FIGS. 22a and 22b illustrate an exemplary mask color structure 1302. The mask color structure provides a way of visualizing the colors and their attributes. As seen in FIG. 22a, the vertical axis 1304 represents the contrast attribute in a range from white at the top to black at the bottom. On the axis 1304 are three disks representing a red plane 1306, a green plane 1308 and a blue plane 1310. A single plane, for example, the green plane 1308, is shown in FIG. 22b. The disk of the green plane represents hue attributes and saturation attributes for this plane. The hue attribute value has a numerical range of zero to 255 starting at an origin 1320 and proceeding counter-clockwise around the disk.

For the color under consideration, green, for example, values near the zero end of the scale denote less green, while values near the 255 end of the scale denote more green. The saturation attribute value also has a numerical range of zero to 255 starting at an origin 1322 at the center of the disk and proceeding radially outward to the edge of the disk. An example of a pixel having a hue attribute value of 64 and a saturation attribute value of 170 on the green plane 1308 is identified by a small box 1324 on both FIGS. 22a and 22b. A second small box 1326 represents a slightly different but unique color than that of box 1324. Using this model, over 16 million unique colors can be represented. Of course, other color models can be used in representing a color structure.

Each color that is defined to be part of a mask is identified on the color structure and is also linked with a previous color (if one exists) in the linked list. When a mask is utilized for pixel manipulation, mask processing of the colors is achieved by use of the linked list of the defined colors. When the user has finished selecting the colors desired for the mask and initiated an operation using the mask, the computer 902 sequentially processes each color in the linked list, without further user intervention.

Application of Masks

As an example, consider an image acquired by use of the frame grabber interface 912. This image has a background and a person in the foreground. When this image was digitized prior to being stored by the computer 902, video noise was also digitized and stored. Video noise includes extraneous signals or unwanted disturbances that appear on a video image due to the recording (loss of generation signal) and digitizing (analog degradation) processes. To remove the pixels of video noise from the image, the user defines a mask to include the colors of the video noise. The user then selects a Blur option using the mask to target the noise pixels to be blended into the desired surrounding background image. The blending of the noise pixels effectively removes the video noise.

Use of the mask provides great capability in editing sequences of frames. These sequences can be, for example, from a roll of film used in a still camera and transferred to a Photo CD, or from a camcorder video. Each image frame is processed by the steps of FIG. 19 in a sequential manner and then a loop (not shown) is done to access the next frame and repeat the process until the sequence of frames is completed.

As an example, a video sequence of frames acquired from a camcorder has images of a scenic background and a person. A mask is defined to include the background. The user can choose to entirely replace the background or have a special effect added by use of the mask. The person is not affected by the changes. This procedure allows the user to change or modify the background of the camcorder video sequence without affecting the image of the person. The preceding example can be reversed such that the background is retained and the mask is defined for the colors of the person. In this case, the user desires to keep the background as is, but desires to modify or replace the person with another person or object.

As another example, consider a photographer who used a roll of daylight type film exposed under fluorescent lighting conditions. This roll of film is transferred to a Photo CD and then acquired by the computer 902. The user of the system 900 can remedy the lighting problem by defining a mask for the color of the fluorescent lighting and then removing the color from each frame of the film. The resultant frames are free of the negative effects of the fluorescent lighting.

Object ReColor

One of the options available at the brush options step 1042 (FIG. 19b) is Object Re-Color. Referring to FIGS. 23a and 23, a description of the Object Re-Color option 1400 follows.

Beginning at a start step 1402, the computer 902 advances to a decision step 1404 to determine whether the user desires to use the "Grab Color" method. If so, the computer moves to step 1406 wherein the user selects either a single pixel or an area on the image. Then, at step 1408, the computer grabs the color to be used in subsequent processing from the selection of step 1406. If the computer determines, at a decision step 1410, that only one pixel was selected at step 1406, the color is defined (by step 1408), and the computer moves through off page connector A to step 1422 on FIG. 23b.

Figure 23B:
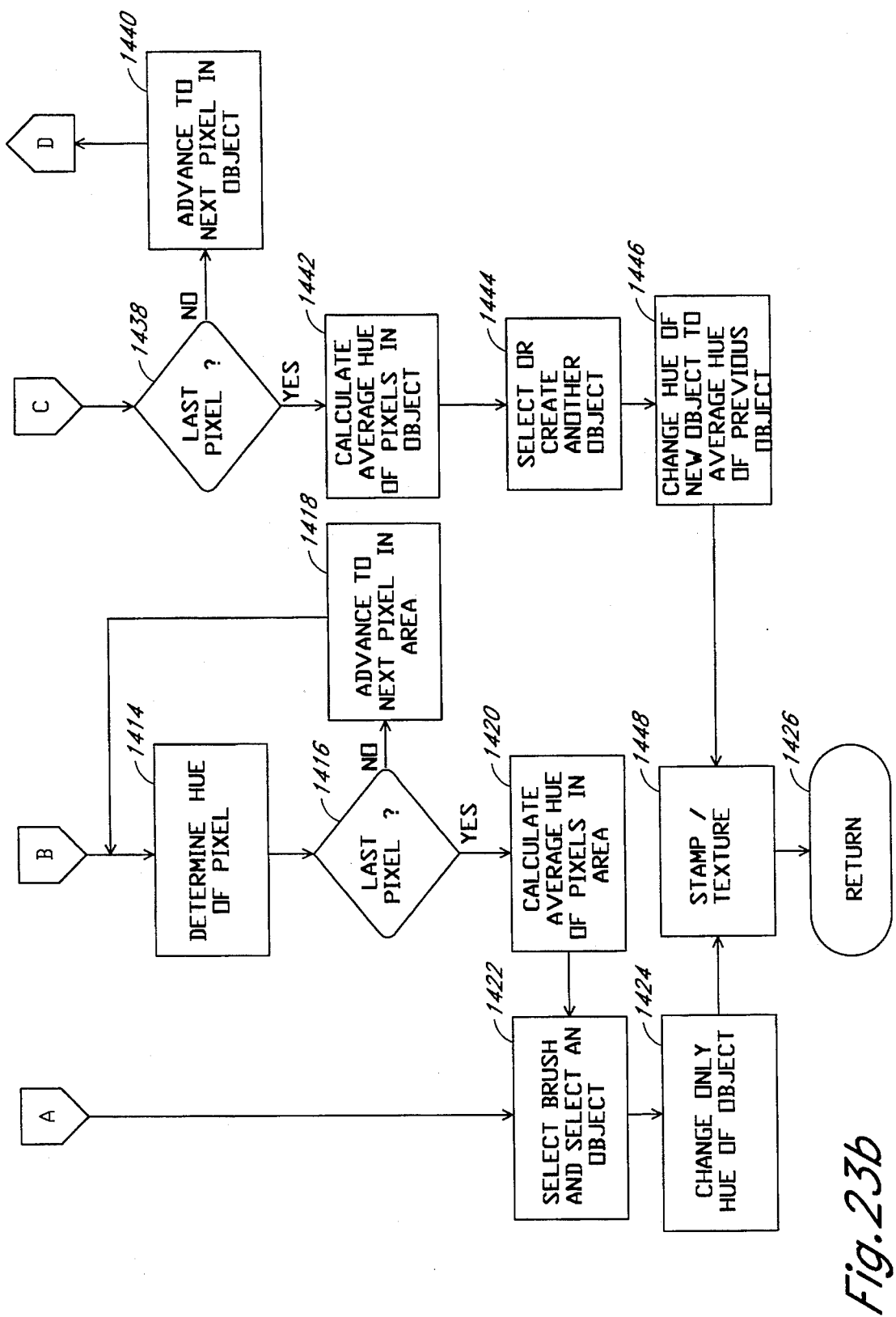

However, if more than one pixel was selected at step 1410 (FIG. 23a), the computer 902 moves to step 1412 and begins, at a predetermined pixel location of the selected area, a process to determine an average hue (steps 1414–1420 of FIG. 23b). At step 1414 (FIG. 23b), the computer 902 determines the hue of the current pixel. Moving to a decision step 1416, the computer determines if the last pixel of the selected area has been processed. If not, the computer 902 moves to step 1418 and advances to the next pixel in the selected area. The computer 902 then moves back to step 1414 to repeat the hue determination process for the next pixel. If the last pixel has been processed, as determined by step 1416, the computer 902 moves to step 1420 and calculates the average hue of the pixels in the selected area.

At the completion of step 1420 (FIG. 23b), or if only one pixel was selected, the hue of the single pixel or the average hue has been determined. At step 1422, the user selects a brush size and shape via the Windows user interface, along with an object that is to be changed by option 1400. At step 1424, the hue of the desired object is changed to the above-determined hue, or in other words, the object is re-colored. The luminance and contrast of the object are not affected, such that the monochrome content remains the same. For example, the user could change the hue of a three dimensional box from yellow to red. ReColor accomplishes this hue change without affecting the shadows, texture, attributes, and artifacts of the box. A texture operation is optionally performed by the computer 902 at step 1448, which is described hereinbelow. The computer 902 returns at step 1426 to the brush options step 1042 (FIG. 19b).

However, if the user does not desire to use the "Grab Color" method, as determined at decision step 1404 (FIG. 23a), the computer moves to step 1430 wherein the user selects an area of the image to be used as an object. This selection is done by any of the area selection methods previously described. At step 1432, the user selects a "Grab Object" option so that the computer 902 grabs the selected area as the desired object. Then, at step 1434, the computer 902 begins a process at a predetermined pixel location of the object to determine an average hue. At step 1436, the computer 902 determines the hue of the current pixel. Moving through off page connector C top a decision step 1438 (FIG. 23b), the computer determines if the last pixel of the object has been processed. If not, the computer 902 moves to step 1440 and advances to the next pixel in the selected area. The computer 902 then moves back through off page connector d to step 1436 (FIG. 23a) to repeat the hue determination process for the next pixel. If the last pixel has been processed, as determined by step 1438 (FIG. 23b), the computer 902 moves to step 1442 and calculates the average hue of the pixels in the object.

At the completion of step 1442, the average hue of the object has been determined. At step 1444, the user may either select another object or create a new object. Then, at step 1446, the computer 902 changes the hue, or re-colors the object selected at step 1444 to the average hue, determined at step 1442, of the previously selected object. For example, if the background image is a blue sky with a cloud, the user could grab the cloud as an object. The system 900 derives an average hue of the cloud object. This average hue can then be used to create additional clouds of a matching hue. At step 1448, an optional Object Texture Recolor operation is performed that textures an area using the color of the object identified at step 1432. Finally, the computer 902 returns at step 1426 to the brush options step 1042 (FIG. 19b).

Additional options that are implemented in the system 900 and which are disclosed in detail in the attached Microfiche Appendix include the following. The options are grouped into the Area Options (step 1036 of FIG. 19*b*), Brush Options (step 1042), and Object Options (step 1052 of FIG. 19*c*).

Area Options

The area options step 1036 of FIG. 19*b* includes a plurality of options to manipulate areas of the background. Some of the options that the user may wish to perform on an image using a mask are in the area options grouping. The area options are summarized as follows:

Sharpen: Increases the contrast between the adjacent colors in the selected area to more sharply define the area. A sub-menu is displayed on the video monitor 906/908 which allows the user to choose the level of sharpening from among low, medium, or high.

Blur: Blends the edges between one color and another to create a soft effect. A sub-menu is displayed which allows the user to choose the level of blurring from among low, medium, or high.

Fill: Fills the selected area with color. A dialog box is displayed which allows a choice of whether to fill the area evenly or on a gradient.

Tint: Applies a shade of the foreground color to the selected area that replaces the hue and saturation of the area with that of the tint applied, while maintaining the lightness of the area.

Posterize: Reduces the number of colors in the selected area. A sub-menu is displayed which allows the user to choose how many colors are to be used in the area.

Gray-Scale: Transforms the selected area to gray-scale by averaging the reds, greens, and blues in the selected area.

Adjust Color: Adjusts the existing color in the selected area. A dialog box is displayed which gives the user a choice of whether to adjust the color evenly or on a gradient. Then, a choice of whether to adjust the values of RGB (red, green, blue), HSL (hue, saturation, lightness), or HSC (hue, saturation, contrast) is given. Further choices are provided based on the responses to the above determinations. In other embodiments, color models such as CMYK (cyan, magenta, yellow, black) and YUV (chroma, contrast, intensity) may be utilized.

Flip Horizontal: Turns a selected area 180 degrees horizontally to create a mirror image of the original. If no area is selected, the entire image is flipped.

Flip Vertical: Turns a selected area 180 degrees vertically such that the bottom of the picture becomes the top. If no area is selected, the entire image is flipped.

Stamp into Selection: Stamps or clones copies of the current object into a selected area. The user must create a new object or load an existing object before using this option. The object is stamped until the selected area is filled. If no area selection is made, copies of the object are stamped into the entire image.

The Stamp into Selection option can be used to tile a border around an image. First the user loads or creates an object. Then, by using an area selection option, e.g. area box, the user draws a box in the center of the image at a distance of a desired border width from each edge of the image. Next, the user chooses the invert option to select the area of the image outside the area box that will contain the border. Finally, the user chooses the Stamp into Selection option to clone the object in a tile pattern (the entire object is repeated such that the objects are adjacent) in the border area. Thus, the original image remains in the center area, and a border having a repeating pattern of the current object is created around the center image.

Brush Options

The brush options step 1042 of FIG. 19*b* includes a plurality of options to manipulate areas of the background. However, some options use objects during the execution. Some of the options that the user may wish to perform on an image using a mask are in the brush options grouping. The brush options are summarized as follows:

Sharpen: Increases the contrast between adjacent colors to more sharply define an area as the user holds down the left mouse button and drags the mouse.

Blur: Blends adjacent colors to soften an area as the user holds down the left mouse button and drags the mouse.

"Painting and Drawing" Group of the Brush Options

The following brush options from the brush options step 1042 are used for drawing or to paint over an area. These options affect background and selected areas only, not objects. A paintbrush that is controlled by the user using the pointing device 924 (FIG. 18) is adjustable in size and shape from among many size selections, including eight circular sizes, six square sizes, two diagonal lines, four lengths of horizontal lines, and four lengths of vertical lines. These selections are made using the Windows user interface. The user may also choose particular colors by use of the user interface. The foreground, middle ground, or background color that is used for painting may be chosen by the user from a palette of colors. The user then may choose between the foreground, middle ground, or background color by use of the pointing device 924. For example, using a three button mouse, the left mouse button applies the foreground color, the middle button applies the middle ground color, and the right mouse button applies the background color.

Freehand Draw: Allows the user to draw freehand design as the mouse button is held down and the mouse is dragged.

Line Draw: Allows the user to draw a perfectly straight line by clicking a mouse button at the beginning of the line and again at the end of the line.

Connected Line Draw: Allows the user to draw a series of connected lines. This option is similar to "Line Draw" except that the user clicks with a different mouse button when finished.

Frame: Allows the user to draw a rectangular frame on the image. To draw a frame in the shape of a true square, the user holds the CTRL key down while drawing.

Filled Frame: Allows the user to draw a rectangular frame filled with solid color. To draw a filled frame in the shape of a true square, the user holds the CTRL key down while drawing.

Air Brush: Allows the user to draw with a spray paint effect.

Round Cornered Frame: Allows the user to draw a frame with rounded corners. To draw a true square, the user holds the CTRL key down while drawing.

Filled Round Cornered Frame: Allows the user to draw a frame with rounded corners filled with solid color. To draw a true square, the user holds the CTRL key down while drawing.

Flood Fill: Replaces all adjacent areas of the exact color the user clicks on in the image with the foreground, middle ground, or background color, depending on whether the user clicks the left, middle, or right mouse button, respectively.

Disc: Allows the user to draw a disc. To draw a disc in the shape of a true circle, the user holds the CTRL key down while drawing.

Filled Disk: Allows the user to draw a disc filled with solid color. To draw a filled disk in the shape of a true circle, the user holds the CTRL key down while drawing.

Adjust Color: Adjusts the existing color. A dialog box is displayed on the video monitor 906/908 which allows the user a choice of whether to adjust the values of RGB (red, green, blue), HSL (hue, saturation, lightness), or HSC (hue, saturation, contrast). Further choices are provided based on the responses to the above determinations. "Adjust Color" applies any color manipulations defined in the dialog box as the left mouse button is held down and the mouse is dragged across the background image. The color adjustments are applied evenly, and not on a gradient.

Grab Color: Allows selectively changing the foreground, middle ground, or background color to a color from the image.

"Special Effects" Group of the Brush Options

Shuffle: Shuffles the pixels (smallest units of color) of the background as the user holds down the left mouse button and drags the mouse across the background image to create a speckled effect. This option will be further described hereinbelow.

Object. Texture: Paints randomly picked colors from the current object as the user holds down the left mouse button and drags the mouse to create a textured effect. This option will be further described hereinbelow.

Object. Stamp: Clones the current object as the user holds down the left mouse button and drags the mouse to create a wallpaper effect. This option works best with a large shape brush.

Stamp Re-Color: Combines the effects of "Stamp" and "ReColor". This option clones the current object as the user holds down the left mouse button and drags the mouse, while re-coloring the cloned objects.

Re-Color: Creates an effect known as "Ted Turner colorization". Maintains the lightness of the background while changing the hue and saturation to that of the user-selected foreground, middle ground, or background color, depending on whether the user holds down and drags with the left, middle, or right mouse button, respectively.

Posterize: Reduces the number of colors as the user holds down the left mouse button and drags the mouse to create a poster effect.

Gray-Scale: Transforms to gray-scale an area over which the user drag the mouse while holding down the left mouse button. This effect is achieved by averaging the reds, greens, and blues.

Smudge: Smudges the colors of the background as the user holds down the left mouse button and drags the mouse. This option drags particular pixels of color across the background.

Zoom: Allows the user to zoom in on the image to assist in detailed manipulations. Alternatively, the user may zoom out from the image.

Detail of Shuffle, Object Texture, and Object Stamp Options

The "Shuffle", "Object Texture", and "Object Stamp" options are now further described and an example of each is given. "Shuffle" is described first.

Shuffle provides the capability of shuffling or mixing the pixels of the background to create a speckled effect. The user defines an area of a background image and then grabs the defined area as an object. The area defining and grabbing steps uniquely identify each pixel and the corresponding flags, color, tags, and other attributes of each pixel of the object. When the user draws somewhere else on the background image, using the object pixels as the brush, the computer 902 randomizes or shuffles the pixels to re-color whatever was there previously. The randomization is done by the computer 902 using an array, such that no two pixels which were originally adjacent in the image are adjacent after the shuffle option is performed. The pixels of the object, with all their corresponding attributes, are randomly used to re-color the background image.

For example, if a background image had a beautiful sunset sky, but also included an airplane, the user might want to delete the airplane. Traditional methods of removing the airplane would leave a sharp edge where the airplane was previously. Blurring the edge is helpful, but shuffle produces better results. In this example, the user defines an area of the sky next to the airplane as the object. The user then recolors the area of the airplane with a randomized set of pixels from the adjacent sky area using shuffle to produce a seamless background image not having the airplane.

"Object Texture" provides the ability to change the texture of an area or object by using an object of a different texture. Texture is the order of pixels of the image. For example, if the background image has a person and a marble desk, the user may grab a piece of marble as an object. Using the artifacts of the marble for the brush, such as the veins and colors, the user could change the image of the person to appear to be on marble, of marble, or to include both effects. In other words, the person would look like he was made of marble or the picture would look as if the person's image was printed on marble.

"Object Stamp" provides the ability to clone or stamp the current object as the user drags the pointing device 924. The user clicks the left mouse button and drags the mouse over the areas of an image that the user wishes to stamp. The result is a wallpaper effect on the image. To undo a portion of the clone, the user clicks or drags with the right mouse button over the portion of the image that is to be undone.

Figure 24A:
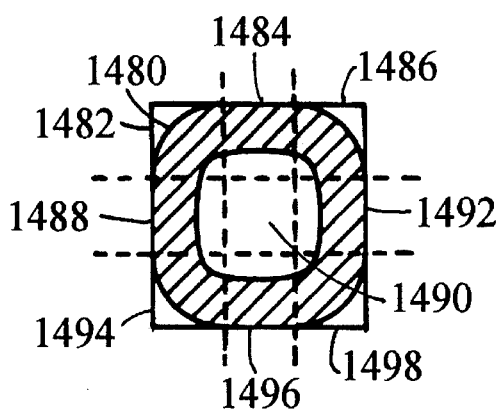
FIG. 24a is an exemplary object image shown in isolation.
Figure 24B:
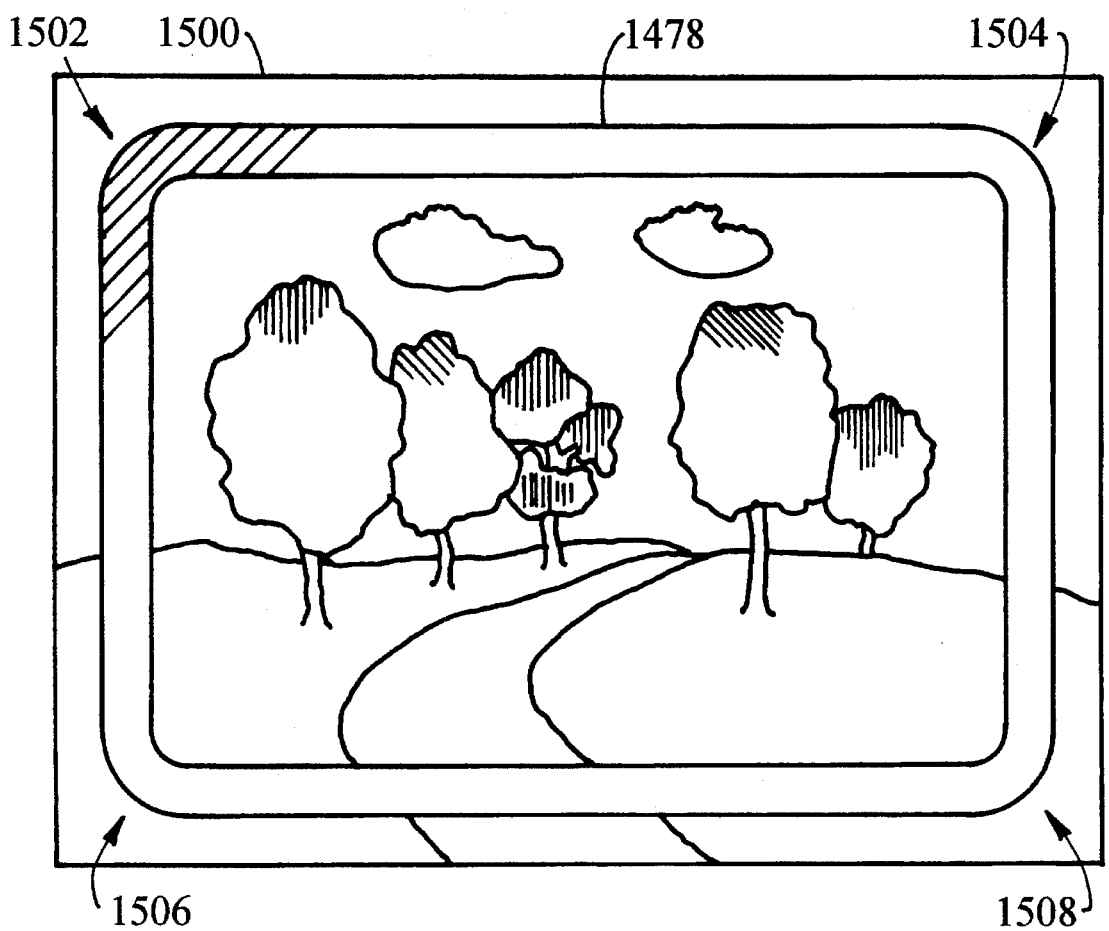
FIG. 24b is an exemplary image that includes a border which was drawn by the imaging system using the object of FIG. 24a and using an Object Stamp option.

Another use of Object Stamp is for placing a border around an image using the current object. Referring to FIGS. 24a and 24b, for example, the user can use a filigree object or a plain "o" shape object 1480 to create a border 1478 near the edges of an entire image 1500 using Object Stamp. The process to create the border uses one complete object 1480 as if it is divided into nine equal pieces 1482–1498. The object can be considered to be divided into three rows and three columns. The portion 1482 of the object at the first row and first column is placed at the top left corner 1502 of the image, while the portion 1486 of the object at the first row and third column is placed at the top right corner 1504 of the image. The portion 1484 of the object at the first row and second column is repeated as necessary to fill in the space between the top corners 1502, 1504 of the image. A similar operation is done using portions 1494, 1496, 1498 of the object at the third row to create the bottom border of the image. The portions 1488, 1492 of the object at the second row, first and third columns, respectively, are repeated as necessary to fill in the space between the left corners 1502, 1506 of the image, and the right corners 1504, 1508 of the image, respectively. The portion 1490 of the object at the second row and second column (the center) is not used as part of the border 1478.

The following steps are performed to create the border: First, the user selects the object 1480 that is to be used as a border. Second, the user clicks on the Object Stamp option with the left mouse button. Third, the user moves the cursor to a location where the border is to begin. The cursor should be placed at the desired distance from the top of the image and from the left side of the image. The border 1478 will be drawn around the entire image using the specified distances from the edges. Fourth, the user clicks the middle mouse button to draw the border 1478, or the user can hold down the CTRL key while clicking the left mouse button. To undo a portion of the border, the user clicks or drags with the right mouse button over the portion of the image that is to be undone.

Object Options

Figure 19C:
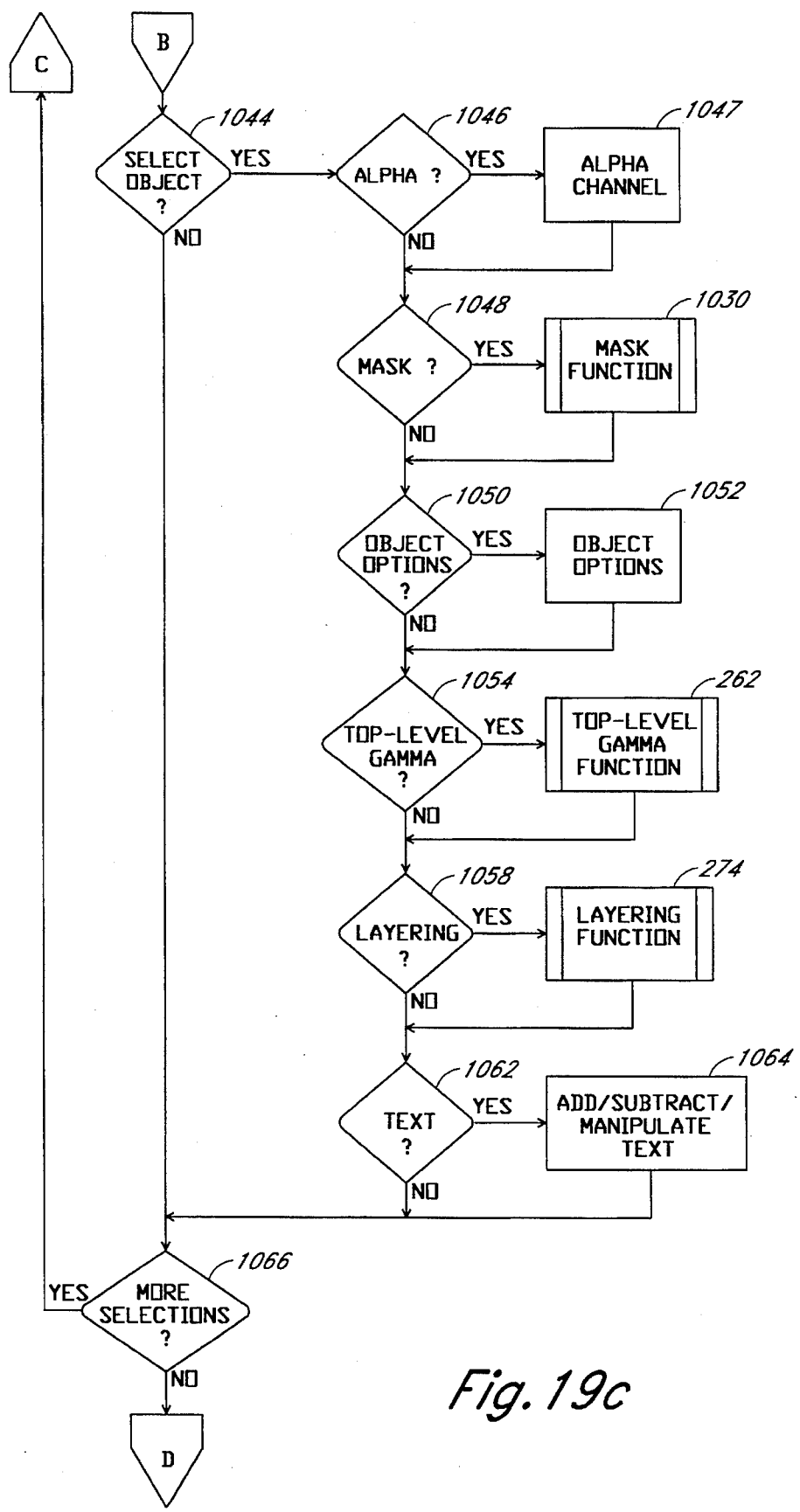
Figure 19D:
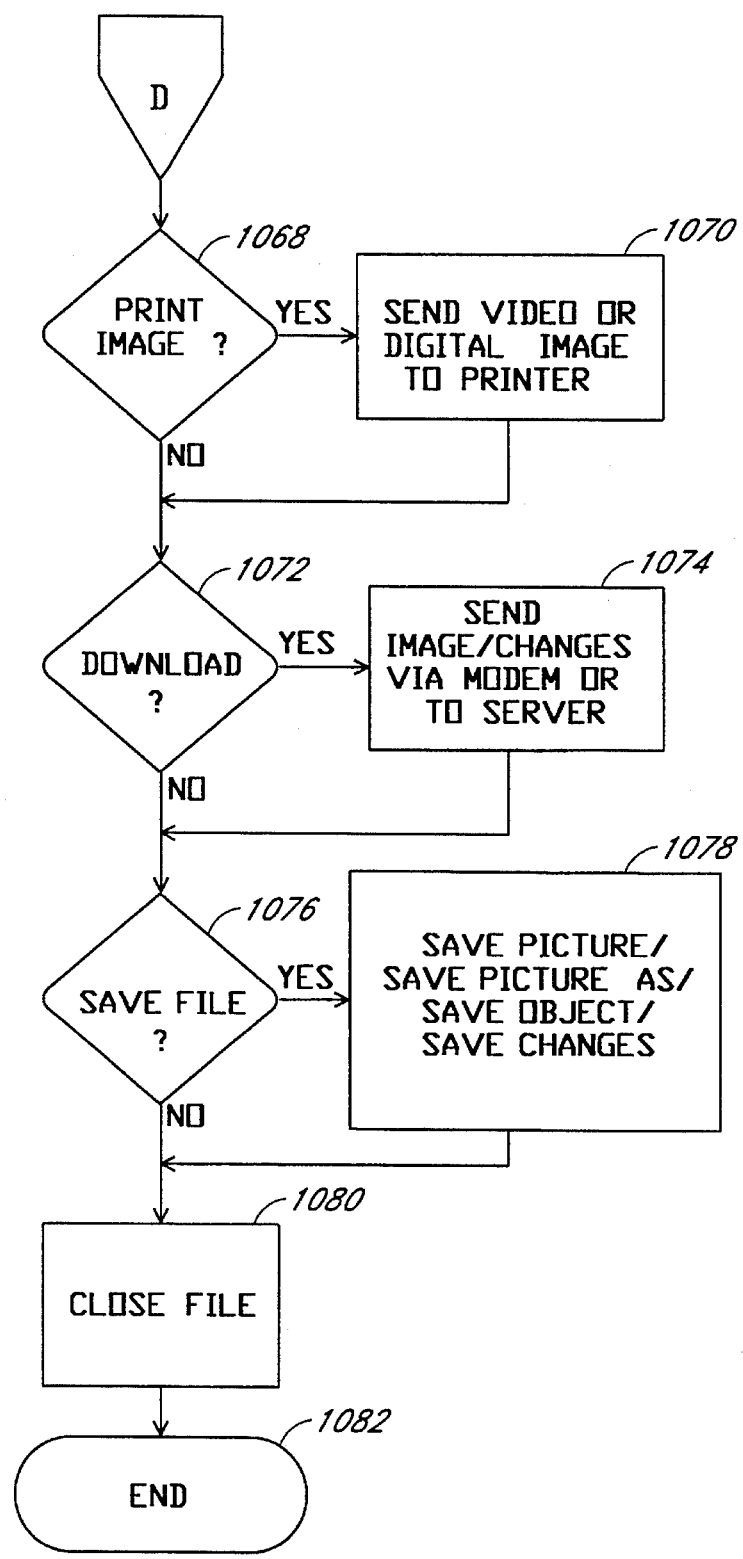

The object options step 1052 of FIG. 19c includes a plurality of options to manipulate objects. Objects must first be selected before manipulations can be done on the object. Selection is accomplished using the pointing device 924 and any of the area selection methods previously described. Then the user clicks on the "Grab Object" option to indicate to the system 900 that the selected area is now to be treated as an independent object. Some of the options that the user may wish to perform on an image using a mask are in the object options grouping. Object options are summarized as follows:

Trim: Allows the user to trim off any undesired edges of an object to reveal the background below. The user positions the cursor on the portion of the object desired to be trimmed and clicks the left mouse button. While in trim mode, the user can see through the cursor to the background beneath the object to help in trimming off the edges of the object. If a mistake is made and something is trimmed off that is not desired to be trimmed, the user clicks the right mouse button on the area to be "un-trimmed". The user can selectively adjust the size and shape of the "trimmer" brush.

Sharpen: Increases the contrast between adjacent colors to more sharply define the object. A sub-menu is displayed on the video monitor 906/908 which allows the user to choose the level of sharpening from among low, medium, or high.

Blur: Blurs the edges between one color and another to create a soft effect. A sub-menu is displayed which allows the user to choose the level of blurring from among low, medium, or high.

Fill: Fills the object with color. A dialog box is displayed which allows the user to choose whether to fill the object evenly or on a gradient.

Tint: Applies a shade of the foreground color to the object. Tint replaces the hue and saturation of the object with that of the tint applied, while maintaining the lightness of the object.

Posterize: Reduces the number of colors in the object. A sub-menu is displayed which allows the user to choose how many colors the object is reduced to.

Gray-Scale: Transforms the object to gray-scale by averaging the reds, greens, and blues of the object.

Adjust Color: Adjusts the existing color in the object. A dialog box is displayed which allows the user a choice of whether to adjust the color evenly or on a gradient. Then, a choice of whether to adjust the values of RGB (red, green, blue), HSL (hue, saturation, lightness), or HSC (hue, saturation, contrast) is given. Further choices are provided based on the responses to the above determinations.

Blend (an object into the background): Averages the colors of the current object with the colors of the background behind it to create a shadow effect. The user presses and holds down the left mouse button, drags the mouse across the areas to be blended, and then releases the mouse button. The user can selectively adjust the size and shape of the "blender" brush. If a mistake is made and something is blended that is not desired to be blended, the user clicks the right mouse button on the area to be "un-blended".

Adjust Transparency: Adjusts the transparency of the object. A dialog box is displayed which allows the user to choose whether to adjust the transparency evenly or on a gradient.

Move: Moves the current object over the background image and over other objects with lower priority. The move can be accomplished by use of the pointing device 924 or with the keyboard 922.

"Size, Rotate, and Distort" Group of Object Options

This group of object options allows the user to change the size, rotate, or perform other related operations on the current object. A dialog box is displayed on the video monitor 906/908 which allows the user to type in the angle at which to rotate the object, or to click on "+90 or "-90" to rotate the object 90 degrees clockwise (+) or counterclockwise (−) from the current position. The dialog box also allows the user to change the size of the object by typing in a new horizontal or vertical scale, or a new horizontal or vertical pixel count. The system 900 automatically updates the pixel count when the user changes the scale, and vice versa. The user can also choose whether or not to keep the original proportions of the object. If the user chooses proportional sizing, for example, whenever the user changes the horizontal scale or pixels, the system 900 automatically changes the vertical scale and pixels to maintain the objects original proportions. The dialog box also displays the horizontal and vertical pixel count of the current object and the original object for comparison.

Flip Horizontal: Flips the current object to a mirror image of itself, horizontally.

Flip Vertical: Flips the current object to a mirror image of itself, vertically (upside down).

Restore: Restores the object to its original size and orientation, thus losing any changes made with the "Rotate" or "Size" options, even if the object was saved after a rotate or size operation.

Size: Allows the user to interactively change the size of the current object. A gray border with yellow corners is displayed around the outside of the object which allows the user to pull or push the object to enlarge it or reduce it.

If the user clicks and drags on the gray border at the top or the bottom of the object outward, the object is elongated. Conversely, if the user clicks on the top or bottom gray border and drags it inward, the object is shortened. Likewise, the user can make the object wider or narrower by clicking and pulling or pushing on the side gray border of the object. To increase or decrease both the height and width of the object at once, the user clicks on any of the yellow corners around the object and drags the mouse up, down or sideways.

Rotate: Allows the user to rotate the current object. A gray border with yellow corners is displayed around the outside of the object which allows the user to rotate the object manually to any angle and in any direction (clockwise or counterclockwise) desired. The user clicks on a yellow corner and drags the mouse in the direction (clockwise or counterclockwise) the object is to be rotated. The mouse button is released by the user when the object has reached the desired angle of rotation. The border around the object does not rotate.

Distort: Allows the user to distort the current object. A gray border with yellow corners is displayed around the outside of the object which allows the user to push or pull the corner in any direction desired. The user clicks on any of the yellow corners of the object and drags the mouse in the direction desired to be distorted. The user releases the mouse button when the object has reached the desired distortion. The other three corners of the object remain in place. The object is distorted but the border around the object is not distorted.

"Using More than One Object" Group of Object Options

The user can select as many objects as desired. However, only one object at a time can be manipulated; this object is called the current object. The following describes how to switch between objects and other ways of using more than one object.

The user can quickly make another object become the current object simply by clicking inside that object. The other methods of using more than one object require selecting an option at the object options step 1052 of FIG. 19c. These methods of the object options are as follows:

Next Object: Makes the next object become the "current" object so the user can manipulate it. The computer 902 cycles through all objects as the user continues to click on "Next Object". This option applies only if more than one object has been selected and includes hidden objects.

Knit Objects: Allows the user to stitch together or "knit" several objects from the active document window into one object, using the current position of the objects in the active document window. The knitted objects will then no longer exist as independent objects. This is useful, for instance, to combine several independent objects of eyes, nose, mouth, and ears to create one object of a face.

A dialog box is displayed on the video monitor 906/908 having a list of objects ("Current Objects") in the active document window. The user double-clicks on each object desired to be knitted into one resultant object. As the user double-clicks on the object, it is removed from the list of objects in the active document window and transferred to the "Objects to Knit" list. If the user desires to remove an object before the "OK" button is clicked, a double-click on the object in the "Objects to Knit" list moves the object back to the "Current Objects" list as an independent object. Once an object has been knitted, it cannot be made independent again.

After the user clicks the "OK" button in the "Knit Objects" dialog box, a "Describe Objects" dialog box appears on the video monitor 906/908 to allow the user to assign a description to the knit object. Just as with an independent object, the system 900 assigns a priority level number to the knit object. The number and abbreviated description appear on the lower portion of the video monitor 906/908 when the knit object is the current object. Attaching a description does not save the object.

Hide: Hides the current object from view. The user sees a box outlining the location of the hidden object when it is the current object. To bring the object back into view, the user ensures it is the current object and then clicks on "Hide" again.

Delete: Deletes the current object.

Clone Object: Duplicates the current object by making a "clone" or exact copy of the current object. The clone rests on top of the original object until the user moves it.

"Layering Objects" Group of Object Options

Each object is assigned a priority level when it is created. The most recently created object is assigned the highest priority level and the first object created is assigned the lowest priority level, one (1). If two or more objects overlap, the object with the highest priority level is on top and in full view. The current object's priority level number appears on the lower portion of the video monitor 906/908. Layering was previously described in conjunction with FIGS. 3e, 4h, 11, and 12c.

Raise: Raises the priority level of the current object by one level in relation to other objects.

Lower: Lowers the priority level of the current object by one level in relation to other objects.

Delete: Deletes the current object.

"Affix an Object to the Background" Group of Object Options

Affix Copy: Pastes a copy of the object onto the image background, so that it becomes part of the background. Once an object copy is affixed to the background, the copy is no longer an independent object. The original object remains on top of the newly affixed object. The user may continue to move and manipulate the object or delete it.

Affix a Copy Blurred: Pastes a copy of the object onto the background just as "Affix Copy" does, but softens or blurs the edges of the object so it blends smoothly into the background.

Affix All Objects: Pastes a copy of all objects in the active or current image window, including hidden objects, onto the image background. The original objects remain on top of the object copies until deleted by the user. The affixed objects are no longer objects but become part of the background. An option to blur the edges of the objects as part of the affix operation is available.

Affix and Delete All Objects: Pastes a copy of all objects, including hidden objects, onto the background and deletes the original objects. The affixed objects are no longer objects but become part of the background. An option to blur the edges of the objects as part of the affix operation is available.

Lock/Unlock: The user may desire to "lock in" all the characteristics of an object without actually pasting it to the background. To do so., the user ensures the object is the current object, and then clicks on the "Lock/Unlock" object option. This prevents the user from moving, trimming, sizing, rotating, distorting, or changing the colors of the object. The lower portion of the video monitor 906/908 indicates that the object is locked. Once an object is locked, the user can easily unlock it by clicking on "Lock/Unlock" again. The user can then again move, size, rotate, distort or change the colors of the object. This feature applies to graphical objects only, not text objects.

Text Pattern

A current object can be used as a text pattern. The object can be used as the text foreground, middleground, or background. The text pattern feature is most noticeable when a large size font is used. Text pattern uses the current object, e.g., the user's face, in one of four pattern formats: Tile, Texture, Stretch to Fill Letter, or Stretch to Fill Object. The following steps are performed to use an object as a text pattern:

1. The user chooses Add from a Text menu.

2. The user places the cursor at the location desired to add text and clicks the left mouse button. A font dialog box appears on the video monitor 906/908 wherein the bottom of the box has a display of the current foreground, middleground, and background text colors.

3. The user selects a desired font size and font style.

4. The user moves the cursor to the text color (foreground, middleground, or background) desired to be changed to a pattern.

5. The user clicks the left mouse button while holding the SHIFT key. The Select Object dialog box appears on the video monitor 906/908.

6. The user selects a desired object to be used and a text pattern format. The user clicks on the desired object in the dialog box from a list of objects that are in the active image window.

The pattern formats are described as follows:

Tile: The selected object is repeated in the same sequence within each letter. If the object is larger than the letter, the entire object is not shown. The next letter displays the object from the beginning.

Texture: The selected object is used to create a textured effect. The pixels of the object appear in a random order within each letter.

Stretch to Fill Letter: The entire selected object is used to fill each letter. If the object is smaller than a letter, the object is stretched until it fills the letter. If the object is larger than a letter, the object is reduced so that the entire object fills the letter. An object is never repeated within the same letter.

Stretch to Fill Object: The complete selected object is used to fill the entire text object so that the selected object stretches across all the letters within the text object. The selected object is used only one time.

Masking Example

Figure 25A:
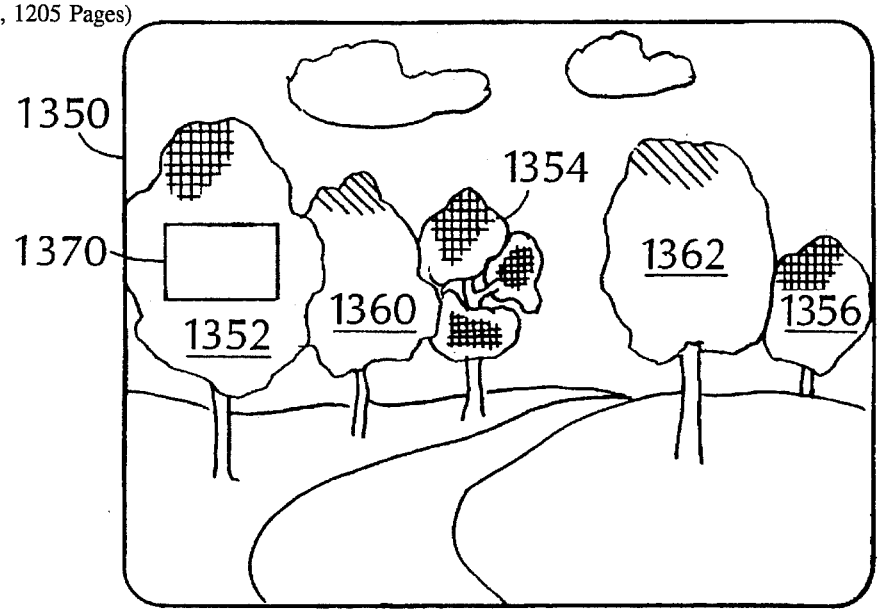
FIGS. 25a and 25b are exemplary images produced by the imaging system in performing the process steps shown in FIG. 19.
Figure 25B:
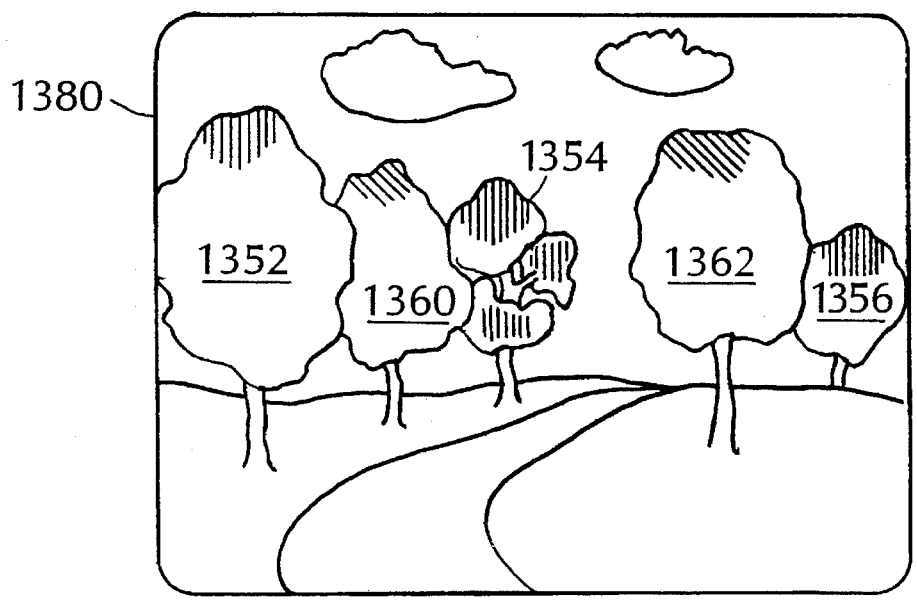

Referring to FIGS. 25a and 25b, a simple example of masking and area options will now be discussed. An original image 1350 is of an autumn outdoor scene having five trees. Three trees 1352, 1354, 1356 have yellow leaves and two trees 1360, 1362 have green leaves. The user of the system 900 desires to convey a different look by changing the color of only the yellow leaves to red leaves. This change is readily done by use of a mask. The user selects an area 1370 of the image that has only the yellow leaves to isolate the yellow color and create the mask for that color, and sets the "Turn Mask On" option. Then, the user selects the "Adjust Color" area option to choose the red color to replace the yellow color. The resultant image 1380 still has two trees 1360, 1362 with green leaves, but now has three trees 1352, 1354, 1356 with red leaves. The rest of the image 1350, such as branches of the trees visible among the leaves, did not change as a consequence of the mask and adjust color operations. Of course, any of the other options previously listed in the discussion of masking could be done in place of the Adjust Color option to produce a different effect.

The software described herein for the image editing system 900, some of which is listed in the attached Microfiche Appendix from frame 125 to the end, is written in the "C" language and was translated from source code to machine-readable object code using a "C" version 7.0 compiler available from Microsoft Corporation. Nonetheless, one skilled in the technology will recognize that the steps in the accompanying flowdiagrams can be implemented by using a number of different compilers and/or programming languages.

The image editing system 100 described herein finds application in many environments, and is readily adaptable for use therein. For example, the system finds use in generation of composite photographs where portions of a person's image may replace those of another person's image, such as on a sports team photo. It can be used for production of postcards depicting a person in an exotic location. It also can be used in applications such as production of driver's licenses or security access cards where a person's image is combined with selected other information on a card. Using the many options that include a full range of area color, object manipulation, object color correction, brush and text creation tools and the masking capability, the image editing system 900 can be used in many other custom applications. One application is in the medical imaging area. Patient images are input via scanners or live input and then can be manipulated and layered as necessary by medical professionals. Another application is in the training field, which may include defense training. The system allows rapid image capture with automatic background removal for various types of input images. These images may then be manipulated, enhanced, and if desired, frame-by-frame video hard-copy output provided to enhance the training experience. Accordingly, the claims are to be interpreted to encompass these and other applications of the invention within their scope and are not to be limited to the embodiments described herein.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

I claim:

1. In a computer system having a memory and a visual display, a digital method of editing an image having a plurality of pixels, each pixel having a color, comprising the steps of:

providing an image in digital form;

interactively selecting a plurality of colors from among those present in the image at at least one location on the visual display to form a set of selected colors wherein each color comprises a single discrete hue; and manipulating, independent of inputs representative of any other image, only those pixels on the visual display having a color defined in the set of selected colors so as to change a visual feature of the image.

2. The method as defined in claim 1, wherein the step of selecting a plurality of colors comprises the steps of:

selecting a first single pixel of the image to identify a first color; and selecting a second single pixel of the image, of a different color than the first pixel, so as to identify a second color.

3. The method as defined in claim 2, wherein the step of selecting a single pixel includes the step of using a pointing device connected to the computer system to mark one of the pixels.

4. The method as defined in claim 1, wherein the step of selecting a plurality of colors includes the step of selecting a plurality of pixels of the image to form a set of selected pixels that identify the plurality of colors.

5. The method as defined in claim 4, wherein the step of selecting a plurality of pixels includes the step of using a pointing device connected to the computer system to draw a boundary around the pixels.

6. The method as defined in claim 5, wherein the boundary comprises a polygon.

7. The method as defined in claim 4, wherein the step of selecting a plurality of pixels includes the step of using the pointing device as a brush to electronically touch the plurality of pixels.

8. The method as defined in claim 4, wherein the step of selecting a plurality of pixels includes the step of selecting pixels of the image mutually exclusive to the set of selected pixels to form a new set of selected colors.

9. The method as defined in claim 1, further comprising the step of storing data representing the set of selected colors in a list on the memory of the computer system.

10. The method as defined in claim 9, wherein the list is initially empty.

11. The method as defined in claim 9, wherein the list initially includes all the colors of the image.

12. The method as defined in claim 9, wherein the list initially includes at least one of the colors of the image.

13. The method as defined in claim 9, wherein the list is structured to link the colors.

14. The method as defined in claim 13, wherein the step of manipulating pixels includes the steps of:

processing a set of pixels of a color corresponding to a first color in the list; and processing a set of pixels of another color corresponding to a second color linked to the first color in the list.

15. The method as defined in claim 9, further comprising the step of adding another color to the list by the steps of:

selecting a different color of the image not in the set of selected colors; and storing data representing the different color in the list.

16. The method as defined in claim 15, wherein the list is structured to link the colors.

17. The method as defined in claim 9, additionally comprising the step of deleting a color that is stored in the list.

18. The method as defined in claim 17, wherein the step of deleting a color further comprises the steps of:

identifying a color of the image that is stored in the list; and deleting the identified color from the list.

19. The method as defined in claim 17, wherein the list is structured to link the colors.

20. The method as defined in claim 1, wherein the step of selecting a plurality of colors further comprises the steps of:

selecting a plurality of pixels of the image that identify a single color; and repeating the step of selecting a plurality of pixels for a different color so as to identify a plurality of colors.

21. The method as defined in claim 20, wherein the step of selecting a plurality of pixels further includes the step of using the pointing device to draw a boundary around the pixels.

22. The method as defined in claim 1, wherein following the step of selecting a plurality of colors, the method comprises the step of selecting an area within the image that is smaller than the image.

23. The method as defined in claim 22, wherein the step of manipulating pixels comprises the step of changing the color value of one or more pixels in the selected area in response to the colors defined in the set of selected colors.

24. The method as defined in claim 1, wherein the image comprises at least one object.

25. The method as defined in claim 24, wherein the image comprises a plurality of objects and further wherein following the step of selecting a plurality of colors, the method comprises the step of selecting one of the objects.

26. The method as defined in claim 25, wherein the image has a plurality of X-Y planes located along a Z-axis and the selected object is on one of the X-Y planes.

27. The method as defined in claim 25, wherein the step of manipulating pixels comprises the step of changing the color value of one or more pixels in the selected object in response to the colors defined in the set of selected colors.

28. The method as defined in claim 1, further comprising the steps of:

providing another image having a plurality of pixels; and repeating the step of manipulating pixels on the new image.

29. The method as defined in claim 28, wherein the new image is one of a sequence of related images.

30. The method as defined in claim 1, wherein the step of manipulating pixels comprises the step of selecting an option to be performed by the computer, and wherein the option is selected from a group consisting of: area fill; area sharpen; area blur; area adjust color; area tint; area posterize; area gray-scale; area stamp-into-selection; object fill; object sharpen; object blur; object adjust color; object tint; object posterize; object gray-scale; and brush options.

31. The method as defined in claim 1, wherein each color is different from another color by at least one attribute.

32. The method as defined in claim 31, wherein the attributes comprise red, green, blue.

33. The method as defined in claim 31, wherein the attributes comprise hue, saturation, lightness.

34. The method as defined in claim 31, wherein the attributes comprise hue, saturation, contrast.

35. The method as defined in claim 1, wherein the colors include substantially all visible colors.

36. The method as defined in claim 35, wherein all visible colors are represented by a plurality of hues of gray including the absolutes of black and white.

37. In a computer system having a memory and a visual display, a digital method of editing an image having a plurality of pixels, each pixel having a color, comprising the steps of:

providing an image in digital form;

identifying a color of each pixel of the image;

storing data representing each identified color in an original first list on the memory of the computer system;

identifying a user-selected color at a user-selected location on the visual display of the image wherein the selected color comprises a single discrete hue;

deleting the data representing the selected color from the first list; and manipulating, independent of inputs representative of any other image, pixels of the image on the visual display having colors of a preselected relationship to the colors identified in the first list so as to change a visual feature of the image.

38. The method as defined in claim 37, wherein the preselected relationship is all colors represented by data in the first list.

39. The method as defined in claim 37, wherein the preselected relationship is all colors represented by data that has been deleted from the first list.

40. The method as defined in claim 37, wherein the step of identifying a selected color comprises the step of selecting a single pixel of the image to identify a single color.

41. The method as defined in claim 40, wherein the step of selecting a single pixel comprises the step of using a pointing device connected to the computer system to mark the pixel.

42. The method as defined in claim 40, wherein the step of selecting a single pixel is repeated for a different color so as to identify a plurality of colors.

43. The method as defined in claim 37, wherein the step of identifying a selected color comprises the step of selecting a plurality of pixels of the image to form a set of selected pixels that identify a plurality of colors.

44. The method as defined in claim 43, wherein the step of identifying a selected color further comprises the step of using a pointing device connected to the computer system to draw a boundary around the pixels.

45. The method as defined in claim 44, wherein the boundary comprises a polygon.

46. The method as defined in claim 43, wherein the step of identifying a selected color further comprises the step of using a pointing device connected to the computer system as a brush to electronically touch the plurality of pixels.

47. The method as defined in claim 37, wherein the first list is structured to link the colors.

48. The method as defined in claim 47, wherein the step of manipulating pixels of the image further comprises the steps of:

processing a set of pixels of a color corresponding to a first color in the first list; and processing a set of pixels of another color corresponding to a second color linked to the first color in the first list.

49. The method as defined in claim 37, additionally comprising the step of storing data representing the selected color in a second list on the memory of the computer system;

50. The method as defined in claim 49, wherein the step of manipulating pixels of the image is performed on the pixels of the image having the colors corresponding to the colors identified in the second list.

51. The method as defined in claim 49, wherein the second list is initially empty.

52. The method as defined in claim 49, wherein the second list initially includes at least one of the colors of the image.

53. The method as defined in claim 49, wherein the second list is structured to link the colors.

54. The method as defined in claim 53, wherein the step of manipulating pixels of the image further comprises the steps of:

processing a set of pixels of a color corresponding to a first color in the second list; and processing a set of pixels of another color corresponding to a second color linked to the first color in the second list.

55. The method as defined in claim 49, further comprising the step of adding data representing another color to the second list by the steps of:

selecting a different color of the image than was previously represented in the second list; and storing data representing the different color in the second list.

56. The method as defined in claim 55, wherein the second list is structured to link the colors.

57. The method as defined in claim 49, further comprising the step of deleting data representing a selected color that is stored in the second list.

58. The method as defined in claim 57, wherein the step of deleting data representing a selected color further comprises the steps of:

identifying a color of the image for which data representing such color is stored in the second list; and deleting data representing the identified color from the second list.

59. The method as defined in claim 57, wherein the second list is structured to link the colors.

60. The method as defined in claim 37, wherein the step of identifying a selected color comprises the step of selecting a plurality of pixels of the image that identify a single color.

61. The method as defined in claim 60, wherein the step of selecting a plurality of pixels further comprises the step of using a pointing device connected to the computer system to draw a boundary around the pixels.

62. The method as defined in claim 37, wherein following the step of deleting the data from the first list, the method comprises the step of selecting an area within the image that is smaller than the image.

63. The method as defined in claim 62, wherein the step of manipulating pixels of the image further comprises the step of changing the color value of one or more pixels in the selected area in response to the colors identified in the first list.

64. The method as defined in claim 62, wherein the step of manipulating pixels of the image further comprises the step of changing the color value of one or more pixels in the selected area in response to the colors identified in the second list.

65. The method as defined in claim 37, wherein the image comprises at least one object.

66. The method as defined in claim 65, wherein the image comprises a plurality of objects and further wherein following the step of deleting the data from the first list, the method comprises the step of selecting one of the objects.

67. The method as defined in claim 66, wherein the image has a plurality of X-Y planes located along a Z-axis and the selected object is on one of the X-Y planes.

68. The method as defined in claim 66, wherein the step of manipulating pixels of the image further comprises the step of changing the color value of one or more pixels in the selected object in response to the colors identified in the first list.

69. The method as defined in claim 66, wherein the step of manipulating pixels of the image further comprises the step of changing the color value of one or more pixels in the selected object in response to the colors identified in the second list.

70. The method as defined in claim 37, further comprising the steps of:

providing another image having a plurality of pixels; and repeating the step of manipulating pixels on the new image.

71. The method as defined in claim 70, wherein the new image is one of a sequence of related images.

72. The method as defined in claim 37, wherein the step of manipulating pixels of the image further comprises the step of selecting an option to be performed by the computer, wherein the option is selected from a group consisting of: area fill; area sharpen; area blur; area adjust color; area tint; area posterize; area gray-scale; area stamp-into-selection; object fill; object sharpen; object blur; object adjust color; object tint; object posterize; object gray-scale; and brush options.

73. In a computer system having a memory and a visual display, a digital method of creating a color mask for an image, comprising the steps of:

providing a digital image having a plurality of pixels, each pixel having a color;

interactively selecting a plurality of colors from among those present in the image at at least one location on the visual display to form a set of selected colors wherein each color comprises a single discrete hue; and storing data representing the colors from the set of selected colors in a list on the memory of the computer system, to thereby define the mask.

74. The method as defined in claim 73, further comprising the step of manipulating only those pixels of the image having colors corresponding to the colors represented in the mask so as to change a visual feature of the image.

75. The method as defined in claim 74, wherein following the step of storing data in a list, the method comprises the step of selecting an area within the image that is smaller than the image.

76. The method as defined in claim 75, wherein the step of manipulating pixels of the image further comprises the step of changing the color value of one or more pixels in the selected area in response to the colors represented in the mask.

77. The method as defined in claim 74, wherein the image comprises at least one object.

78. The method as defined in claim 77, wherein the image comprises a plurality of objects and further wherein following the step of storing data in a list, the method comprises the step of selecting one of the objects.

79. The method as defined in claim 78, wherein the step of manipulating pixels of the image further comprises the step of changing the color value of one or more pixels in the selected object in response to the colors represented in the mask.

80. In a computer system having a memory and a visual display, a digital method of creating an inverted color mask for an image, comprising the steps of:

providing a digital image having a plurality of pixels, each pixel having a color;

identifying the color of each pixel of the image to form a set of identified colors wherein each color comprises a single discrete hue;

interactively selecting a color at an arbitrary location of the image in the visual display; and deleting the selected color from the colors in the set of identified colors, thereby defining an inverted mask.

81. The method as defined in claim 80, further comprising the step of storing data representing each color from the set of identified colors in a first list on the memory of the computer system.

82. The method as defined in claim 80, further comprising the step of storing data representing the selected color in a second list on the memory.

83. The method as defined in claim 82, wherein the second list defines a noninverted mask.

84. The method as defined in claim 83, additionally comprising the step of manipulating pixels of the image having the colors corresponding to the colors identified in the noninverted mask so as to change a visual feature of the image.

85. The method as defined in claim 84, wherein the image comprises at least one object.

86. The method as defined in claim 85, wherein the image comprises a plurality of objects and further wherein following the step of deleting the selected color, the method comprises the step of selecting one of the objects.

87. The method as defined in claim 86, wherein the step of manipulating pixels of the image further comprises the step of changing the color value of one or more pixels in the selected object in response to the colors represented in the noninverted mask.

88. The method as defined in claim 84, wherein following the step of deleting the selected color, the method comprises the step of selecting an area within the image that is smaller than the image.

89. The method as defined in claim 88, wherein the step of manipulating pixels of the image further comprises the step of changing the color value of one or more pixels in the selected area in response to the colors represented in the noninverted mask.

90. The method as defined in claim 80, additionally comprising the step of manipulating pixels of the image having colors corresponding to the colors represented in the inverted mask so as to change a visual feature of the image.

91. The method as defined in claim 90, wherein following the step of deleting the selected color, the method comprises the step of selecting an area within the image that is smaller than the image.

92. The method as defined in claim 91, wherein the step of manipulating pixels of the image further comprises the step of changing the color value of one or more pixels in the selected area in response to the colors represented in the inverted mask.

93. The method as defined in claim 90, wherein the image comprises at least one object.

94. The method as defined in claim 93, wherein the image comprises a plurality of objects and further wherein following the step of deleting the selected color, the method comprises the step of selecting one of the objects.

95. The method as defined in claim 94, wherein the step of manipulating pixels of the image further comprises the step of changing the color value of one or more pixels in the selected object in response to the colors represented in the inverted mask.

96. A Digital system for editing a digital image having a plurality of pixels, each pixel having a color, comprising:

a computer having a memory and a visual display;

means for providing the image to the computer;

means for identifying a color of each pixel of the image on the visual display wherein each color comprises a single discrete hue;

means for storing data representing each identified color in a first list on the memory of the computer;

interactive means for identifying a selected color at an arbitrary location of the image on the visual display;

means for deleting the data representing the selected color from the first list; and means for manipulating pixels of the image having colors corresponding to the colors identified in the first list, independent of inputs representative of any other image, so as to change a visual feature of the image.

97. The system as defined in claim 96, further comprising means for storing data representing the selected color in a second list on the memory.

98. The system as defined in claim 97, further comprising means for manipulating pixels of the image having colors corresponding to the colors identified in the second list so as to change a visual feature of the image.

99. In a computer system having a visual display, a digital method of recoloring an object having a plurality of pixels, comprising the steps of:

providing a digital background image having a plurality of pixels;

interactively selecting an area from the background image on the visual display;

determining a hue of a selected pixel in the selected area;

repeating the determining step until the hue of all pixels in the selected area has been determined;

determining an average hue of all the pixels in the selected area;

selecting an object on the visual display to be recolored; and changing the hue off the selected object to the determined average hue.

100. The method as defined in claim 99, wherein the selected area is a single pixel.

101. The method as defined in claim 99, wherein the step of selecting an object includes the step of selecting a tool defining a brush with which to recolor the selected object.

102. In a computer system having a visual display, a digital method of recoloring an object having a plurality of pixels, comprising the steps of:

providing a background image having a plurality of pixels;

interactively selecting an area from the background image on the visual display;

identifying the selected area as a first object;

determining a hue of a selected pixel of the first object;

repeating the determining step until the hue of all pixels of the first object has been determined;

determining an average hue of all the pixels of the first object;

identifying a second object on the visual display to be recolored; and changing the hue of the second object to the average hue of the first object.

* * * * *